United States Patent
Cohen et al.

(10) Patent No.: US 10,800,679 B2
(45) Date of Patent: Oct. 13, 2020

(54) FLUIDIZED BED AND HYBRID SUSPENSION ELECTRODES FOR ENERGY STORAGE AND WATER DESALINATION SYSTEMS

(71) Applicant: Technion Research and Development Foundation Limited, Haifa (IL)

(72) Inventors: Hagai Cohen, Shoham (IL); Ilya Loiferman, Yokneam Ilit (IL); Matthew Suss, Haifa (IL)

(73) Assignee: Technion Research and Development Foundation Limited, Haifa (IL)

( * ) Notice: Subject to any disclaimer, the term of this patent is extended or adjusted under 35 U.S.C. 154(b) by 0 days.

(21) Appl. No.: 16/316,643

(22) PCT Filed: Jul. 10, 2017

(86) PCT No.: PCT/IL2017/050772
§ 371 (c)(1),
(2) Date: Jan. 10, 2019

(87) PCT Pub. No.: WO2018/011787
PCT Pub. Date: Jan. 18, 2018

(65) Prior Publication Data
US 2019/0152811 A1    May 23, 2019

(30) Foreign Application Priority Data

Jul. 10, 2016 (IL) .......................... 246694

(51) Int. Cl.
*C02F 1/46* (2006.01)
*C02F 1/469* (2006.01)
(Continued)

(52) U.S. Cl.
CPC .......... *C02F 1/4693* (2013.01); *C02F 1/4691* (2013.01); *C02F 1/46114* (2013.01);
(Continued)

(58) Field of Classification Search
CPC .. C02F 1/4693; C02F 1/46114; C02F 1/4691; H01M 8/18; H01M 14/00; H01M 8/22;
(Continued)

(56) References Cited

U.S. PATENT DOCUMENTS

| 4,126,733 A | 11/1978 | Doniat |
| 4,206,020 A | 6/1980 | Backhurst |

(Continued)

FOREIGN PATENT DOCUMENTS

| CN | 102324539 A | 1/2012 |
| CN | 103247816 A | 8/2013 |

(Continued)

OTHER PUBLICATIONS

Suss et al., (2015) Water desalination via capacitive deionization: what is it and what can we expect from it? Energy Environ Sci 8: 2296-2319.

(Continued)

*Primary Examiner* — Arun S Phasge
(74) *Attorney, Agent, or Firm* — J. A. Lindeman & Co. PLLC

(57) ABSTRACT

Provided is an electrode including conductive particles, which sediment under gravitational force and a liquid fluidizing medium flowing through the electrode, in which the conductive particles are suspended and optionally further including conductive particles, which do not sediment under gravitational force when the fluidizing medium flows in the electrode. Further provided are electrochemical devices and energy storage systems including the electrode.

20 Claims, 13 Drawing Sheets

(51) Int. Cl.
- C02F 1/461 (2006.01)
- H01M 8/18 (2006.01)
- H01M 14/00 (2006.01)
- H01M 8/22 (2006.01)
- H01M 8/0202 (2016.01)

(52) U.S. Cl.
CPC ........... *H01M 8/0202* (2013.01); *H01M 8/18* (2013.01); *H01M 8/188* (2013.01); *H01M 8/22* (2013.01); *H01M 8/225* (2013.01); *H01M 14/00* (2013.01); *Y02A 20/124* (2018.01)

(58) Field of Classification Search
CPC .... H01M 8/0202; H01M 8/188; H01M 8/225; H01M 2004/021; H01M 4/02; H01M 4/0478; Y02A 20/134
See application file for complete search history.

(56) References Cited

U.S. PATENT DOCUMENTS

| | | | |
|---|---|---|---|
| 8,722,226 B2 | 5/2014 | Carter | |
| 8,722,227 B2 | 5/2014 | Chiang | |
| 9,171,679 B2 | 10/2015 | Gogotsi | |
| 9,583,779 B2 | 2/2017 | Woodford | |
| 2012/0135278 A1 | 5/2012 | Yoshie | |
| 2014/0227574 A1 | 8/2014 | Savinell | |
| 2014/0315097 A1* | 10/2014 | Tan | H01M 4/134 429/300 |

FOREIGN PATENT DOCUMENTS

| | | |
|---|---|---|
| EP | 2605326 A2 | 6/2013 |
| JP | 2014229519 A | 12/2014 |
| WO | 2013036802 A1 | 3/2013 |
| WO | 2016044586 A2 | 3/2016 |

OTHER PUBLICATIONS

Suss et al., (2016) Membraneless flow battery leveraging flow-through heterogeneous porous media for improved power density and reduced crossover. RSC Adv 6: 100209-100213.
Weber et al., (2011) Redox flow batteries: a review. Journal of Applied Electrochemistry 41: 1137-1164.
Wei et al., (2015) Biphasic Electrode Suspensions for Li-Ion Semi-solid Flow Cells with High Energy Density, Fast Charge Transport, and Low-Dissipation Flow. Advanced Energy Materials 5(15): 1500535; 7 pages.
Yang et al., (2013) A membrane-free lithium/polysulfide semi-liquid battery for large-scale energy storage. Energy Environ Sci 6: 1552-1558.
Ye et al., (2005) The effects of particle and gas properties on the fluidization of Geldart A particles. Chemical Engineering Science 60(16): 4567-4580.
Zhang et al., (2015) Electrochemical performance of a fluidized bed electrode fuel cell with molten carbonate electrolyte. The Canadian Journal of Chemical Engineering 93(3): 494-499.
Zhu et al., (1995) Cocurrent downflow circulating fluidized bed (downer) reactors—A state of the art review. The Canadian Journal of Chemical Engineering 73(5): 662-677.
Abrahamsen and Geldart (1980) Behaviour of gas-fluidized beds of fine powders part I. Homogeneous expansion. Powder Technology 26(1): 35-46.
Backhurst et al., (1969) Some Aspects of a Fluidized Zinc/Oxygen Electrode System. Nature 221: 55-57.
Basova et al., "Carbon flow-through electrodes for electrochemical removal of nitrate ions from aqueous solutions". Proceedings of the American Carbon Society Carbon Conference 2001; Carbon Conference Held in Lexington, KU, USA, Jul. 14-19, 2001. 3 pages.

Basu (1999) Combustion of coal in circulating fluidized-bed boilers: a review. Chemical Engineering Science 54(22): 5547-5557.
Berent et al., (1969) Fluidized Bed Fuel Cell Electrodes. Nature 223: 1054-1055.
Berent et al., (1971) Fluidised-bed fuel-cell electrodes. Journal of Applied Chemistry and Biotechnology 21(3): 71-76.
Biesheuvel et al., (2014) Attractive forces in microporous carbon electrodes for capacitive deionization. J Solid State Electrochem 18:1365-1376.
Biesheuvel et al., (2015) Theory of Water Desalination by Porous Electrodes with Immobile Chemical Charge. Colloids and Interface Science Communications 9: 1-5.
Boota et al., (2014) Activated Carbon Spheres as a Flowable Electrode in Electrochemical Flow Capacitors. J Electrochem Soc 161(6): A1078-A1083.
Brunini et al., (2012) Modeling the hydrodynamic and electrochemical efficiency of semi-solid flow batteries. Electrochimica Acta 69: 301-307.
Campos et al., (2013) Investigation of carbon materials for use as a flowable electrode in electrochemical flow capacitors. Electrochimica Acta 98: 123-130.
Chen and Lu (2016) A High-Energy-Density Multiple Redox Semi-Solid-Liquid Flow Battery. Advanced Energy Materials 6(8): 1502183; 9 pages.
Chen et al., (2016) A low-dissipation, pumpless, gravity-induced flow battery. Energy Environ Sci 9: 1760-1770.
Cohen et al., (2016) Suspension Electrodes Combining Slurries and Upflow Fluidized Beds. ChemSusChem 9(21): 3045-3048.
Compton and Unwin (1986) Channel and tubular electrodes. Journal of Electroanalytical Chemistry and Interfacial Electrochemistry 205(1-2): 1-20.
Cornelissen et al., (2007) CFD modelling of a liquid-solid fluidized bed. Chemical Engineering Science 62(22): 6334-6348.
Deen et al., (2007) Review of discrete particle modeling of fluidized beds. Chemical Engineering Science 62(1-2): 28-44.
Do Nascimento et al., (2016) Influence of surface forces and wall effects on the minimum fluidization velocity of liquid-solid micro-fluidized beds. Powder Technology 304: 55-62.
Doornbusch et al., (2016) Fluidized bed electrodes with high carbon loading for water desalination by capacitive deionization. J Mater Chem A 4: 3642-3647 with supplementary information.
Duduta et al., (2011) Semi-Solid Lithium Rechargeable Flow Battery. Advanced Energy Materials 1(4): 511-516.
Fleischmann and Oldfield (1971) Fluidised bed electrodes: Part I. Polarisation predicted by simplified models. Journal of Electroanalytical Chemistry and Interfacial Electrochemistry 29(2): 211-230.
Fleischmann et al., (1971) Fluidized bed electrodes Part IV. Electrodeposition of copper in a fluidized bed of copper-coated spheres. Journal of Applied Electrochemistry 1(2): 103-112.
Gao et al., (2016) Complementary surface charge for enhanced capacitive deionization. Water Research 92: 275-282.
Gendel et al., (2014) Batch mode and continuous desalination of water using flowing carbon deionization (FCDI) technology. Electrochemistry Communications 46: 152-156.
Hamaker (1937) The London—van der Waals attraction between spherical particles. Physica 4(10): 1058-1072.
Hatzell et al., (2014) Capacitive deionization concept based on suspension electrodes without ion exchange membranes. Electrochemistry Communications 43: 18-21.
Hatzell et al., (2015) Materials for suspension (semi-solid) electrodes for energy and water technologies. Chem Soc Rev 44(23): 8664-8687.
Hoyt et al., (2016) Modeling of flowable slurry electrodes with combined faradaic and nonfaradaic currents. Chemical Engineering Science 144: 288-297.
Hu et al., (2005) Influence of the Zeta Potential on the Dispersability and Purification of Single-Walled Carbon Nanotubes. J Phys Chem B 109(23): 11520-11524.
Jeon et al., (2013) Desalination via a new membrane capacitive deionization process utilizing flow-electrodes. Energy Environ Sci 6: 1471-1475.

(56) References Cited

OTHER PUBLICATIONS

Jiliang et al., (2013) Minimum fluidization velocity of particles with wide size distribution at high temperatures. Powder Technology 235: 271-278.
Kim et al., (2015) Enhanced charge efficiency and reduced energy use in capacitive deionization by increasing the discharge voltage. Journal of Colloid and Interface Science 446: 317-326.
Li et al., (2006) London-van der Waals adhesiveness of rough particles. Powder Technology 161(3): 248-255.
Li et al., (2008) Direct carbon conversion in a helium fluidized bed fuel cell. Solid State Ionics 179(27-32): 1549-1552.
Liu et al., (2015) Review on carbon-based composite materials for capacitive deionization. RSC Adv 5: 15205-15225.
Massimilla and Donsi (1976) Cohesive forces between particles of fluid-bed catalysts. Powder Technology 15(2): 253-260.
Olowson and Almstedt (1991) Influence of pressure on the minimum fluidization velocity. Chemical Engineering Science 46(2): 637-640.
Park et al., (2016) Surface-modified spherical activated carbon for high carbon loading and its desalting performance in low-electrode capacitive deionization. RSC Adv 6: 69720-69727.
Petek et al., "Slurry Electrode for an All-Iron Flow Battery for Low Cost Large-Scale Energy Storage". 2013 AIChE Annual Meeting, Nov. 3-8, 2013; Hilton San Francisco Union Square, San Francisco, CA, USA. Retrieved from: https://aiche.confex.com/aiche/2013/webprogram/Paper335437.html on Sep. 19, 2019.
Petek et al., (2015) Slurry electrodes for iron plating in an all-iron flow battery. Journal of Power Sources. 294: 620-626.
Petek et al., (2016) Characterizing Slurry Electrodes Using Electrochemical Impedance Spectroscopy. J Electrochem Soc 163(1): A5001-A5009.
Porada et al., (2013) Direct prediction of the desalination performance of porous carbon electrodes for capacitive deionization. Energy Environ Sci 6: 3700-3712.
Porada et al., (2014) Carbon flow electrodes for continuous operation of capacitive deionization and capacitive mixing energy generation. J Mater Chem A 2: 9313-9321.
Presser et al., (2012) The Electrochemical Flow Capacitor: A New Concept for Rapid Energy Storage and Recovery. Advanced Energy Materials 2(7): 895-902. Special Issue: Battery Materials.
Richardson and Zaki (1997) Sedimentation and fluidisation: Part I. Chemical Engineering Research and Design 75 (Supplement): S82-S100.
Rommerskirchen et al., (2015) Single module flow-electrode capacitive deionization for continuous water desalination. Electrochemistry Communications 60: 34-37.
Seville et al., (2000) Interparticle forces in fluidisation: a review. Powder Technology 113(3): 261-268.
Skyllas-Kazacos et al., (2011) Progress in Flow Battery Research and Development. J Electrochem Soc 158(8): R55-R79.
Smith et al., (2014) Maximizing Energetic Efficiency in Flow Batteries Utilizing Non-Newtonian Fluids. J Electrochem Soc 161(4): A486-A496.
Suss et al., (2012) Capacitive desalination with flow-through electrodes. Energy Environ Sci 5: 9511-9519.

* cited by examiner

FLUIDIZED BED AND HYBRID SUSPENSION ELECTRODES FOR ENERGY STORAGE AND WATER DESALINATION SYSTEMS

FIELD OF THE INVENTION

The present invention is directed to fluidized bed and hybrid suspension electrodes for use in electrochemical energy storage and water desalination systems.

BACKGROUND OF THE INVENTION

The fields of energy storage by flow batteries and supercapacitors, and water desalination by capacitive deionization (CDI) are quickly emerging and will form the core of next-generation technologies. Traditional flow battery, supercapacitor, and CDI systems use solid, porous electrodes (often carbon-based), and liquid electrolytes flowed through or beside these electrodes. A fast emerging research topic in these fields has been the application of flowable suspension (or slurry) electrodes, which are flowing suspensions of carbon particles in an electrolyte. In flow batteries, the use of flowable suspension electrodes can be used to obtain exceptionally high energy densities, or to enable metal deposition chemistries with a highly scalable flow architecture [Duduta, M. et al., *Adv. Energy Mater.* 1, 511-516 (2011); Petek, T. J., Hoyt, N. C., Savinell, R. F. & Wainright, J. S., *J. Power Sources* 294, 620-626 (2015)]. In capacitive deionization, suspension electrodes enable a continuous desalination process which was not obtainable with solid electrodes, and they further enable the effective desalination of higher salinity feed streams [Jeon, S. et al., *Energy Environ. Sci.* 6, 1471 (2013)]. The slurry electrode was widely investigated for various flow battery and capacitive deionization applications in the past several years [Presser, V. et al., *Adv. Energy Mater.* 2, 895-902 (2012); Petek, T. J., Hoyt, N. C., Savinell, R. F. & Wainright, J. S., *J. Electrochem. Soc.* 163, A5001-A5009 (2016); Campos, J. W. et al., *Electrochim. Acta* 98, 123-130 (2013); Porada, S. et al., *J. Mater. Chem. A* 2, 9313 (2014)].

U.S. Pat. No. 4,126,733 is directed to a separator free electrochemical generator wherein one of the electrodes, particularly the anode, is formed of a particulate active material suspended within an electrolyte and which comprises means for causing the circulation of the suspension formed within the corresponding electrode compartment in contact with a current collector, wherein further the active material forms a coating on cores formed of an inert material, the separation of the opposite electrode compartments being achieved by the collector itself which is provided with holes having sizes sufficient for authorizing the free passage of the electrolyte, however lower than the size of the inert cores of said particles.

European Patent Application No. 2,605,326 relates to a continuous flow-electrode system, an energy storage system, and a water treatment method, wherein electrode active materials consecutively flow in a slurry state, whereby a high capacity is easily obtained without enlarging or stacking electrodes.

One feature preventing the widespread adoption of slurry electrodes is their low electronic conductivity, which is a result of electron transport occurring through the discontinuous particulate electrode. This results in high resistances, limiting the energy efficiency and performance of batteries and desalination cells using suspension electrodes. One clear pathway to improving slurry electrode conductivity is to improve the electrode carbon loading to enhance collision rates. However, slurry electrodes are limited to roughly 20 wt % carbon, as at said loading level the viscosity of the slurry rises to such a degree that it is no longer flowable [Hatzell, K. B., Boota, M. & Gogotsi, Y., *Chem. Soc. Rev.* 44, 8664-8687 (2015)].

U.S. Pat. No. 8,722,226 is directed to redox flow devices, which include a positive electrode current collector, a negative electrode current collector, and an ion-permeable membrane separating said positive and negative current collectors, positioned and arranged to define a positive electroactive zone and a negative electroactive zone; wherein at least one of said positive and negative electroactive zone comprises a flowable semi-solid composition comprising ion storage compound particles capable of taking up or releasing said ions during operation of the cell, and wherein the ion storage compound particles have a polydisperse size distribution in which the finest particles present in at least 5 vol % of the total volume, is at least a factor of 5 smaller than the largest particles present in at least 5 vol % of the total volume. The redox flow device can include an inlet for introduction of a flowable semi-solid composition into the positive/negative electroactive zone and an outlet for the exit of the flowable semi-solid composition out of the positive/negative electroactive zone.

Another suspension electrode type that has been investigated for its potential use in electrochemical systems is a fluidized bed electrode. A fluidized bed is formed when a quantity of a solid particulate substance (usually present in a holding vessel) is placed under appropriate conditions to cause a solid/fluid mixture to behave as a fluid. Said fluid behavior is usually achieved by the introduction of pressurized fluid through the particulate medium. The obtained fluidized solid has various properties and characteristics of normal fluids, such as the ability to free-flow under gravity or to be pumped using fluid type technologies. Due to the high mass transfer coefficient, good contact among reactants and large electrode area, fluidized bed electrodes have been widely used in chemical process industry, such as fermentation, metallurgy, energy conversion, and wastewater treatment.

The use of fluidized bed electrodes was evaluated in zinc-oxide secondary batteries and fuel cells based on different organic fuels [T. Berent et al., *Nature*, 223, 1054-1055 (1969); J. R. Backhurst, et al., *Nature*, 221, 55-56 (1969); T. Berent et al., *J. Appl. Chem. Biotechnol.*, 21, 71-76 (1971)]. Typically, the fluidized particular substance included glass beads coated with a suitable catalyst and fluidized by the aqueous electrolyte of the cell. Fluidized bed electrodes were also evaluated for their potential use in high temperature fuel cells, such as Molten Carbonate Fuel Cells (MCFCs) and Solid Oxide Fuel Cells (SOFCs) [J. Zhang et al., *The Canadian Journal of Chemical Engineering*, 93, 494-499 (2015); S. Li et al., *Solid State Ionics* 179, 1549-1552 (2008)]. In such fuel cells, which incorporate solid-based electrolytes, the particulate substance included metal, metal oxide and carbon particles and the fluidizing medium included inert and reactive gases, such as He, $N_2$ and $CO_2$.

Chinese Patent Application No. 102324539 is directed to a fluid bed electrode direct carbon fuel cell device comprising a fluid bed, two or more tubular single cells, collector plates, a composite carbon fuel, a gas circulating device, a screw feeder and a fuel tank. The fluidized bed can include carbon fuel suspended by the fluidizing gas.

US Patent Application publication No. 2014/0227574 is directed to an iron based redox flow cell comprising a first electrolyte providing a source of $Fe^{2+}$ ions and an electrode disposed within the first half-cell; a second half-cell comprising a second electrolyte providing a source of $Fe^{2+}$ and $Fe^{3+}$ ions and an electrode disposed within the second half-cell; and a separator between the first and second half-cells, where (a) the second electrolyte comprises a $Fe^{3+}$ stabilizing agent; (b) the first electrolyte comprises a hydrogen evolution suppressing agent; or (c) the first electrolyte comprises a hydrogen evolution suppressing agent, and the second electrolyte comprises a $Fe^{3+}$ stabilizing agent. A system for decoupling the power/energy at the anode comprises employing a slurry electrode or fluidized bed electrode as the negative electrode. The slurry comprises particles sufficient to impart electrode conductivity to the electrolyte. Suitable particles include carbon-based, e.g., graphitic, particles, iron particles, iron coated particles, or a combination of two or more thereof.

Additional application of the fluidized bed electrodes was reported for potential-dependent elimination of nitrate ions from neutral aqueous solutions. Electrodes used in this study included synthetic granulated carbons fluidized by liquid electrolyte [Yu. Basova, H. Kanoh, K. Ooi, The American Carbon Society, Carbon Conference 2001 Proceedings].

Despite the research in the field of fluidized bed electrodes for electrochemical applications, which dates back to the late sixties, to the inventors' best knowledge, no energy conversion or storage systems and water desalination systems based on fluidized bed electrodes are commercially available up to date.

The low electrode conductivity of suspension electrodes results in much lower performance (lower power density and round trip energy efficiency) when compared to batteries with traditional solid electrodes. Furthermore, as a result of low electrode conductivity, a large portion of the redox metal gets deposited onto the current collector, and so the fluidized bed electrodes do not serve a useful purpose. Improving the electrode conductivity is an essential step forward for the energy storage technology to be viable. The same problem holds back the desalination performance, as the low electrode conductivity leads to high energy losses and high energy requirements for water desalination. Energy requirements need to be reduced to make the slurry electrode technology competitive in the desalination space.

There remains, therefore, an unmet need for highly conductive suspension electrodes, which would enable production of efficient energy storage and water desalination systems.

SUMMARY OF THE INVENTION

The present invention provides electrochemical electrodes, devices and systems, comprising at least one electrode compartment and at least one tube in fluid-flow connection with the electrode compartment, the electrode compartment comprising conductive particles, which sediment under gravitational force and a liquid fluidizing medium in which said conductive particles are suspended. Without wishing to being bound by theory or mechanism of action, it is contemplated that the combination of the gravitational force acting on the conductive particles, which are configured to sediment and the flow of the fluidizing medium, form densely packed flowing suspension in the electrode compartment, also termed herein "fluidized bed electrode". As such, the flow of the conductive particles, which sediment under gravitational force, is retarded relatively to the flow rate of the fluidizing medium.

The inventors have unexpectedly found that addition of conductive particles which do not sediment under gravitational force but rather are entrained by the fluidizing medium, to the fluidized electrode, significantly increased the electrical conductivity of the electrode compartment of the electrochemical device. Thus, the present invention further provides electrodes, devices and systems comprising at least one electrode compartment which in addition to the conductive particles, which sediment under gravitational force comprises conductive particles, which do not sediment under gravitational force. Said electrode compartment is also termed herein a "hybrid suspension electrode", "hybrid electrode" or "combined electrode". The electrode compartment comprising the conductive particles which do not sediment under gravitational force and are entrained by the fluidizing medium, as the sole particulate material, is termed herein "slurry electrode".

Unexpectedly, the increase in the electrical conductivity of the hybrid suspension electrode was synergistic, as compared to the electrical conductivity of the corresponding fluidized bed electrode and of the slurry electrode having similar conductive particles' loading, when tested in the same electrochemical cell. In particular, the conductivity of the hybrid suspension electrode was higher by about three orders of magnitude than that of the slurry electrode and by up to one order of magnitude than that of the fluidized bed electrode.

It was further found that the combination of the fluidized bed electrode and the slurry electrode to produce a hybrid electrode provided synergistically enhanced conductivity when the conductivity of the slurry electrode was not more than one order of magnitude higher than the conductivity of the fluidized bed electrode. Without wishing to being bound by theory or mechanism of action, it is contemplated that the conductive particles of the dense fluidized bed may negatively disrupt electron conduction pathways through the dilute slurry having an extremely higher conductivity than the fluidized bed electrode.

Thus, in one aspect, there is provided an electrochemical device, comprising a first current collector; a second current collector; at least one separator; at least one electrode compartment positioned between said first or second current collectors and the separator; and at least one tube in fluid-flow connection with the electrode compartment, the electrode compartment comprising conductive particles, which sediment under gravitational force and a liquid fluidizing medium in which said conductive particles are suspended, wherein the loading of the conductive particles in the electrode compartment is at least about 50% higher than in the tube. It is to be emphasized that the fluidizing medium flows through the electrode compartment in a non-horizontal direction.

According to some embodiments, the conductive particles which sediment under gravitational force are characterized by Archimedes number of order 1 or higher.

The conductive particles can be selected from ion-conducting particles and electrically conductive particles. The conductive particles can further be selected from the group consisting of porous particles, high-surface area particles, core-shell particles, and solid particles. In some embodiments, the conductive particles have a shape selected from the group consisting of spherical, cubic, tubular, fibrous, fullerene, and any combination thereof. Each possibility represents a separate embodiment of the invention.

In some embodiments, the conductive particles comprise a material selected from the group consisting of carbon, graphite, metal, metal carbide, metal nitride, metal oxide, polymer, and any combination thereof. Each possibility represents a separate embodiment of the invention.

In some exemplary embodiments, the conductive particles comprise carbon. Carbon can be selected from activated carbon, carbon black, graphitic carbon, carbon beads, carbon fibers, carbon microfibers, fullerenic carbons, carbon nanotubes (CNTs), graphene sheets or aggregates of graphene sheets, and materials comprising fullerenic fragments and any combination thereof. Each possibility represents a separate embodiment of the invention. The carbon nanotubes can include multiwall carbon nanotubes (MWCNTs) or single wall carbon nanotubes (SWCNTs).

In certain embodiments, the conductive particles comprise carbon beads. In some embodiments, the conductive particles comprise carbon nanotubes. In further embodiments, the conductive particles comprise MWCNTs.

According to some embodiments, the conductive particles are configured to adsorb, absorb, intercalate, catalyze redox reaction and/or induce deposition of an ion. In some embodiments, the conductive particles further comprise a redox species on the surface or in the bulk thereof. Said redox species can be selected from a metal ion, hydrogen ion or hydroxyl ion. In certain embodiments, the metal ion is selected from the group consisting of zinc, iron, vanadium, chromium, lithium, sodium, magnesium, aluminum, nickel, calcium, lead, copper, cesium, cadmium ions and any combination thereof. In some embodiments, the metal ion is deposited, adsorbed, absorbed or intercalated into the conductive particles. The metal ion can be in a reduced form, in a form of a salt or a ceramic material. Each possibility represents a separate embodiment of the invention.

In some embodiments, the loading of the conductive particles in the electrode compartment is above about 15% wt. In further embodiments, the loading of the conductive particles in the electrode compartment is above about 20% wt.

In some embodiments, the mean particle size of the conductive particles ranges from about 10 μm to about 500 μm. In some embodiments, the bulk density of the conductive particles ranges from about 100 kg/m$^3$ to about 10.000 kg/m$^3$.

In some embodiments, the conductive particles comprise carbon and the loading of the conductive particles in the electrode compartment is above about 20% wt. In certain embodiments, the conductive particles comprise carbon and the loading of the conductive particles in the electrode compartment is above about 30% wt. In further embodiments, the mean particle size of the conductive particles is at least about 50 μm.

In some embodiments, the conductive particles comprise carbon beads having a mean particle size ranging from about 100 μm to about 300 μm.

In some embodiments, the conductive particles comprise CNTs having a length of about 1 μm to about 500 μm. In some embodiments, the MWCNTS have a mean thickness (i.e. outer diameter) ranging from about 20 nm to about 500 nm. In additional embodiments, the CNTs are present in the electrode compartment in the form of agglomerates having a mean agglomerate size ranging from about 50 μm to about 500 μm.

In some embodiments the angle between the direction of the flow of the fluidizing medium and the direction of the sedimentation flow of the conductive particles is above 90°. In certain embodiments, the angle between the direction of the flow of the fluidizing medium and the direction of the sedimentation flow of the conductive particles is about 180°. In further embodiments, the angle between the direction of the flow of the fluidizing medium and the direction of the sedimentation flow of the conductive particles is below about 270°.

In some embodiments, the loading of the conductive particles in the electrode compartment is at least about 70% higher than in the at least one tube. In some embodiments, the loading of the conductive particles in the electrode compartment is at least 90% higher than in the at least one tube.

According to some embodiments, the separator is selected from the group consisting of a membrane, spacer, gasket and combinations thereof. Each possibility represents a separate embodiment of the invention. The gasket can include a porous gasket. The spacer can include a porous spacer. In some embodiments, the separator is a membrane. In certain embodiments, the membrane is an ion-permeable membrane.

The device according to the principles of the present invention can further comprise a solid electrode. Alternatively, the device can comprise two electrode compartments and two tubes.

In another aspect there is provided an energy storage system comprising the electrochemical device according to the various embodiments presented hereinabove, the device comprising conductive particles, which sediment under gravitational force; and at least one external storage tank, which is in fluid flow connection with the at least one tube.

In some embodiments, the storage tank is configured to store the conductive particles and/or the fluidizing medium prior to the electrochemical operation of the system. In further embodiments, the storage tank is configured to deliver the conductive particles and/or the fluidizing medium to the at least one tube prior to the electrochemical operation of the system. In additional or alternative embodiments, the storage tank is further configured to store, deliver and/or receive the redox species.

In some embodiments, the separator is an ion-permeable membrane.

In some embodiments, the fluidizing medium comprises an electrolyte. The electrolyte can be an aqueous-based electrolyte or an organic solvent-based electrolyte. Each possibility represents a separate embodiment of the invention. In some embodiments, the fluidizing medium further comprises the redox species. In further embodiments, the fluidizing medium comprises a metal ion, a hydrogen ion or a hydroxyl ion. Each possibility represents a separate embodiment of the invention.

The energy storage system can be configured in a form selected from a flow battery, a supercapacitor or a capacitive mixing system. In certain embodiments, the energy storage system is configured in a form of a flow battery. The flow battery can selected from the group consisting of a zinc-bromine flow battery, hydrogen-bromine, quinone-bromine, vanadium-bromine, all quinone, all-iron flow battery, vanadium redox flow battery, lithium-ion flow battery, lithium-sulfur, sodium ion, sodium-sulfur flow battery, lead-acid flow battery, and nickel metal hydride flow battery. Each possibility represents a separate embodiment of the invention.

In certain embodiments, the energy storage system is in a form of a zinc-bromine flow battery comprising an electrode compartment comprising carbon particles and zinc ions solution. In certain embodiments, carbon particles have a mean particle size of at least about 50 μm. In further embodiments, the loading of carbon is at least about 30% wt. In still further embodiments, the energy storage system being in a form of a zinc-bromine flow battery further comprises an electrode compartment comprising carbon particles and bromine solution. In certain embodiments, the two electrode compartments comprise carbon particles having the same loadings and/or the same mean particle sizes. In some exemplary embodiments, said carbon particles are MWCNTs present in the form of agglomerates in the electrode compartment.

In still another aspect there is provided a water desalination system comprising the electrochemical device according to the various embodiments presented hereinabove, the device comprising conductive particles, which sediment under gravitational force; and a feed tank. In some embodiments, the feed tank comprises a mixing vessel, which is in fluid flow connection with the at least one tube. In further embodiments, the mixing vessel is configured to mix the fluidizing medium with the conductive particles. In further embodiments, the water desalination system further comprises a brine tank and a product tank.

According to some embodiments, the water desalination system comprises two separators. In further embodiments, the water desalination system comprises two ion-permeable membranes. In additional embodiments, the water desalination system comprises an anion exchange membrane and a cation exchange membrane.

In some embodiments, the fluidizing medium comprises a feed solution. The feed solution can be aqueous-based or organic-based. Each possibility represents a separate embodiment of the invention. In certain embodiments, the feed tank comprises the feed solution. In further embodiments, the feed tank comprises the second group of particles.

In certain embodiments, the water desalination system is configured in a form of a Capacitive Deionization (CDI) system, comprising two electrode compartments comprising carbon particles and feed solution. In certain embodiments, carbon particles have a mean particle size of at least about 50 µm. In further embodiments, the loading of carbon particles is at least about 30% wt. In additional embodiments, the CDI system comprises two ion-permeable membranes.

In yet another aspect of the invention there is provided an electrode for use in an electrochemical device, the electrode comprising an electrode compartment and a tube being in fluid-flow connection with the electrode compartment, the electrode compartment comprising a first group of particles comprising conductive particles, which sediment under gravitational force, a second group of particles comprising conductive particles, which do not sediment under gravitational force and a liquid fluidizing medium in which said conductive particles are suspended, wherein the loading of the first group of particles in the electrode compartment is at least about 50% higher than in the tube.

In some embodiments, the ratio between the conductivity of the first group of particles and the conductivity of the second group of particles is above about 1:10, when each group of particles is used individually in the electrode compartment.

In some embodiments, the ratio between the mass of the conductive particles which sediment under gravitational force and the mass of the conductive particles which do not sediment under gravitational force is above about 3:1.

In some embodiments, the bulk density of the first group of particles is higher than the bulk density of the second group of particles by at least about 50%. In additional embodiments, the mean particle size of the first group of particles is higher than the mean particle size of the second group of particles by at least about 50%.

In some embodiments, the conductive particles comprise a material selected from the group consisting of carbon, graphite, metal, metal carbide, metal nitride, metal oxide, polymer, and any combination thereof. Carbon can be selected from the group consisting of activated carbon, carbon black, graphitic carbon, carbon beads, carbon fibers, carbon microfibers, fullerenic carbons, carbon nanotubes (CNTs), graphene sheets or aggregates of graphene sheets, and materials comprising fullerenic fragments and any combination thereof. The carbon nanotubes can include multi-wall carbon nanotubes (MWCNTs) or single wall carbon nanotubes (SWCNTs). In certain embodiments, the first group of particles comprises carbon beads and the second group of particles comprises activated carbon. In certain embodiments, the second group of particles does not include MWCNTs. In additional embodiments, the second group of particles does not include CNTs.

In some embodiments, the conductive particles further comprise a redox species on the surface or in the bulk thereof. The redox species can comprise a metal ion selected from the group consisting of zinc, iron, vanadium, chromium, lithium, sodium, magnesium, aluminum, nickel, calcium, lead, copper, cesium, cadmium ions and any combination thereof.

In some embodiments, the mean particle size of the first group of particles ranges from about 10 µm to about 500 µm. In additional embodiments, the mean particle size of the second group of particles ranges from about 0.5 µm to about 100 µm.

In some embodiments, the bulk density of the first group of particles ranges from about 2000 kg/m$^3$ to about 10,000 kg/m$^3$. In additional embodiments, the bulk density of the second group of particles ranges from about 30 kg/m$^3$ to about 10,000 kg/m$^3$.

In some exemplary embodiments, the first group of particles comprises carbon beads having a mean particle size of at least about 50 µm and the second group of particles comprises activated carbon having a mean particle size below about 30 µm.

The loading of the first group of particles in the electrode compartment can be higher than the loading of the second group of particles by at least about 50%. In some embodiments, the loading of the first group of particles in the electrode compartment is above about 20% wt. and the loading of the second group of particles in the electrode compartment is below about 10% wt. In further embodiments, the loading of the second group of particles in the electrode compartment is essentially the same as in the tube.

In still another aspect of the invention there is provided an electrochemical device, comprising a first current collector; a second current collector; at least one separator; at least one electrode compartment positioned between said first or second current collectors and the separator; and at least one tube in fluid-flow connection with the electrode compartment, the electrode compartment comprising a first group of particles comprising conductive particles, which sediment under gravitational force, a second group of particles comprising conductive particles, which do not sediment under gravitational force and a liquid fluidizing medium in which said conductive particles are suspended, wherein the loading of the first group of particles in the electrode compartment is at least about 50% higher than in the tube. It is to be emphasized that the fluidizing medium flows through the electrode compartment in a non-horizontal direction.

According to some embodiments, the ratio between the conductivity of the first group of particles and the conductivity of the second group of particles is above about 1:10, when each group of particles is used individually in the at least one electrode compartment. In further embodiments, the ratio between the conductivity of the first group of particles and the conductivity of the second group of particles is above about 1:1. In still further embodiments, the ratio between the conductivity of the first group of particles and the conductivity of the second group of particles is above about 10:1. In yet further embodiments, the ratio between the conductivity of the first group of particles and the conductivity of the second group of particles is about 100:1.

According to some embodiments, the ratio between the mass of the conductive particles which sediment under gravitational force and the mass of the conductive particles which do not sediment under gravitational force is above about 3:1. According to further embodiments, the ratio between the mass of the conductive particles which sediment under gravitational force and the mass of the conductive particles which do not sediment under gravitational force is above about 5:1. According to still further embodiments, the ratio between the mass of the conductive particles which sediment under gravitational force and the mass of the conductive particles which do not sediment under gravitational force is above about 10:1.

The conductive particles which sediment under gravitational force can be characterized by Archimedes number of order 1 or higher. The conductive particles which do not sediment under gravitational force can be characterized by Archimedes number of order 0.1 or lower.

In some embodiments the bulk density of the first group of particles is higher than the bulk density of the second group of particles by at least about 50%. In some embodiments, the mean particle size of the first group of particles is higher than the mean particle size of the second group of particles by at least about 50%.

The first group of particles and the second group of particles can be made of the same material or of different materials. Each possibility represents a separate embodiment of the invention. In some embodiments, the first group of particles and the second group of particles comprise different materials and the density of the material of the first group of particles is higher than the density of the material of the second group of particles by at least about 50%.

The conductive particles can be selected from ion-conducting particles and electrically conductive particles. The conductive particles can further be selected from the group consisting of porous particles, high-surface area particles, core-shell particles, and solid particles. In some embodiments, the conductive particles have a shape selected from the group consisting of spherical, cubic, tubular, fibrous, fullerene, and any combination thereof. Each possibility represents a separate embodiment of the invention.

In some embodiments, the conductive particles comprise a material selected from the group consisting of carbon, graphite, metal, metal carbide, metal nitride, metal oxide, polymer, and any combination thereof. Each possibility represents a separate embodiment of the invention.

In certain embodiments, the first group of particles comprises metal and the second group of particles comprises carbon. In certain embodiments, the first group of particles comprises metal oxide and the second group of particles comprises carbon In some exemplary embodiments, the conductive particles comprise carbon. Carbon can be selected from activated carbon, carbon black, graphitic carbon, carbon beads, carbon fibers, carbon microfibers, fullerenic carbons, carbon nanotubes (CNTs), graphene sheets or aggregates of graphene sheets, and materials comprising fullerenic fragments and any combination thereof. Each possibility represents a separate embodiment of the invention. The carbon nanotubes can include multiwall carbon nanotubes (MWCNTs) or single wall carbon nanotubes (SWCNTs).

In some embodiments, the conductive particles comprise carbon beads and/or activated carbon. In further embodiments, the first group of particles comprises carbon beads. In still further embodiments, the second group of particles comprises activated carbon. In certain embodiments, the second group of particles does not include MWCNTs. In additional embodiments, the second group of particles does not include CNTs.

According to some embodiments, the conductive particles are configured to adsorb, absorb, intercalate, catalyze redox reaction and/or induce deposition of an ion. In certain embodiments, the first group of particles is configured to adsorb, absorb, intercalate, catalyze redox reaction and/or induce deposition of an ion. Each possibility represents a separate embodiment of the invention. In some embodiments, the second group of particles is configured to increase the electric conductivity of the at least one electrode compartment, comprising the first group of particles.

In some embodiments, the conductive particles further comprise a redox species on the surface or in the bulk thereof. Said redox species can be selected from a metal ion, hydrogen ion or hydroxyl ion. Each possibility represents a separate embodiment of the invention. In certain embodiments, the metal ion is selected from the group consisting of zinc, iron, vanadium, chromium, lithium, sodium, magnesium, aluminum, nickel, calcium, lead, copper, cesium, cadmium ions, and any combination thereof. In some embodiments, the metal ion is deposited, adsorbed, absorbed or intercalated into the conductive particles. The metal ion can be in a reduced form, in a form of a salt or a ceramic material. Each possibility represents a separate embodiment of the invention.

In some embodiments, the loading of the first group of particles in the electrode compartment is higher than the loading of the second group of particles by at least about 50%. In some embodiments, the loading of the second group of particles in the electrode compartment is essentially the same as in the tube.

In some embodiments, the total loading of the conductive particles in the electrode compartment is above about 15% wt. In some embodiments, the total loading of the conductive particles in the electrode compartment is above about 20% wt. In some embodiments, the loading of the first group of particles in the electrode compartment is above about 15% wt. In further embodiments, the loading of the first group of particles in the electrode compartment is above about 20% wt. In still further embodiments, the loading of the second group of particles in the electrode compartment is below about 10% wt. In still further embodiments, the loading of the second group of particles in the electrode compartment ranges from about 3.5% wt. to about 10% wt.

In some embodiments, the loading of the first group of particles in the electrode compartment is at least about 70% higher than in the at least one tube. In certain embodiments, the loading of the first group of particles in the electrode compartment is at least about 90% higher than in the at least one tube.

In some embodiments, the mean particle size of the first group of particles ranges from about 10 μm to about 500 μm. In some embodiments, the mean particle size of the second group of particles ranges from about 0.5 μm to about 100 μm.

In some embodiments, the bulk density of the first group of particles ranges from about 100 kg/m$^3$ to about 10,000 kg/m$^3$. In some embodiments, the bulk density of the second group of particles ranges from about 30 kg/m$^3$ to about 10,000 kg/m$^3$.

In certain embodiments, the conductive particles comprise carbon and the total loading of the conductive particles in the electrode compartment is above about 30% wt. In further embodiments, the mean particle size of the first group of particles is at least about 50 μm. In still further embodiments, the mean particle size of the second group of particles is below about 30 μm.

In some exemplary embodiments, the first group of particles comprises carbon beads having a mean particle size of at least about 50 μm and the second group of particles comprises activated carbon having a mean particle size below about 30 μm. In additional embodiments, the carbon beads have a mean particle size ranging from about 100 μm to about 300 μm and the activated carbon has particle size ranging from about 1 μm to about 50 μm.

In some embodiments the angle between the direction of the flow of the fluidizing medium and the direction of the sedimentation flow of the conductive particles is above 90°. In certain embodiments, the angle between the direction of the flow of the fluidizing medium and the direction of the sedimentation flow of the conductive particles is about 180°.

According to some embodiments, the separator is selected from the group consisting of a membrane, spacer, gasket and combinations thereof. Each possibility represents a separate embodiment of the invention. The gasket can include a porous gasket. The spacer can include a porous spacer. In some embodiments, the separator is a membrane. In certain embodiments, the membrane is an ion-permeable membrane.

The device according to the principles of the present invention can further comprise a solid electrode. Alternatively, the device can comprise two electrode compartments and two tubes.

In yet another aspect there is provided an energy storage system comprising the electrochemical device according to the various embodiments presented hereinabove, the device comprising the first and the second groups of particles, and at least one external storage tank, which is in fluid flow connection with the at least one tube.

In some embodiments, the storage tank is configured to store the conductive particles and/or the fluidizing medium prior to the electrochemical operation of the system. In further embodiments, the storage tank is configured to deliver the conductive particles and/or the fluidizing medium to the at least one tube prior to the electrochemical operation of the system. In still further embodiments, the storage tank is configured to store and/or to deliver the first group of particles to the at least one tube prior to the electrochemical operation of the system. In yet further embodiments, the storage tank is configured to deliver the second group of particles and/or the fluidizing medium to the at least one tube during the electrochemical operation of the system. In additional or alternative embodiments, the storage tank is further configured to store, deliver and/or receive the redox species.

In some embodiments, the fluidizing medium comprises an electrolyte. The electrolyte can be an aqueous-based electrolyte or an organic solvent-based electrolyte. Each possibility represents a separate embodiment of the invention. In some embodiments, the fluidizing medium further comprises a redox metal ion, hydrogen ion or hydroxyl ion.

The energy storage system can be configured in a form selected from a flow battery, a supercapacitor or a capacitive mixing system. In certain embodiments, the energy storage system is configured in a of a flow battery. The flow battery can selected from the group consisting of a zinc-bromine flow battery, hydrogen-bromine, quinone-bromine, vanadium-bromine, all quinone, all-iron flow battery, vanadium redox flow battery, lithium-ion flow battery, lithium-sulfur, sodium ion, sodium-sulfur flow battery, lead-acid flow battery, and nickel metal hydride flow battery. Each possibility represents a separate embodiment of the invention.

In certain embodiments, the energy storage system is configured in a form of a zinc-bromine flow battery comprising an electrode compartment comprising the first group of particles comprising carbon particles, the second group of particles comprising carbon particles, and zinc ions solution. In some embodiments, the first group of particles comprising carbon particles has a mean particle size of at least about 50 μm and/or the second group of particles comprising carbon particles has a mean particle size of below about 30 μm. In further embodiments, the total loading of the carbon particles is at least about 30% wt. In still further embodiments, the energy storage system being in a form of a zinc-bromine flow battery further comprises an electrode compartment comprising the first group of particles comprising carbon particles, the second group of particles comprising carbon particles, and bromine solution. In certain embodiments, the two electrode compartments comprise carbon particles having the same loadings and/or the same mean particle sizes.

In still another aspect there is provided a water desalination system comprising the electrochemical device according to the various embodiments presented hereinabove, the device comprising the first and the second groups of particles, and a feed tank.

In some embodiments, the feed tank comprises a mixing vessel, which is in fluid flow connection with the at least one tube. In further embodiments, the mixing vessel is configured to mix the fluidizing medium with the conductive particles. In still further embodiments, the mixing vessel is configured to mix the fluidizing medium with the first group of particles.

In some embodiments, the fluidizing medium comprises a feed solution. The feed solution can be aqueous-based or organic-based. Each possibility represents a separate embodiment of the invention. In certain embodiments, the feed tank comprises the feed solution. In further embodiments, the feed tank comprises the second group of particles.

In some embodiments, the water desalination system further comprises a brine tank and a product tank.

According to some embodiments, the water desalination system comprises two separators. In further embodiments, the water desalination system comprises two ion-permeable membranes. In additional embodiments, the water desalination system comprises an anion exchange membrane and a cation exchange membrane.

In some embodiments, the water desalination system is configured in a form of a Capacitive Deionization (CDI) system, comprising two electrode compartments comprising the first group of particles comprising carbon particles, the second group of particles comprising carbon particles, and feed solution. In some embodiments, the first group of particles comprising carbon has a mean particle size of at least about 50 μm and/or the second group of particles comprising carbon has a mean particle size of below about 30 μm. In further embodiments, the total loading of the carbon particles is at least about 30% wt. In additional embodiments, the CDI system comprises two ion-permeable membranes.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
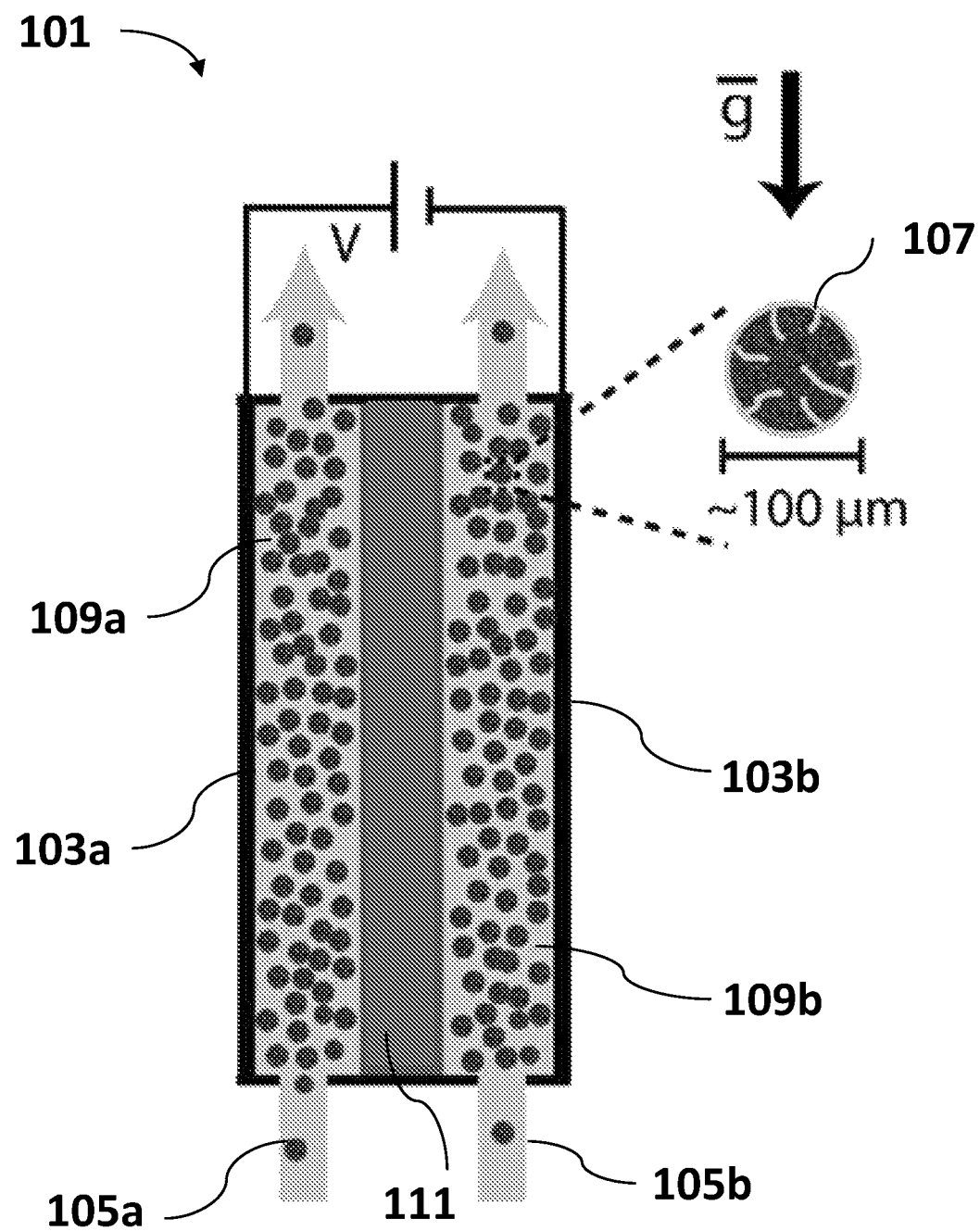
FIG. 1: Schematic representation of the electrochemical device for use in energy storage, including fluidized bed electrodes, wherein the fluidized bed electrodes include carbon particles with a mean particle size of above 100 μm, which is higher than the typical slurry electrodes and flow is against gravity in order to leverage the effect of gravity to fluidized the carbon particles into a dense electrode structure.

The present invention provides an electrode and an electrochemical device, comprising at least one electrode compartment and at least one tube in fluid-flow connection with the electrode compartment, the electrode compartment comprising conductive particles, which sediment under gravitational force and a liquid fluidizing medium in which said conductive particles are suspended. The electrodes and electrochemical devices according to the principles of the present invention are designed to leverage the effect of gravitational force to sediment the solid particles relative to the flowing fluidizing medium, such that at least 50% of the total mass of conductive particles present in the system are not entrained by the fluidizing medium. Without wishing to being bound by theory or mechanism of action, it is contemplated that the combination of the gravitational force acting on the conductive particles, which are configured to sediment and the flow of the fluidizing medium form densely packed flowing suspension in the electrode compartment. As a result, fluidized bed electrodes are formed, which enable more densely packed electrode structures than slurry electrodes.

The present invention is based in part on an unexpected finding that the use of said densely packed flowing suspension of the conductive particles rather than the slurry-based electrodes, in which the particulate substance is entrained by electrolyte, allowed increasing the particulate substance loading above the conventional 20% wt., wherein the particulate substance included carbon beads. It was not previously realized that fluidized bed electrodes can be used in energy storage and water desalination systems, and in particular in flow batteries and capacitive deionization (CDI) flow batteries to increase the conductive particles loading of the suspension electrodes, thereby increasing the electrical conductivity of the flow electrodes. The inventors have demonstrated a breakthrough in suspension electrodes, achieving a flowable electrode with up to 35 wt % loading by leveraging upflow fluidized bed electrodes [G. J. Doornbusch, J Dykstra, P M Biesheuvel, M E Suss. "Capacitive deionization with fluidized bed electrodes" Journal of Materials Chemistry A, 4, 3642-3647, 2016]. The unique properties of fluidized bed (such as a surprisingly high conductive particles' loading) allowed overcoming the limitations of previously-used flow electrodes. Crucially, it was found that while exceptionally high carbon loading was achieved in the electrode compartments (nearly double the carbon loading achievable in typical slurry electrodes), carbon loading in the surrounding flow system (including tubes, which are in fluid flow connection with the electrode compartment) remained very low (such as, for example, about 2.5 wt %), thus preventing clogging of the flow system and minimizing pumping requirements. The inventors have further demonstrated the use of fluidized bed electrodes for water desalination by CDI, which is also termed herein "fluidized bed capacitive deionization (Fbed CDI)". It was shown that the CDI system comprising fluidized bed electrodes could continuously desalinate feed solution for several days while using a novel, low infrastructure, and robust closed-loop system to regenerate and re-use the electrodes. The inventors have further evaluated the fluidized bed electrodes of the invention in energy storage applications, including zinc-bromine flow battery. It was further shown by the inventors of the present invention that multi-walled carbon nanotubes can also be used in the fluidized bed electrodes despite their nanoscale characteristic dimensions.

The inventors have further unexpectedly found that addition of conductive particles which do not sediment under gravitational force but rather are entrained by the fluidizing medium, to the electrode compartment, significantly increased the electrical conductivity of the electrode compartment of the electrochemical device. Instead of using a liquid electrolyte, the inventors seeded the electrolyte with small (such as, for example about 10 μm) conductive particles, thereby forming a slurry. Thus, the present invention further provides an electrode and electrochemical device, comprising at least one electrode compartment and at least one tube in fluid-flow connection with the electrode compartment, the electrode compartment comprising a first group of particles comprising conductive particles, which sediment under gravitational force, a second group of particles comprising conductive particles, which do not sediment under gravitational force and a liquid fluidizing medium in which said conductive particles are suspended. Accordingly, in some embodiments, the electrode compartment comprises a mixture of conductive particles, which sediment in the electrode compartment and conductive particles, which do not sediment in the electrode compartment under gravitational force. The conductive particles which do not sediment (i.e., the second group of particles) are entrained by the fluidizing medium, while the first group of particles is strongly affected by gravitational force, such that their flow is retarded relatively to the flow of the fluidizing medium and the first group of particles, thereby forming and maintaining the fluidized bed structure. Without wishing to being bound by theory or mechanism of action it is contemplated that the presence of the particles which do not sediment under gravitational force enhance interparticle collision rates and drastically enhance the conductivity of the electrodes. Unexpectedly, the increase in the electrical conductivity of the hybrid suspension electrode was synergistic, as compared to the electrical conductivity of the fluidized bed electrode and of the slurry electrode having the same conductive particles' loading, when tested in the same electrochemical cell.

Thus, in one aspect of the invention, there is provided an electrode for use in an electrochemical device, the electrode comprising an electrode compartment and a tube being in fluid-flow connection with the electrode compartment, the electrode compartment comprising a first group of particles comprising conductive particles, which sediment under gravitational force, a second group of particles comprising conductive particles, which do not sediment under gravitational force and a liquid fluidizing medium in which said conductive particles are suspended, wherein the loading of the first group of particles in the electrode compartment is at least about 50% higher than in the tube.

In another aspect the present invention provides an electrochemical device comprising a first current collector; a second current collector; at least one separator; at least one electrode compartment positioned between said first or second current collectors and the separator; and at least one tube in fluid-flow connection with the electrode compartment, the electrode compartment comprising conductive particles, which sediment under gravitational force and a liquid fluidizing medium in which said conductive particles are suspended, wherein the fluidizing medium flows through the electrode compartment in a non-horizontal direction and the loading of the conductive particles in the electrode compartment is at least about 50% higher than in the tube.

In yet another aspect, there is provided an electrochemical device, comprising a first current collector; a second current collector; at least one separator; at least one electrode compartment positioned between said first or second current collectors and the separator; and at least one tube in fluid-flow connection with the electrode compartment, the electrode compartment comprising a first group of particles comprising conductive particles, which sediment under gravitational force, a second group of particles comprising conductive particles, which do not sediment under gravitational force and a liquid fluidizing medium in which said conductive particles are suspended, wherein the fluidizing medium flows through the electrode compartment in a non-horizontal direction and the loading of the first group of particles in the electrode compartment is at least about 50% higher than in the tube.

The term "loading", as used herein, refers to the proportion of the weight of the conductive particles in the total weight of the fluidizing medium and the conductive particles. The term "loading", as used herein in connection with the particles which sediment under gravitational force, refers in some embodiments to the loading of said particles in the electrode compartment at a superficial velocity of the fluidizing medium of 0.4 mm/s or lower.

The term "sediment under gravitational force", as used herein, refers to the sedimentation in the electrode compartment under the flow of the fluidizing medium. It is to be emphasized that sedimentation of the conductive particles under gravitational force combined with the flow of the fluidizing medium results in the flow of the conductive particles, which is retarded relatively to the flow rate of the fluidizing medium. In some embodiments the term "sediment under gravitational force", refers to the conductive particles having a relative velocity in the electrode compartment of less than 0.95. In other words, the particle velocity is at most 95% of the velocity of the adjacent fluidizing medium. In further embodiments the term "sediment under gravitational force", refers to the conductive particles having a relative velocity in the electrode compartment of less than 0.9, less than 0.8, less than 0.7, less than 0.6, less than 0.5, less than 0.4. or less than 0.3. Each possibility represents a separate embodiment of the invention. The term "relative velocity", as used herein, refers to the ratio of the local velocity of the conductive particles and the fluidizing medium.

The term "do not sediment under gravitational force", as used herein, refers to the lack of sedimentation in the electrode compartment under the flow of the fluidizing medium. The conductive particles which do not sediment under gravitational force are thus entrained by the flow of the fluidizing medium. As such, the flow rate of the conductive particles which do not sediment under gravitational force is essentially the same as the flow rate of the fluidizing medium. In some embodiments the term "do not sediment under gravitational force", refers to the conductive particles having a relative velocity in the electrode compartment ranging from about 0.95 to 1.

The flow rate of the fluidizing medium can be a typical rate for a slurry electrode or a fluidized electrode, as known in the art. In some embodiments, the flow rate of the fluidizing medium is defined as a superficial velocity, i.e., the ratio of the fluidizing medium flow rate and the cross-sectional area of the electrode compartment. The flow rate of the fluidizing medium can be controlled by the pump. In some embodiments, the superficial velocity of the fluidizing medium ranges from about 10 µm/min to about 100 mm/min. In further embodiments, the superficial velocity of the fluidizing medium ranges from about 100 µm/min to about 10 mm/min.

In some embodiments, the combination of the conductive particles which sediment under gravitational force and particles which do not sediment under gravitational force is selected such that the mass of the particles which sediment under gravitational force is at least three times higher than the mass of the particles which do not sediment under gravitational force. In further embodiments, the mass of the particles which sediment under gravitational force is at least five times higher than the mass of the particles which do not sediment under gravitational force. In still further embodiments, the mass of the particles which sediment under gravitational force is at least ten times higher than the mass of the particles which do not sediment under gravitational force. The term "mass", as used in these and other related embodiments, refers to the physical property of the conductive particle, defined as resistance of the particle to a change in its state of motion when a net force is applied, and not to the total amount of the conductive particles in the electrode compartment. In one particular embodiment, the first group of particles comprises crThe mass ratio refers to the ratio of mass of one particle (of the sedimenting group) to the mass of the other particle (of the non sedimenting group).

The mass of a particle (m) can be calculated according to Formula 1, below:

$$m = V*d \quad \text{[Formula 1]},$$

wherein V is the particle volume and d is its density.

For carbon, the density is typically around 2 g/mL. The particle density can be smaller if the particle is porous. For example, in some embodiments, the conductive particles comprise carbon beads, which are about 65% porous, so the effective density of this particle when the pores are filled with water is about 1.3 g/mL.

If the first group of particles and the second group of particles comprise the same material and have substantially same porosity, the mass ratio between said groups of particles is the ratio between the particles' volume (i.e. the ratio between the particles' radius to the power of three). A non-limiting example of the first group of particles and the second group of particles comprising the same material is carbon particles and/or carbon beads. In some exemplary embodiments, the first group of particles comprises carbon beads (Mast Carbon), having a mean particles diameter of about 100 µm and the second group of particles comprises activated carbon particles (YP-50) having a mean particle diameter of about 10 µm. In certain such embodiments, the mass ratio between the first group of particles and the second group of particles is about 1000:1.

If the first group of particles and the second group of particles comprises different materials, the density of the materials should be taken into account. A non-limiting example of the first group of particles and the second group of particles comprising different materials is metal particles, such as, but not limited to, zinc as a first group of particles, and carbon particles as a second group of particles. Zinc has a density of about 7 g/mL, and carbon particles of about 2 g/mL. If said two types of particles have substantially similar mean particles sizes, the mass ratio is calculated as the density ratio, being about 3.5:1.

In some embodiments, the loading of the conductive particles in the electrode compartment is at least about 50% higher than in the tube. In further embodiments, the loading of the conductive particles in the electrode compartment is at least about 60% higher than in the tube. In yet further embodiments, the loading of the conductive particles in the electrode compartment is at least about 70% higher than in the tube. In still further embodiments, the loading of the conductive particles in the electrode compartment is at least about 80% higher than in the tube. In yet further embodiments, the loading of the conductive particles in the electrode compartment is at least about 85% higher than in the tube. In still further embodiments, the loading of the conductive particles in the electrode compartment is at least 90% higher than in the tube. In yet further embodiments, the loading of the conductive particles in the electrode compartment is at least 95% higher than in the tube. In still further embodiments, the loading of the conductive particles in the electrode compartment is at least 98% higher than in the tube.

In some embodiments, the loading of the conductive particles, which sediment under gravitational force, in the electrode compartment is at least about 60% higher than in the tube. In further embodiments, the loading of the conductive particles, which sediment under gravitational force, in the electrode compartment is at least about 70% higher than in the tube. In still further embodiments, the loading of the conductive particles, which sediment under gravitational force, in the electrode compartment is at least about 80% higher than in the tube. In yet further embodiments, the loading of the conductive particles, which sediment under gravitational force, in the electrode compartment is at least about 85% higher than in the tube. In still further embodiments, the loading of the conductive particles, which sediment under gravitational force, in the electrode compartment is at least about 90% higher than in the tube. In yet further embodiments, the loading of the conductive particles, which sediment under gravitational force, in the electrode compartment is at least about 95% higher than in the tube. In still further embodiments, the loading of the conductive particles, which sediment under gravitational force, in the electrode compartment is at least about 98% higher than in the tube.

In some embodiments, the loading of the conductive particles in the electrode compartment constitutes at least about 70% of the total loading of said conductive particles in the electrochemical device. In further embodiments, the loading of the conductive particles in the electrode compartment constitutes at least about 80%, at least about 85%, at least about 90%, at least about 95%, or at least about 98% of the total loading of said conductive particles in the electrochemical device. Each possibility represents a separate embodiment of the invention.

In some embodiments, the loading of the conductive particles, which sediment under gravitational force, in the electrode compartment constitutes at least about 70% of the total loading of said conductive particles in the electrochemical device. In further embodiments, the loading of the conductive particles, which sediment under gravitational force, in the electrode compartment constitutes at least about 80%, at least about 85%, at least about 90%, at least about 95%, or at least about 98% of the total loading of said conductive particles in the electrochemical device.

In some embodiments, the angle between the direction of the flow of the fluidizing medium and the direction of the sedimentation flow of the conductive particles is above 90°. The term "sedimentation flow", as used herein, refers in some embodiments to the direction of the flow of the conductive particles when the fluidizing medium does not flow in the electrode compartment. In further embodiments, the term "sedimentation flow" refers to the direction of the flow of the conductive particles under gravitational force only, without the effect of the fluidizing medium flow.

The conductive particles, which sediment under gravitational force can be characterized by Archimedes number of order 1 or higher. In certain embodiments, the Archimedes number of said conductive particles is at least about 1, at least about 2, at least about 3, at least about 4 or at least about 5. Each possibility represents a separate embodiment of the invention.

The conductive particles, which do not sediment under gravitational force can be characterized by Archimedes number of order 0.1 or lower. In certain embodiments, the Archimedes number of said conductive particles is below about 0.1, below about 0.05, below about 0.01, below about 0.005, below about 0.001, or below about 0.0005. Each possibility represents a separate embodiment of the invention. In one embodiment, wherein the angle between the direction of the flow of the fluidizing medium and the direction of the sedimentation flow of the first group of particles is above 90°, the Archimedes number of the conductive particles, which do not sediment is essentially zero.

Archimedes number is the ratio of gravitational to viscous forces acting on a carbon particle, $$Ar = d_p^3 \rho (\rho_p - \rho) g / \mu^2 \quad \text{[Formula 2]},$$

where $d_p$ is the conductive particle diameter, $\rho$ is the density of the fluidizing medium (approximately that of water), $\rho_p$ is the density of the porous particle when filled with the fluidizing medium, g is the gravitational acceleration, and $\mu$ is the viscosity of the fluidizing medium.

Typically, the viscosity of the fluidizing medium ranges from about 0.2 to about 10 cP at a temperature range of 5° C. to 95° C.

According to some embodiments, the conductive particles, which sediment under gravitational force are suspended in the fluidizing medium in the electrode compartment in an essentially uniform manner. According to further embodiments, the conductive particles, which sediment under gravitational force, are suspended in the fluidizing medium in the electrode compartment in an essentially uniform manner during the electrochemical operation of the device. In certain such embodiments, the angle between the direction of the flow of the fluidizing medium and the direction of the sedimentation flow of the conductive particles is about 180°.

The term "essentially uniform manner", as used herein, denotes that the volume percentage of the conductive particles varies between two different portions of the electrode compartment by less than about 40%, less than about 20% or less than about 10%. The portion of the electrode compartment can refer to about 1/10 of the electrode compartment volume, 1/20 of the electrode compartment volume or 1/50 of the electrode compartment volume. Each possibility represents a separate embodiment of the invention.

In some embodiments, the conductive particles, which sediment under gravitational force are suspended in the fluidizing medium in the electrode compartment in a non-uniform manner. In certain such embodiments, the angle between the direction of the flow of the fluidizing medium and the direction of the sedimentation flow of the conductive particles is less than about 180°.

In certain embodiments, the loading of the second group of particles in the electrode compartment is essentially the same as in the tube. The term "essentially the same", as used herein, refers in some embodiments, to a difference in the loading of less than about 20%. In further embodiments, the term "essentially the same" refers to a difference in the loading of less than about 10%, less than about 5% or less than about 1%. Each possibility represents a separate embodiment of the invention.

According to some embodiments, the conductive particles, which do not sediment under gravitational force are suspended in the fluidizing medium in the electrode compartment in an essentially uniform manner. According to further embodiments, the conductive particles, which do not sediment under gravitational force, are suspended in the fluidizing medium in the electrode compartment in an essentially uniform manner during the operation of the electrochemical device. According to still further embodiments, the conductive particles, which do not sediment under gravitational force, are suspended in the fluidizing medium in the at least one tube in an essentially uniform manner According to yet further embodiments, the conductive particles, which do not sediment under gravitational force, are suspended in the fluidizing medium in the at least one tube in an essentially uniform manner during the electrochemical operation of the device.

The conductive particles, which sediment under gravitational force can further be characterized by a kinematic shock experienced by said particles during the formation of the essentially uniform suspension in the electrode compartment. The term "kinematic shock", as used herein, refers to a sharp discontinuity in concentration of the conductive particles along the flow direction of the fluidizing medium. When the conductive particles and the fluidizing medium are flown into the electrode compartment for the first time (prior to the electrochemical operation of the device), before the essentially uniform suspension of the conductive particles is formed in the electrode compartment, the whole volume of the electrode compartment is filled by the fluidizing medium, while the conductive particles suspended in the fluidizing medium are present below the kinematic shock, and above the kinematic shock there are essentially no conductive particles suspended in the fluidizing medium. The kinematic shock rises until the whole volume of the electrode compartment is filled by the conductive particles suspended in the fluidized medium and an essentially uniform suspension is formed.

The conductive particles, which do not sediment, do not experience kinematic shock and are suspended in the fluidizing medium in the electrode compartment in an essentially uniform manner even when the conductive particles and the fluidizing medium are flown into the electrode compartment for the first time.

The conductive particles suitable for use in the electrochemical devices according to the principles of the present invention can be selected from ion-conducting particles and electrically conductive particles. Each possibility represents a separate embodiment of the invention. In certain embodiments, the conductive particles which do not sediment under gravitational force comprise electrically-conductive particles.

In some embodiments, the first group of particles and the second group of particles comprises electrically conductive particles. In other embodiments, the first group of particles comprises ion-conducting particles and the second group of particles comprises electrically conductive particles.

In some embodiments, the conductive particles comprise a conductive shell or a conductive core. Said conductive shell or conductive core can be ionically conductive or electrically conductive. Each possibility represents a separate embodiment of the invention.

In some embodiments, the conductive particles are porous. The term "porous", as used herein, refers to a structure of interconnected pores or voids such that continuous passages and pathways throughout a material are provided. In some embodiments, the porosity of the conductive particles is from about 10% to about 90%, such as, for example, 20%-80%, 30%-70%, 40%-60%, 45%-85%, or 55-75% porosity. Each possibility represents a separate embodiment of the invention.

In some embodiments, the conductive particles comprise a porous shell or a porous core.

The conductive particles can comprise a combination of relatively less conductive particles (for example, activated carbon particles) with relatively more conductive particles (for example, carbon black particles) as a means of enhancing electrode conductivity. In certain such embodiments, the activated carbon particles can adsorb, absorb, intercalate, catalyze redox reaction and/or induce deposition of an ion, while carbon black particles can increase conductivity of the electrode compartment.

The conductive particles can comprise a combination of relatively less porous particles with relatively more porous particles.

The conductive particles can comprise a combination of particles made of different materials. In further embodiments, the conductive particles comprise a combination of particles having different shapes, sizes, densities, bulk densities or any combination thereof. Each possibility represents a separate embodiment of the invention.

Conductive particles can comprise a material selected from, but not limited to, carbon, graphite, metal, metal carbide, metal nitride, metal oxide, polymer, and any combination thereof. The type of the material can be selected according to the reaction taking place in the electrode compartment. For example, in water desalination systems based on capacitive deionization, carbon particles can be used in order to allow electrosorption of salt ions. Carbon particles are also suitable for use in various flow batteries. Carbon-based conductive particles include, but are not limited to, activated carbon; carbon black; graphitic carbon; carbon beads; carbon fibers; carbon microfibers; fullerenic carbons; carbon nanotubes (CNTs), including multiwall carbon nanotubes (MWCNTs) and single wall carbon nanotubes (SWCNTs); graphene sheets or aggregates of graphene sheets; and materials comprising fullerenic fragments; and any combination thereof.

Metallic particles can be used in energy storage systems, in particular, where catalytic reactions take place. The non-limiting examples of metals suitable for use in the devices according to the principles of the present invention include Zn, Fe, Ni, Co, Cr, Al, Pt, Pd, Ru, Au, Cu, Ce, Cd, and alloys and combinations thereof.

Suitable metal oxides include, but are not limited to, $LiCoO_2$, $LiFeO_2$, $LiMnO_2$, $LiMn_2O_4$, $Li_2MoO_4$, $LiNiO_2$ and combinations thereof.

The non-limiting examples of polymers useful as the conductive particles in the electrochemical devices of the present invention include polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocence-substituted polyethylene, carbazole-substituted polyethylene, polyoxyphenazine, polyacenes, or poly(heteroacenes) and mixtures thereof.

In some embodiments, the conductive particles comprise carbon beads and/or activated carbon. In further embodiments, the first group of particles comprises carbon beads. In still further embodiments, the second group of particles comprises activated carbon. In certain embodiments, the second group of particles does not include MWCNTs. In additional embodiments, the second group of particles does not include CNTs.

The structure of conductive particles can be selected according to the desired functionality in the electrochemical device. For example, in supercapacitors or capacitive deionization systems, particles having high surface area or high porosity, such as, but not limited to activated carbon, are required in order to enable enhanced ion electrosorption. Thus, in some embodiments, the conducive particles have a high surface area and/or high porosity. In certain embodiments, the first group of particles have a high surface area and/or high porosity. In certain embodiments, the second group of particles have a high surface area and/or high porosity. Each possibility represents a separate embodiment of the invention.

The term "high surface area", as used in some embodiments, refers to a surface area in the range from about 1 to about 3000 $m^2/g$, such as, for example, 10-100 $m^2/g$, 100-300 $m^2/g$, 300-1500 $m^2/g$ or 1500-3000 $m^2/g$. In further embodiments, the term refers to surface area of above about 50 $m^2/g$, 75 $m^2/g$, above about 100 $m^2/g$, above about 125 $m^2/g$, above about 150 $m^2/g$, above about 175 $m^2/g$, above about 200 $m^2/g$, above about 225 $m^2/g$, above about 250 $m^2/g$, above about 275 $m^2/g$, above about 300 $m^2/g$, above about 350 $m^2/g$, or above about 500 $m^2/g$. Each possibility represents a separate embodiment of the invention.

The term "high porosity", as used herein, refers in some embodiments, to the porosity of the conductive particles material of above about 50%. In further embodiments, the term refers to the porosity of above about 60%, 70%, or even 80%. Each possibility represents a separate embodiment of the invention. In some embodiments, the terms "high surface area" or "high porosity" encompass materials having microparticles or nanoparticles.

In flow batteries, conductive particles can be used to allow intercalation, absorption or deposition of the redox species on the surface or in the bulk of the conductive particles. Said conductive particles can also be characterized by high surface area and/high porosity or can have layered structure, such as, for example, of graphite. Core-shell particles are also encompassed within the scope of the present invention. The surface (or the shell) and the bulk (or the core) of the conductive particles can be made of different materials. The density of the surface material can be lower than the density of the bulk material. In certain embodiments the surface of the conductive particle comprises a conductive material and the bulk is made of an insulating material.

In some embodiments, the conductive particles are configured to adsorb, absorb, intercalate, catalyze redox reaction and/or induce deposition of an ion. Each possibility represents a separate embodiment of the invention.

In some embodiments, the particles which do not sediment under gravitational force are further configured to increase the electric conductivity of the at least one electrode compartment.

The conductive particles can be of any suitable shape, such as but not limited to, spherical, cubic, tubular, fibrous, or fullerene shape.

In some embodiments, the conductive particles further comprise a redox species. The term "redox species", as used herein, refers to a species, which takes part in an oxidation or reduction reaction in the electrochemical device.

In some embodiments, the redox species comprises a redox metal ion. The redox metal ion can be present on the surface or in the bulk of the conductive particle. In some embodiments, the metal ion is present in the pores of the conductive particle. The redox metal ion can be adsorbed, absorbed or intercalated into the conductive particles. Each possibility represents a separate embodiment of the invention. The non-limiting examples of suitable redox metal ions include zinc, iron, vanadium, chromium, lithium, sodium, magnesium, aluminum, nickel, calcium, lead ions and any combinations thereof.

The redox metal ion can be further deposited on the surface or in the bulk of the conductive particle. In some embodiments, the redox metal ion is deposited in the pores of the conductive particle. Thus, in some embodiments, the conductive particle comprises a deposited metal. The metal ion can be present on the surface, in the bulk and/or in the pores of the conductive particle in a reduced form. Each possibility represents a separate embodiment of the invention. The non-limiting examples of suitable redox metals include zinc, iron, vanadium, chromium, lithium, sodium, magnesium, aluminum, nickel, calcium, lead and any combinations thereof.

The redox metal ion can be present on the surface or in the bulk of the conductive particle in a form of a salt or a ceramic material. In some embodiments, the salt or ceramic material is deposited in the pores of the conductive particle. Each possibility represents a separate embodiment of the invention. The redox metal salt can be an inorganic or an organic salt.

The redox species can further include a hydrogen ion, a hydroxyl ion or a combination thereof. According to some embodiments, the conductive particles further comprise a hydrogen ion on the surface, in the bulk or in the pores thereof. Each possibility represents a separate embodiment of the invention. According to some embodiments, the conductive particles further comprise a hydroxyl ion on the surface, in the bulk or in the pores thereof. Each possibility represents a separate embodiment of the invention.

It should be emphasized, that the present invention allows increasing the loading of the conductive particles in the electrode above the loading achievable in typical slurry electrodes. In some embodiments, the loading of the conductive particles in the electrode compartment is above about 15% wt. In further embodiments, the loading of the conductive particles in the electrode compartment is above about 20% wt. In yet further embodiments, the loading of the conductive particles in the electrode compartment is above about 22% wt., above about 25% wt., above about 27% wt., above about 30% wt., above about 32% wt., or above about 35% wt. Each possibility represents a separate embodiment of the invention. In other embodiments, the loading of the conductive particles in the electrode compartment is about 35% wt. In certain embodiments, the conductive particles comprise carbon. The carbon particles can include activated carbon and/or carbon beads.

In some embodiments, the loading of the conductive particles, which sediment under gravitational force, in the electrode compartment is above about 15% wt. In further embodiments, the loading of the conductive particles, which sediment under gravitational force, in the electrode compartment is above about 20% wt. In yet further embodiments, the loading of the conductive particles, which sediment under gravitational force, in the electrode compartment is above about 22% wt., above about 25% wt., above about 27% wt., above about 30% wt., above about 32% wt., or above about 35% wt. Each possibility represents a separate embodiment of the invention. In other embodiments, the loading of the conductive particles, which sediment under gravitational force, in the electrode compartment is about 35% wt. In certain embodiments, the conductive particles, which sediment under gravitational force, comprise carbon. The carbon particles can include carbon beads.

In some embodiments, the loading of the conductive particles, which sediment under gravitational force, in the at least one tube is below about 5% wt. In further exemplary embodiments, the loading of the conductive particles, which sediment under gravitational force, in the at least one tube is below about 4.5% wt., below about 4% wt., below about 3.5% wt., below about 3% wt., below about 2.5% wt., below about 2% wt., below about 1.5% wt., below about 1% wt., below about 0.5% wt., or below about 0.1% wt. Each possibility represents a separate embodiment of the invention. In certain embodiments, the conductive particles, which sediment under gravitational force, comprise carbon. The carbon particles can include carbon beads.

In some embodiments, the loading of the conductive particles, including those which sediment and which do not sediment under gravitational force, in the electrode compartment is above about 15% wt. In further embodiments, the loading of the conductive particles, including those which sediment and which do not sediment under gravitational force, in the electrode compartment is above about 20% wt. In yet further exemplary embodiments, the loading of the conductive particles, including those which sediment and which do not sediment under gravitational force, in the electrode compartment is above about 22% wt., above about 25% wt., above about 27% wt., above about 30% wt., above about 32% wt., or above about 35% wt. Each possibility represents a separate embodiment of the invention. In other embodiments, the loading of the conductive particles, including those which sediment and which do not sediment under gravitational force, in the electrode compartment is about 35% wt. In certain embodiments, the conductive particles, including those which sediment and which do not sediment under gravitational force, comprise carbon. The carbon particles can include activated carbon and/or carbon beads.

In some embodiments, the loading of the particles which do not sediment under gravitational force, in the electrode compartment is less than about 10% wt., less than about 5% wt., or less than about 1% wt. Each possibility represents a separate embodiment of the invention. In certain embodiments, the conductive particles comprise carbon. The carbon particles can include activated carbon In some embodiments, the loading of the first group of particles in the electrode compartment is higher than the loading of the second group of particles by at least about 50%. In further embodiments, the loading of the first group of particles in the electrode compartment is higher than the loading of the second group of particles by at least about 60%, by at least about 70%, by at least about 80% or by at least about 90%. Each possibility represents a separate embodiment of the invention.

The mean particle size of the conductive particles, which sediment under gravitational force, can range from about 10 μm to about 500 μm. In some embodiments, the mean particle size of the conductive particles, which sediment under gravitational force, is in the range from about 20 μm to about 400 μm, from about 30 μm to about 300 μm, from about 50 μm to about 250 μm, from about 60 μm to about 200 μm, or from about 70 μm to about 150 μm. Each possibility represents a separate embodiment of the invention. In certain embodiments, the mean particle size of the conductive particles, which sediment under gravitational force is about 100 μm. In other embodiments, the mean particle size of the conductive particles, which sediment under gravitational force is in the range from about 10 μm to about 100 μm, from about 100 μm to about 200 μm, from about 100 μm to about 300 μm, from about 300 μm to about 500 μm, from about 125 μm to about 250 μm, or from about 200 μm to about 300 μm. In further embodiments, the mean particle size of the conductive particles, which sediment under gravitational force is at least about 10 μm, at least about 20 μm, at least about 30 μm, at least about 40 μm, at least about 50 μm, at least about 60 μm, at least about 70 μm, at least about 80 μm, at least about 90 μm, at least about 100 μm, at least about 150 μm, at least about 200 μm, at least about 250 μm, or at least about 300 μm. Each possibility represents a separate embodiment of the invention.

In certain embodiments, the conductive particles, which sediment under gravitational force comprise carbon. The carbon particles can include carbon beads. In certain embodiments, said carbon beads are activated carbon beads. In further embodiments, said carbon beads have a mean particle size ranging from about 100 μm to about 300 μm.

In some embodiments, the conductive particles, which sediment under gravitational force comprise CNTs. In further embodiments, said CNTs include MWCNTs. The MWCNTs can have a length of about 10 nm to about 500 μm. In some embodiments, the MWCNTs have a length of about 100 nm to about 500 μm. In further embodiments, the MWCNTs have a length of about 1 μm to about 500 μm. In still further embodiments, the MWCNTs have a length of about 1 μm to about 250 μm. In yet further embodiments, the MWCNTs have a length of about 1 μm to about 100 μm. In certain embodiments, the MWCNTs have a length of about 50 μm. In some embodiments, the MWCNTs have a mean thickness (i.e. outer diameter) ranging from about 20 nm to about 500 nm. In further embodiments, the MWCNTs have a mean thickness ranging from about 30 nm to about 300 nm. In still further embodiments, the MWCNTs have a mean thickness ranging from about 40 nm to about 100 nm. In additional embodiments, the CNTs are present in the electrode compartment in the form of agglomerates having a mean agglomerate size ranging from about 100 nm to about 1 mm. In further embodiments, the mean agglomerate size ranges from about 1 μm to about 1 mm. In still further embodiments, the mean agglomerate size ranges from about 50 μm to about 500 μm. In still further embodiments, the mean agglomerate size ranges from about 100 μm to about 500 μm. In certain embodiments, said CNTs are MWCNTs.

The mean particle size of the conductive particles, which do not sediment under gravitational force, can range from about 0.1 μm to about 100 μm. In some embodiments, the mean particle size of the conductive particles, which do not sediment under gravitational force, is in the range from about 0.5 μm to about 100 μm, from about 0.75 μm to about 75 μm, from about 1 μm to about 50 μm, from about 2 μm to about 40 μm, from about 3 μm to about 30 μm, from about 4 μm to about 20 μm, or from about 5 μm to about 15 μm. Each possibility represents a separate embodiment of the invention. In certain embodiments, the mean particle size of the conductive particles, which do not sediment under gravitational force is about 10 μm. In other embodiments, the mean particle size of the conductive particles, which do not sediment under gravitational force is in the range from about 0.1 μm to about 0.5 μm, from about 0.5 μm to about 1 μm, from about 1 μm to about 15 μm, from about 15 μm to about 30 μm, from about 30 μm to about 50 μm, from about 50 μm to about 75 μm or from about 75 μm to about 100 μm. In further embodiments, the mean particle size of the conductive particles, which do not sediment under gravitational force is below about 100 μm, below about 90 μm, below about 80 μm, below about 70 μm, below about 60 μm, below about 50 μm, below about 40 μm, below about 30 μm, below about 25 μm, below about 20 μm, below about 15 μm, below about 10 μm, below about 5 μm, or below about 1 μm. Each possibility represents a separate embodiment of the invention. In certain embodiments, the conductive particles, which do not sediment under gravitational force comprise carbon. The carbon particles can include activated carbon. In further embodiments, the activated carbon has particle size ranging from about 1 μm to about 50 μm.

The terms "particle size" and "agglomerate size", as used in various embodiments of the invention, refer to the length of the particle or the agglomerate in the longest dimension thereof.

Conductive particles can be monodisperse or polydisperse. The term "mean particle size" can refer to the size of monodisperse particles or polydisperse particles. In some embodiments, said term refers to the arithmetical average of the sizes of all the polydisperse particles. In other embodiments, said term refers to the arithmetical average of sizes of a certain portion of particles within said polydisperse particles, wherein said portion constitutes at least 10% of the total amount of polydisperse particles, at least about 20%, at least about 30%, at least about 40% or at least about 50% of the total amount of polydisperse particles. Each possibility represents a separate embodiment of the invention.

Without wishing to being bound by theory or mechanism of action, in order for the conductive particles, which sediment under gravitational force, to form a fluidized bed electrode, the bulk density of the conductive particles should be substantially high. As used herein, the term "bulk density" refers to the mass of many particles divided by the total volume they occupy.

In some embodiments, the bulk density of the conductive particles, which sediment under gravitational force, ranges from about 1000 kg/m$^3$ to about 10000 kg/m$^3$. In further embodiments, the bulk density of the conductive particles, which sediment under gravitational force, ranges from about 2000 kg/m$^3$ to about 10000 kg/m$^3$, from about 3000 kg/m$^3$ to about 9000 kg/m$^3$, from about 4000 kg/m$^3$ to about 8000 kg/m$^3$, or from about 5000 kg/m$^3$ to about 7000 kg/m$^3$. In still further embodiments, the bulk density of the conductive particles, which sediment under gravitational force, ranges from about 2000 kg/m$^3$ to about 4000 kg/m$^3$, from about 4000 kg/m$^3$ to about 6000 kg/m$^3$, from about 6000 kg/m$^3$ to about 8000 kg/m$^3$ or from about 8000 kg/m$^3$ to about 10000 kg/m$^3$. In yet further embodiments, the bulk density of the conductive particles, which sediment under gravitational force, is at least about 1000 kg/m3, at least about 2000 kg/m$^3$, at least about 3000 kg/m$^3$, at least about 4000 kg/m$^3$, at least about 5000 kg/m$^3$, at least about 6000 kg/m$^3$, at least about 7000 kg/m$^3$, at least about 8000 kg/m$^3$, at least about 9000 kg/m$^3$, or at least about 10000 kg/m$^3$. Each possibility represents a separate embodiment of the invention.

Without wishing to being bound by theory or mechanism of action, it is contemplated that the physical parameters of the electrode compartment and the flow parameters of the fluidizing medium can be varied in order to alter the fluidized bed packing and/or the loading of the conductive particles in the electrode compartment.

In some embodiments, the angle between the direction of the flow of the fluidizing medium and the direction of the sedimentation flow of the conductive particles is above about 100°, above about 110°, above about 120°, above about 130°, above about 140°, above about 150°, above about 160° or above about 170°. Each possibility represents a separate embodiment of the invention. In certain embodiments, the angle between the direction of the flow of the fluidizing medium and the direction of the sedimentation flow of the conductive particles is about 180°. In further embodiments, the angle between the direction of the flow of the fluidizing medium and the direction of the sedimentation flow of the conductive particles is below about 270°.

In some embodiments, the thickness of the electrode compartment ranges from about 0.5 mm to about 10 mm. In some exemplary embodiments, the thickness of the electrode compartment varies between about 1.2 mm and 6.4 mm. In certain embodiments, the thickness of the electrode compartment is about 2 mm.

The ratio of the height and the thickness of the electrode compartment can range from about 5:1 to about 1000:1. In some embodiments, the height of the electrode compartment ranges from about 0.25 mm to about 10000 mm. In certain embodiments, the height of the electrode compartment ranges from about 50 mm to about 250 mm.

Typically, the thickness of the electrode compartment and of the tube, which is in fluid flow connection with the electrode compartment are different. In some embodiments, the thickness of the tube is at least about 20% lower than the thickness of the electrode compartment. In other embodiments, the thickness of the tube is at least about 30% lower than the thickness of the electrode compartment, at least about 40%, at least about 50%, at least about 60%, at least about 70% or at least about 80% lower than the thickness of the electrode compartment.

Without wishing to being bound by theory or mechanism of action, it is contemplated that the properties of the conductive particles, such as, but not limited to, composition, size, density or structure, can be varied in order to provide particles which sediment (i.e. first group of particles) and particles which do not sediment (i.e. second group of particles) under gravitational force in the electrode compartment. The flow parameters of the fluidizing medium, for example, the direction, flow rate or flow pressure, as well as the physical parameters of the electrode compartment, inter alia, electrode compartment thickness, would also influence the sedimentation properties of the conductive particles.

In some embodiments, the combination of the first group of particles and the second group of particles is a synergistic combination. In certain such embodiments, the increase in the electrical conductivity of the electrode compartment comprising said combination of conductive particles is synergistic, as compared to the electrical conductivity of the electrode compartment comprising only the first group of particles and to the electrical conductivity of the electrode compartment comprising only the second group of particles. In further embodiments, the electrode compartment comprising the synergistic combination, the electrode compartment comprising only the first group of particles and the electrode compartment comprising only the second group of particles have the same loading of the conductive particles.

In some embodiments, the conductivity of the electrode compartment comprising the synergistic combination is at least about 50% higher than the conductivity of the electrode compartment comprising only the first group of particles. In further embodiments, the conductivity of the electrode compartment comprising the synergistic combination is at least about 60% higher than the conductivity of the electrode compartment comprising only the first group of particles, at least about 70% higher, at least about 80% higher, at least about 90% higher or at least about 95% higher. In further embodiments, the conductivity of the electrode compartment comprising the synergistic combination is at least about one order of magnitude higher than the conductivity of the electrode compartment comprising only the first group of particles, at least about two orders of magnitude higher, or at least about three orders of magnitude higher. Each possibility represents a separate embodiment of the invention.

In some embodiments, the conductivity of the electrode compartment comprising the synergistic combination is at least about 50% higher than the conductivity of the electrode compartment comprising only the second group of particles. In further embodiments, the conductivity of the electrode compartment comprising the synergistic combination is at least about 60% higher than the conductivity of the electrode compartment comprising only the second group of particles, at least about 70% higher, at least about 80% higher, at least about 90% higher or at least about 95% higher. Each possibility represents a separate embodiment of the invention.

In some exemplary embodiments, the conductivity of electrode compartment comprising the synergistic combination is higher by about three orders of magnitude than that of the electrode compartment comprising only the second group of particles and by up to one order of magnitude than that of the electrode compartment comprising only the first group of particles.

In some embodiments, the synergistic combination of the first group of particles and the second group of particles can be chosen based on the electrical conductivity of each one of the first group of particles and the second group of particles. According to some embodiments, the conductivity of the electrode compartment comprising only the second group of particles is not more than one order of magnitude higher than the conductivity of the electrode compartment comprising only the first group of particles. In other words, the particles can be chosen such that the ratio between the conductivity of the first group of particles and the conductivity of the second group of particles is above about 1:10. In further embodiments, the ratio between the conductivity of the first group of particles and the conductivity of the second group of particles is above about 1:10. In still further embodiments, the ratio between the conductivity of the first group of particles and the conductivity of the second group of particles is above about 10:1. In yet further embodiments, the ratio between the conductivity of the first group of particles and the conductivity of the second group of particles is about 100:1.

Provided hereinbelow are some of the possible combinations of different conductive particles types, which can be utilized to provide the electrochemical device according to some embodiments of the present invention, comprising the hybrid electrode, comprising a combination of conductive particles, which sediment under gravitational force and conductive particles, which do not sediment under gravitational force.

In some embodiments, the bulk density of the first group of particles is higher than the bulk density of the second group of particles by at least about 50%. In further embodiments, the bulk density of the first group of particles is higher than the bulk density of the second group of particles, by at least about 60%, by at least about 70%, by at least about 80%, by at least about 90%, or by at least about 95%. In further embodiments, the bulk density of the first group of particles is higher than the bulk density of the second group of particles by at least a factor of 3, a factor of 5, a factor of 10, a factor of 20, or a factor of 50. Each possibility represents a separate embodiment of the invention.

In some embodiments, the mean particle size of the first group of particles is higher than the mean particle size of the second group of particles by at least about 50%. In further embodiments, the mean particle size of the first group of particles is higher than the mean particle size of the second group of particles by at least about 60%, by at least about 70%, by at least about 80%, by at least about 90%, or by at least about 95%. Each possibility represents a separate embodiment of the invention.

In some embodiments, the mean particle size of the first group of particles is at least two-fold higher than the mean particle size of the second group of particles. In further embodiments, the mean particle size of the first group of particles is at least three-fold higher than the mean particle size of the second group of particles, at least four-fold higher, at least five-fold higher, at least six-fold higher, at least seven-fold higher, at least eight-fold higher, or at least nine-fold higher than the mean particle size of the second group of particles. Each possibility represents a separate embodiment of the invention.

In some embodiments, the mean particle size of the first group of particles is at least one order of magnitude higher than the mean particle size of the second group of particles. In further embodiments, the mean particle size of the first group of particles is at least two orders of magnitude higher than the mean particle size of the second group of particles or at least three orders of magnitude higher than the mean particle size of the second group of particles. Each possibility represents a separate embodiment of the invention.

For example, the mean particle size of the first group of particles can range from about 10 μm to about 500 μm and the mean particle size of the second group of particles can range from about 0.1 μm to about 100 μm. In some embodiments, the mean particle size of the first group of particles is in the range from about 70 μm to about 150 μm and the mean particle size of the second group of particles is in the range from about 5 μm to about 15 μm. In further embodiments, the mean particle size of the first group of particles is at least about 50 μm and the mean particle size of the second group of particles below about 25 μm. In other embodiments, the mean particle size of the first group of particles is at least about 60 μm and the mean particle size of the second group of particles below about 30 μm. In some exemplary embodiments, the mean particle size of the first group of particles is about 100 μm and the mean particle size of the second group of particles is about 1 μm.

The first group of particles and the second group of particles can comprise the same material. In some embodiments, the mean particle size of the first group of particles is higher than the mean particle size of the second group of particles by at least about 50%. In further embodiments, the mean particle size of the first group of particles is higher than the mean particle size of the second group of particles by at least about 60%, by at least about 70%, by at least about 80%, by at least about 90%, or by at least about 95%. In further embodiments, the mean particle size of the first group of particles is higher than the mean particle size of the second group of particles by at least a factor of 3, a factor of 5, or a factor of 10. Each possibility represents a separate embodiment of the invention.

Additionally or alternatively, the first group of particles and the second group of particles can comprise different materials. In some embodiments, the density of the material of the first group of particles is higher than the density of the material of the second group of particles by at least about 50%. In further embodiments, the density of the material of the first group of particles is higher than the density of the material of the second group of particles by at least about 60%, by at least about 70%, by at least about 80%, by at least about 90%, or by at least about 95%. In further embodiments, the density of the material of the first group of particles is higher than the density of the material of the second group of particles by at least a factor of 3, a factor of 5, or a factor of 10. Each possibility represents a separate embodiment of the invention. In some embodiments, the mean particle size of the first group of particles is essentially the same as the mean particle size of the second group of particles. The term "essentially the same", as used herein, refers in some embodiments, to a difference in the mean particle size of less than about 20%. In further embodiments, the term "essentially the same" refers to a difference in the mean particle size of less than about 10%, less than about 5% or less than about 1%. Each possibility represents a separate embodiment of the invention. In other embodiments, the mean particles size is different.

In some embodiments, porosity of the first group of particles is lower than the porosity of the second group of particles. The porosity of the first group of particles can be at least about 5%, 10%, 20%, 30%, 40%, 50%, 60%, 70%, 80% or 90% lower than the porosity of the second group of particles.

In alternative embodiments, porosity of the first group of particles is higher than the porosity of the second group of particles. The porosity of the first group of particles can be at least about 5%, 10%, 20%, 30%, 40%, 50%, 60%, 70%, 80% or 90% higher than the porosity of the second group of particles.

The first group of particles and/or the second group of particles can have a core-shell structure. For example, the first group of particles can have a core comprising the same material as the second group of particles and further have a shell composed of a different material. In certain embodiments, the density of the material of the shell is higher than the density of the material of the core. In certain embodiments, the mean size of the core of first group of particles and the mean particle size of the second group of particles is the same.

In some embodiments, the first group of particles has a core comprising the same material as the second group of particles and further has a shell composed of a different material. In certain embodiments, the density of the material of the shell is higher than the density of the material of the core. In certain embodiments, the mean particle size of the first group of particles and the mean particle size of the second group of particles is the same.

In some embodiments, the first group of particles can have a shell comprising the same material as the second group of particles and further have a core composed of a different material. In certain embodiments, the density of the material of the core is higher than the density of the material of the shell. In certain embodiments, the mean particle size of the first group of particles and the mean particle size of the second group of particles is the same.

In some embodiments, both the first group of particles and the second group of particles have the core-shell structure. The material of the cores can be the same or different. The material of the shells can be the same or different. The mean particle size of the first group of particles and of the second group of particles can be the same or different. Each possibility represents a separate embodiment of the invention. In certain embodiments, the first group of particles and the second group of particles comprise the same shells and different cores. In certain embodiments, the first group of particles and the second group of particles comprise the same cores and different shells. The different shells can comprise different materials and/or different thicknesses. Each possibility represents a separate embodiment of the invention.

The first group of particles and the second group of particles can have same or different shapes.

In some embodiments, the first group of particles comprises metal and the second group of particles comprises carbon. In some embodiments, the first group of particles comprises metal oxide and the second group of particles comprises carbon.

In some embodiments, the first group of particles and the second group of particles comprises a carbon core and a metal shell, wherein the thicknesses of the shells are different. In some embodiments, the first group of particles and the second group of particles comprises a metal core and a carbon shell, wherein the thicknesses of the shells are different.

In some embodiments, the first group of particles and the second group of particles comprises different particle shapes. In some embodiments, the first group of particles and the second group of particles comprise different loadings of particles.

In some exemplary embodiments, the at least one electrode compartment comprises the first group of particles comprises carbon particles and the second group of particles comprises carbon particles. In further embodiments, the first group of particles comprises carbon particles having a mean particle size of at least about 50 µm and/or the second group of particles comprising carbon particles having a mean particle size of below about 30 µm. In still further embodiments, the first group of particles comprises carbon particles having a mean particle size of at least about 100 µm and/or the second group of particles comprising carbon particles having a mean particle size of below about 20 µm. In certain embodiments, the first group of particles comprises carbon beads. In additional embodiments, the second group of particles comprises activated carbon.

According to some embodiments, the electrochemical device further includes a solid electrode. The solid electrode can be of any type suitable for use in an electrochemical device, including, but not limited to, conductive cloth, paper, mesh or felt. In some embodiments, the at least one electrode compartment is a positive electrode and a solid electrode is a negative electrode. In other embodiments, the at least one electrode compartment is a negative electrode and a solid electrode is a positive electrode.

In other embodiments, the electrochemical device comprises two electrode compartments, including a first electrode compartment and a second electrode compartment, and two tubes. In certain such embodiments, the first electrode compartment is a positive electrode and the second electrode compartment is a negative electrode. In some embodiments, the first electrode compartment and the second electrode compartment comprise the same conductive particles. In other embodiments, the first electrode compartment and the second electrode compartment comprise different conductive particles. In some embodiments, the first electrode compartment and the second electrode compartment comprise the same loading of the conductive particles. In other embodiments, the first electrode compartment and the second electrode compartment comprise different loadings of conductive particles.

In some embodiments, the electrochemical device comprises a first electrode compartment comprising conductive particles which sediment under gravitational force and a second electrode compartment comprising conductive particles which sediment under gravitational force. In some embodiments, the electrochemical device comprises a first electrode compartment comprising conductive particles which sediment under gravitational force and a second electrode compartment comprising a first group of particles comprising conductive particles which sediment under gravitational force and a second group of particles comprising conductive particles which do not sediment under gravitational force. In some embodiments, the electrochemical device comprises a first electrode compartment comprising a first group of particles comprising conductive particles which sediment under gravitational force and a second group of particles comprising conductive particles which do not sediment under gravitational force and a second electrode compartment comprising a first group of particles comprising conductive particles which sediment under gravitational force and a second group of particles comprising conductive particles which do not sediment under gravitational force. In certain embodiments, the first electrode compartment is a positive electrode and the second electrode compartment is a negative electrode. In some embodiments, the first electrode compartment and the second electrode compartment comprise the same conductive particles. In other embodiments, the first electrode compartment and the second electrode compartment comprise different conductive particles. In some embodiments, the first electrode compartment and the second electrode compartment comprise the same loading of the conductive particles. In other embodiments, the first electrode compartment and the second electrode compartment comprise different loadings of conductive particles.

The role of the fluidizing medium is to suspend the conductive particles. In some embodiments, the fluidizing medium suspends the conductive particles in the electrode compartment. In some embodiments, the fluidizing medium suspends conductive particles which sediment under gravitational force. In some embodiments, the fluidizing medium suspends conductive particles which sediment under gravitational force and conductive particles, which do not sediment under gravitational force. The fluidizing medium can further suspend conductive particles, which do not sediment under gravitational force, in the at least one tube of the electrochemical device.

The fluidizing medium can be any liquid that can suspend the conductive particles. The non-limiting examples of the fluidizing medium include water, a polar solvent, such as alcohols, or aprotic organic solvents.

The fluidizing medium can further include a redox metal ion or a dissolved salt thereof. The fluidizing medium can be acidic, neutral or basic. Each possibility represents a separate embodiment of the invention.

In some embodiments, the fluidizing medium comprises an electrolyte. In other embodiments, the fluidizing medium comprises a feed solution. The electrolyte can be aqueous-based or organic-based. The feed solution can be aqueous-based or organic-based.

The separator suitable for use in the electrochemical device according to the principles of the present invention can be any separator known in the art, such as, but not limited to, a membrane, spacer or gasket. Typically, energy storage systems include membranes as separators. However, energy storage systems can also be membraneless, such as for example, in laminar flow batteries. Said batteries can include a gasket as a separator. The gasket can have any form, which provides separation of the electrode compartments of the device, including, inter alia, creating a void between said two electrode compartments. The gasket can be made of any suitable material, including, but not limited to, polymer, rubber or elastomer. A water desalination system can include any one of a membrane, a gasket or a spacer. The spacer can include, inter alia, a planar slit or transport channel. In some embodiments, the spacer is made of a porous material.

In some embodiments, the energy storage system includes a membrane. In other embodiments, the energy storage system does not include a membrane.

In some embodiments, the water desalination system does not include a membrane. In other embodiments, the water desalination system includes one membrane or two membranes. Each possibility represents a separate embodiment of the invention.

In certain embodiments, the membrane is an ion-permeable membrane. The ion-permeable membrane suitable for use in the electrochemical device according to the principles of the present invention can be any conventional membrane that is capable of ion transport. In one or more embodiments, the membrane is a liquid-impermeable membrane that permits the transport of ions there through, namely a solid or gel ionic conductor. In other embodiments the membrane is a porous polymer membrane infused with a liquid electrolyte that allows for the shuttling of ions between the electrode compartment and the opposite solid electrode or between two electrode compartments, while preventing the transfer of electrons. In some embodiments, the membrane is a microporous membrane that prevents conductive particles from crossing the membrane. The ion-permeable membrane can be of any type suitable for use in the electrochemical devices according to the principles of the present invention, including, but not limited to, ion exchange membranes, including anion exchange membranes and cation exchange membranes; ion conducting membranes; proton exchange membranes (PEMs); proton conducting membranes (PCMs), and microporous separators. The membrane can be polymer-based, such as, for example, polyolefin, sulfonated tetrafluoroethylene based fluoropolymer, sulfonated polysulfone, polyethyleneoxide (PEO) polymer; or ceramic material-based, such as, for example, zeolites. Non-limiting examples of suitable commercially available membranes include Neosepta® IEM and CMX, polyolefin Daramic®, Asahi SF-600, and Nafion®.

In some embodiments, the electrochemical device includes two electrode compartments, wherein the first electrode compartment is positioned between the first current collector and the separator and the second electrode compartment is positioned between the second current collector and the separator.

In some embodiments, the electrochemical device comprises two separators, including a first separator and a second separator. In certain such embodiments, the device includes two electrode compartments, wherein the first electrode compartment is positioned between the first current collector and the first separator and the second electrode compartment is positioned between the second current collector and the second separator. The first and the second separators can be separated from each other by a fluid medium.

In some embodiments, the electrochemical device comprises two ion-permeable membranes, including a first ion-permeable membrane and a second ion-permeable membrane. In certain such embodiments, the device includes two electrode compartments, wherein the first electrode compartment is positioned between the first current collector and the first ion permeable membrane and the second electrode compartment is positioned between the second current collector and the second ion permeable membrane. The first and the second ion-permeable membranes can be separated from each other by a fluid medium. In some embodiments, the first ion-permeable membrane is an anion exchange membrane and the second ion-permeable membrane is a cation exchange membrane.

The at least one electrode compartment can function as a positive electrode or as a negative electrode in the device. The chemical and physical characteristics of the conductive particles can thus be selected according to the desired chemical or physical reaction in the electrode compartment.

In some embodiments, the electrochemical device includes a positive current collector and a negative current collector. The positive current collector is in contact with the positive electrode and/or the negative current collector is in contact with the negative electrode. In some embodiments, the positive current collector is in contact with the positive electrode compartment and/or the negative current collector is in contact with the negative electrode compartment. In some embodiments, the space between the current collector and the ion-permeable membrane forms the electrode compartment. In further embodiments, the current collector is in electric contact with the conductive particles and/or the fluidizing medium. The current collector can be electronically conductive and should be electrochemically inactive under the operation conditions of the electrochemical device. The non-liming examples of current collectors include graphite, copper, nickel, platinum, gold, aluminum, and titanium. The current collector can be in a form of plate, sheet or mesh, or any configuration for which the current collector may be distributed in the electrolyte and permit fluid flow. Selection of current collector materials is well-known to those skilled in the art. In some exemplary embodiments, graphite is used as the positive current collector and as the negative current collector.

In some embodiments, the electrochemical device according to the principles of the present invention is for use in energy storage. In some embodiments, the electrochemical device is for use in water desalination.

Reference is made to FIG. 1 which schematically illustrates electrochemical device for use in energy storage system, in accordance to some embodiments. Electrochemical device 101 includes electrode compartment 103a and electrode compartment 103b. Electrochemical device 101 further includes tube 105a and tube 105b, which are in fluid-flow connection with electrode compartment 103a and electrode compartment 103b, respectively. Electrode compartment 103a and electrode compartment 103b include conductive particles 107, which sediment under gravitational force. The mean particles size of conductive particles 107 is about 100 μm. Electrode compartment 103a further includes liquid fluidizing medium 109a in which conductive particles 107 are suspended. Electrode compartment 103b further includes liquid fluidizing medium 109b in which conductive particles 107 are suspended. Fluidizing medium 109a and/or fluidizing medium 109b can comprise an electrolyte of the energy storage device. A major portion of conductive particles 107 is retained in electrode compartments 103a and 103b under the flow of fluidizing medium 109a and 109b respectively. Velocity of fluidizing medium 109a and/or 109b differs from the velocity of conductive particles 107. The flow of conductive particles 107 is retarded relatively to the flow of fluidizing medium 109a and fluidizing medium 109b. The angle between the direction of the flow of fluidizing medium 109a and 109b and the direction of the sedimentation flow of conductive particles 107 (depicted as arrow $\bar{g}$) is 180° and the loading of conductive particles 107 in electrode compartments 103a and 103b is significantly higher than in tubes 105a and 105b. Electrode compartments 103a and 103b depicted in FIG. 1 are termed herein fluidized bed electrodes. Electrochemical device 101 further includes ion-permeable membrane 111, which separates electrode compartments 103a and 103b.

Figure 2:
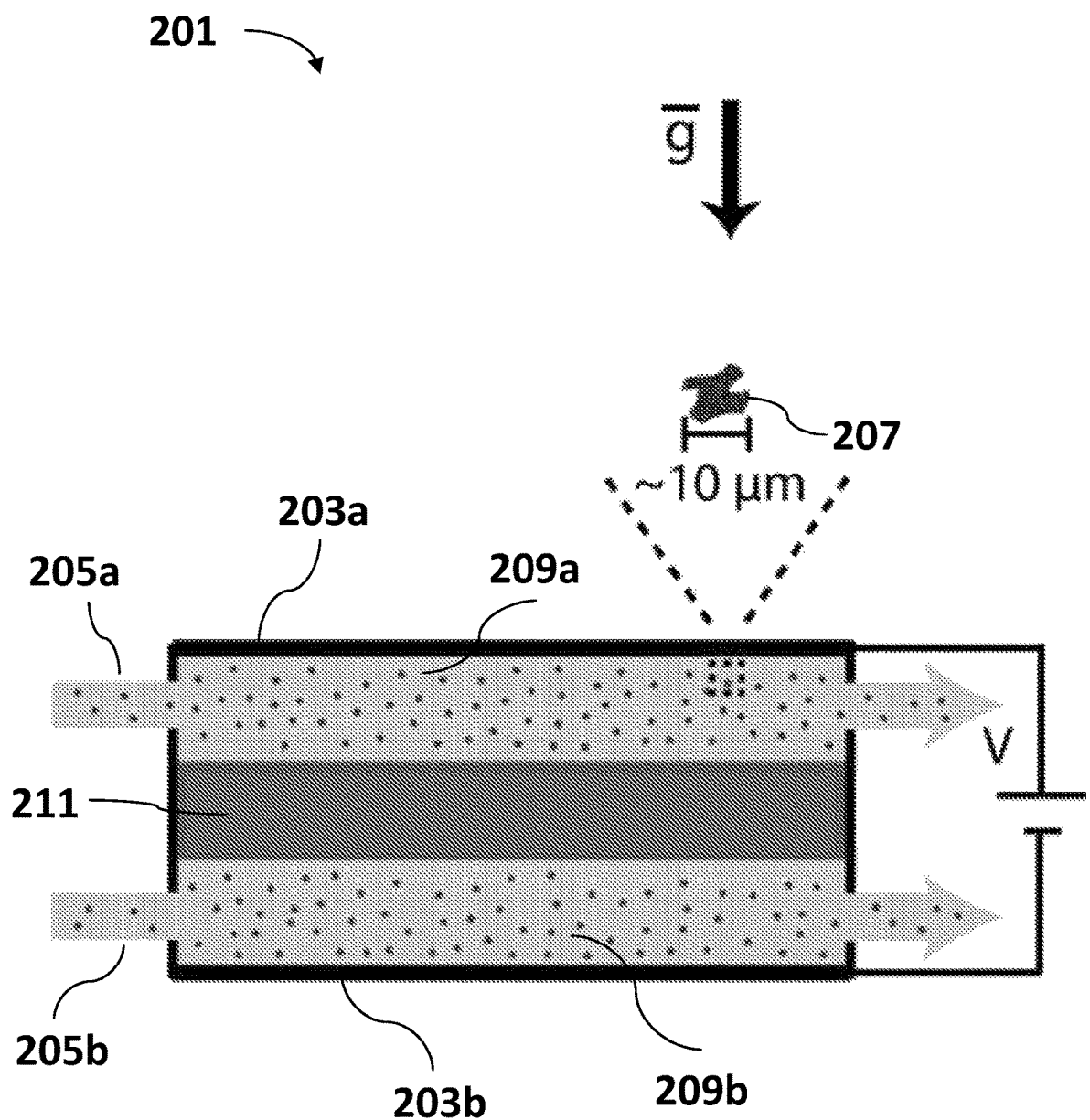
FIG. 2: Schematic representation of the electrochemical device including slurry electrodes in which gravity has no significant effect (due to smaller particles or horizontal flow), and the particles are entrained by the electrolyte (travel at the same velocity).

Reference is made to FIG. 2 which schematically illustrates a comparative example of electrochemical device for use in energy storage system, which includes slurry electrodes instead of the fluidized bed electrodes or hybrid electrodes, according to the principles of the present invention. Electrochemical device 201 includes electrode compartment 203a and electrode compartment 203b. Electrochemical device 201 further includes tube 205a and tube 205b, which are in fluid-flow connection with electrode compartment 203a and electrode compartment 203b, respectively. Electrode compartment 203a and electrode compartment 203b include conductive particles 207, which do not sediment under gravitational force (depicted as arrow $\bar{g}$). The mean particles size of conductive particles 207 is about 10 μm. Electrode compartment 203a further includes liquid 209a in which flow conductive particles 207 are entrained. Electrode compartment 203b further includes liquid 209b in which flow conductive particles 207 are entrained. The angle between the direction of the flow of liquid 209a and 209b and the direction of the flow of conductive particles 207 is 0° and the loading of conductive particles 207 in electrode compartments 203a and 203b is essentially the same as in tubes 205a and 205b. Electrode compartments 203a and 203b depicted in FIG. 2 are slurry electrodes, which are commonly used in energy storage and water desalination systems. Electrochemical device 201 further includes ion-permeable membrane 211, which separates electrode compartments 203a and 203b.

Figure 3:
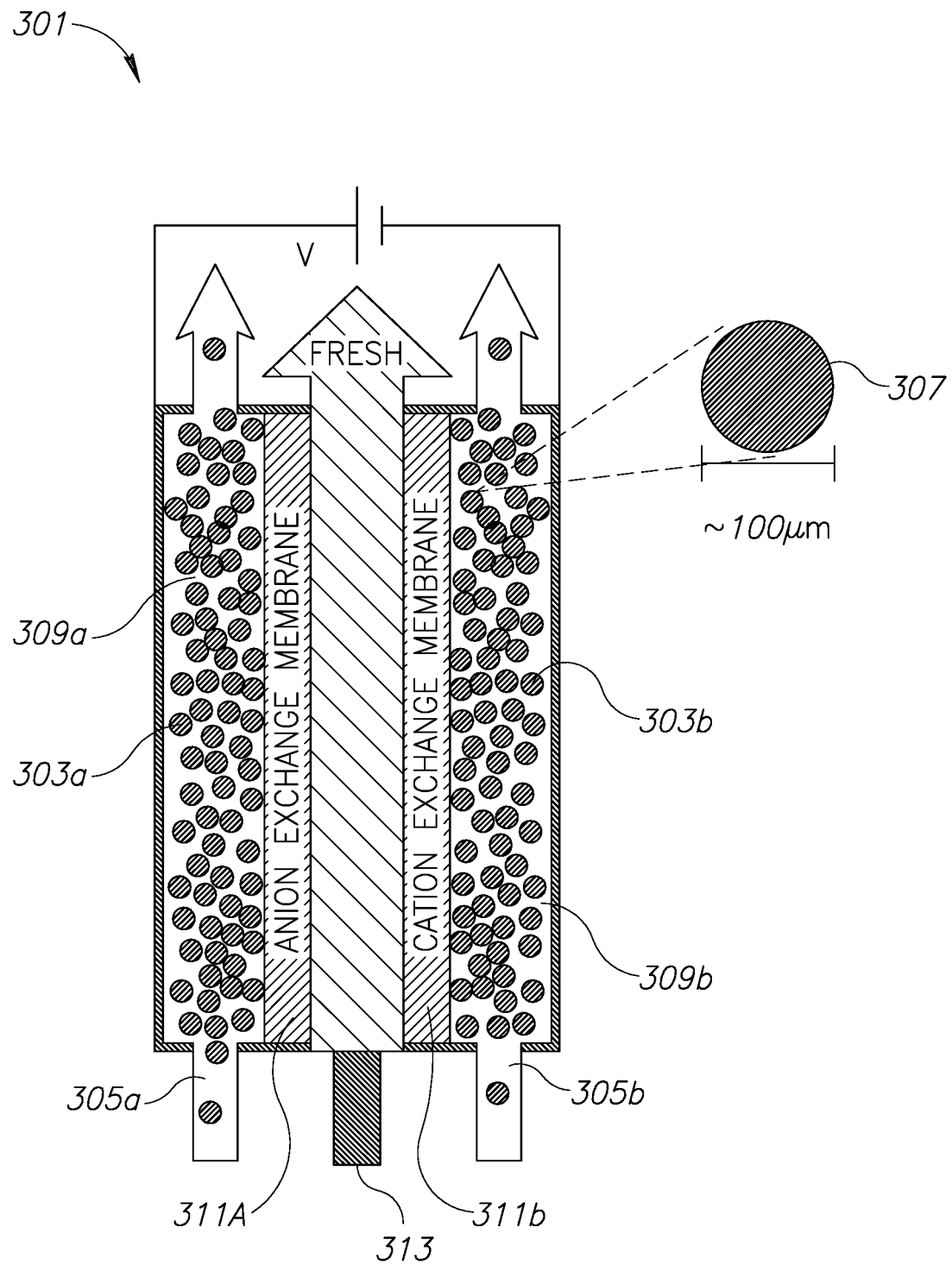
FIG. 3: Schematic representation of the electrochemical device for use in water desalination, including fluidized bed electrodes.

Reference is made to FIG. 3 which schematically illustrates electrochemical device for use in water desalination system, in accordance to some embodiments. Electrochemical device 301 includes electrode compartment 303a and electrode compartment 303b. Electrochemical device 301 further includes tube 305a and tube 305b, which are in fluid-flow connection with electrode compartment 303a and electrode compartment 303b, respectively. Electrode compartment 303a and electrode compartment 303b include conductive particles 307, which sediment under gravitational force. The mean particles size of conductive particles 307 is about 100 μm. Electrode compartment 303a further includes liquid fluidizing medium 309a in which conductive particles 307 are suspended. Electrode compartment 303b further includes liquid fluidizing medium 309b in which conductive particles 307 are suspended. Fluidizing medium 309a and/or fluidizing medium 309b can comprise a feed solution of the water desalination system. A major portion of conductive particles 307 is retained in electrode compartments 303a and 303b under the flow of fluidizing medium 309a and 309b respectively. Velocity of fluidizing medium 309a and/or 309b differs from the velocity of conductive particles 307. The flow of conductive particles 307 is retarded relatively to the flow of fluidizing medium 309a and fluidizing medium 309b. The angle between the direction of the flow of fluidizing medium 309a and 309b and the direction of the sedimentation flow of conductive particles 307 (depicted as arrow $\bar{g}$) is 180° and the loading of conductive particles 307 in electrode compartments 303a and 303b is significantly higher than in tubes 305a and 305b. Electrode compartments 303a and 303b depicted in FIG. 3 are termed herein fluidized bed electrodes. Electrochemical device 301 further includes ion-permeable membrane 311a, which is an anion exchange membrane and ion-permeable membrane 311b, which is a cation exchange membrane. Ion-permeable membranes 311a and 311b separate electrode compartments 303a and 303b. Ion-permeable membranes 311a and 311b are separated from each other by the flow of a feed stream 313.

Figure 4:
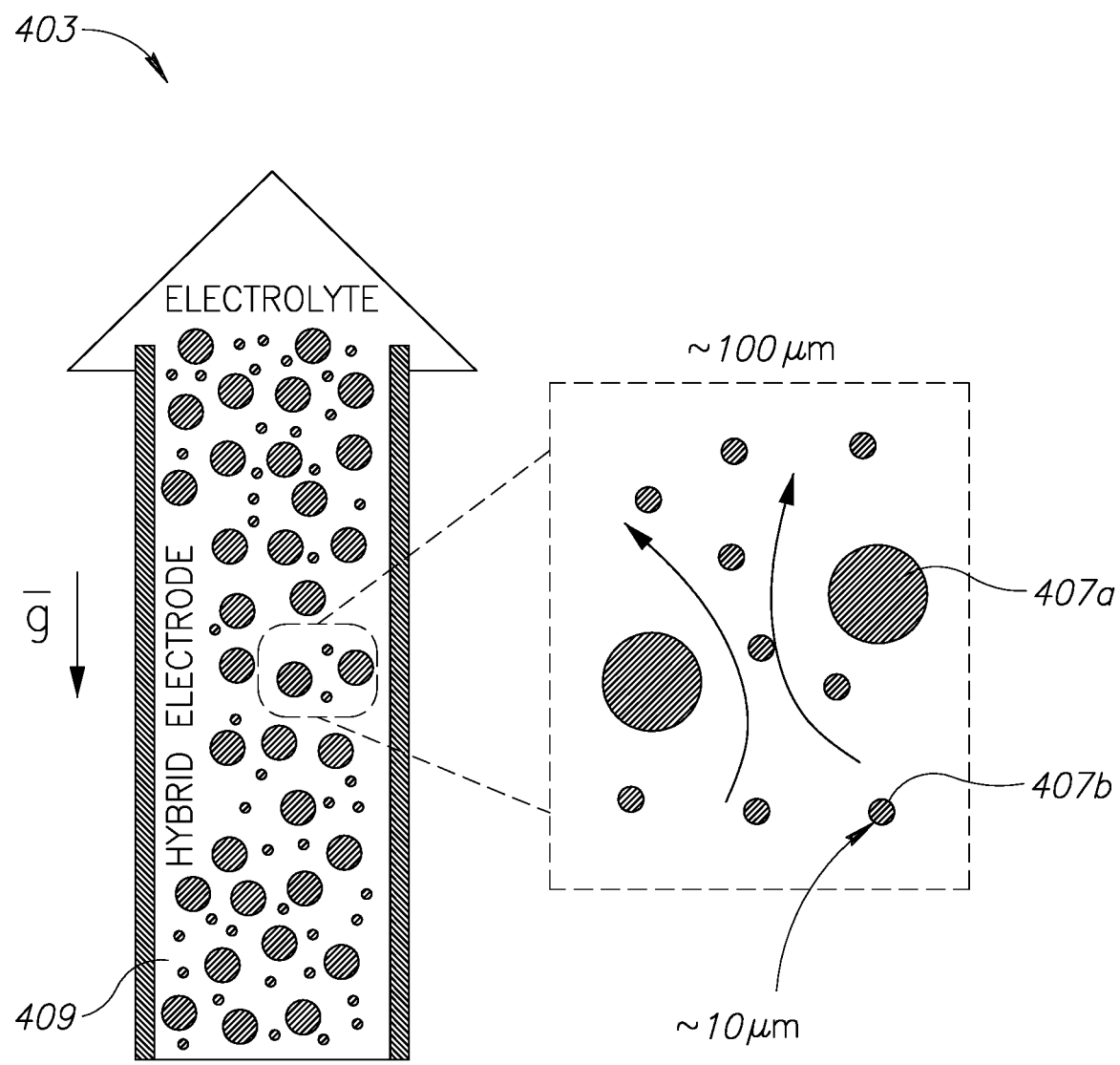
FIG. 4: Schematic representation of the hybrid electrode combining a fluidized bed (comprising beads having a mean particle size of above about 100 μm) and a slurry (comprising sub-10 μm particles), wherein flow of the fluidizing medium is against gravitational force.

Reference is made to FIG. 4 which schematically illustrates the electrode compartment, which is termed herein a hybrid electrode, in accordance to some embodiments. Electrode compartment 403 includes conductive particles 407a, which sediment under gravitational force and conductive particles 407b, which do not sediment under gravitational force. The mean particles size of conductive particles 407a is about 100 μm and of conductive particles 407b is about 10 μm. Electrode compartment 403 further includes liquid fluidizing medium 409 in which conductive particles 407a are suspended and by which flow conductive particles 407b are entrained. Conductive particles 407a are retained in electrode compartment 403 under the flow of fluidizing medium 409. The angle between the direction of the flow of fluidizing medium 409 and the direction of the sedimentation flow of conductive particles 407a (depicted as arrow $\bar{g}$) is 180°. In some embodiments, conductive particles 407a include carbon beads and conductive particles 407b include activated carbon particles. While the larger beads are significantly affected by gravitational forces, the particles are not significantly affected due to their smaller size. Thus, the slurry flows along with the liquid between the slower moving fluidized bed beads, and enhances the carbon-carbon collision rates.

Further provided is an electrochemical system comprising the device according to the principles of the present invention and at least one external tank, which is in fluid flow connection with the at least one tube.

In some embodiments, the tank is configured to store the conductive particles prior to the electrochemical operation of the system. In certain such embodiments, the conductive particles comprise particles which sediment under gravitational force in the electrode compartment, particles which do not sediment under gravitational force in the electrode compartment and a combination thereof. In further embodiments, the tank is configured to store the fluidizing medium prior to the electrochemical operation of the system. In still further embodiments, the tank is configured to deliver the conductive particles to the at least one tube and/or to receive the conductive particles from the at least one tube during the electrochemical operation of the system. In certain such embodiments, the conductive particles comprise particles which do not sediment under gravitational force in the electrode compartment. In yet further embodiments, the tank is configured to deliver the fluidizing medium to the at least one tube and/or to receive the fluidizing medium from the at least one tube during the electrochemical operation of the system. According to some embodiments, the tank is further configured to store, deliver and/or receive the redox species. In other embodiments, the tank is configured to store, deliver and/or receive the feed solution.

The term "electrochemical operation", as used herein refers to the operation of the system under applied voltage and/or current.

The at least one tube can comprise one or more tubes. In some embodiments, the at least one tube includes a tube, which connects the tank with the electrode compartment and delivers the conductive particles and/or the fluidizing medium from the tank to the electrode compartment and a tube, which connects the electrode compartment with the tank and delivers the conductive particles and/or the fluidizing medium from the electrode compartment to the tank. The term "tube" can refer to said two tubes as two parts of one tube. In some embodiments, the conductive particles comprise particles which do not sediment under gravitational force in the electrode compartment.

In some embodiments, the contents of the tank are mixed before the electrochemical operation of the system. In some embodiments, the contents of the tank are continuously mixed during the electrochemical operation of the system.

The electrochemical system can include a plurality of tanks, such as, for example, two tanks. The different tanks can store different conductive particles, suitable for use in the positive and in the negative electrode of the system. The different tanks can further store different redox species suitable for use in the positive and in the negative electrode of the system. The different tanks can further store different redox species suitable for use in the positive and in the negative electrode of the system.

The electrochemical system can further include additional tanks, which are not in a direct fluid flow contact with the at least one tube.

In some embodiments, the electrochemical system comprises a pump. In some embodiments, the pump is configured to induce the delivery of the conductive particles to the electrode compartment prior to the electrochemical operation of the system. In certain such embodiments, the conductive particles comprise particles which sediment under gravitational force in the electrode compartment, particles which do not sediment under gravitational force in the electrode compartment and a combination thereof. In further embodiments, the pump is configured to induce the delivery of the fluidizing medium to the electrode compartment prior to the electrochemical operation of the system. In still further embodiments, the pump is configured to induce the delivery of the conductive particles to the electrode compartment and/or from the electrode compartment during the operation of the system. In certain such embodiments, the conductive particles comprise particles which do not sediment under gravitational force in the electrode compartment. In yet further embodiments, the pump is configured to induce the delivery of the fluidizing medium to the electrode compartment and/or from the electrode compartment during the electrochemical operation of the system. In additional embodiments, the pump is configured to cycle the conductive particles, which do not sediment under gravitational force, and/or the fluidizing medium through the electrochemical system. Cycling through the system can include cycling through the at least one tube, the at least one electrode compartment and the at least one storage tank. According to some embodiments, the pump is further configured to induce the delivery of the redox metal ion, hydrogen ion or hydroxyl ion.

It is to be emphasized that before the electrochemical operation of the system, conductive particles, which sediment under gravitational force, the fluidizing medium and, optionally, conductive particles, which do not sediment under gravitational force are delivered by the pump from the storage tank through the at least one tube to the at least one electrode compartment, thereby forming a fluidized bed electrode or a hybrid suspension electrode. However, during the electrochemical operation of the stack said conductive particles, which sediment under gravitational force are retained within the electrode compartment and the pump induces delivery of the fluidizing medium and conductive particles which do not sediment under gravitational force only. The term "retained", as used herein refers to the loading of the conductive particles, which sediment under gravitational force, in the electrode compartment, which constitutes at least about 70% of the total loading of said conductive particles in the electrochemical device, at least about 80%, at least about 85%, at least about 90%, at least about 95%, or at least about 98% of the total loading of said conductive particles in the electrochemical device.

The pump can be of any type suitable for inducing delivery of the conductive particles, as described herein. The non-limiting examples of suitable pumps include peristaltic pump, piston pump, electroosmotic pump, positive displacement pump, or gravitational pumping.

The electrochemical system can include a plurality of pumps. The delivery of the conductive particles, which do not sediment under gravitational force to the two different electrode compartments can be induced independently by two different pumps. Two different pumps can cycle conductive particles, which do not sediment under gravitational force and/or the fluidizing medium through the two different tubes, two different electrode compartments and two different storage tanks. The pumps can provide independent control of the flow rates of the conductive particles, which do not sediment under gravitational force and/or the fluidizing medium through the two electrode compartments. The independent control permits adjustment of the packing and/or loading of the conductive particles, which sediment under gravitational force in the different electrode compartments, as well as the conductivity and capacity of the conductive particles in total.

It is to be emphasized that the pumping direction of the conductive particles, which do not sediment under gravitational force and/or of the fluidizing medium cannot be reversed, which is a conventional procedure in the systems including slurry electrodes, since the angle between the flow of the fluidizing medium and the direction of the sedimentation flow of the conductive particles should be above 90° but below 270° to allow formation of the fluidized bed electrode or a hybrid electrode The electrochemical system can further include at least one endplate, preferably made from a polymeric material.

In some embodiments, the electrochemical system comprises an energy storage system. The energy storage system can comprise the device according to the principles of the invention, wherein the device comprises an electrode compartment, a tube and a solid electrode, and the system further comprises a tank in fluid-flow connection with the tube, also termed herein "storage tank". In other embodiments, the energy storage system comprises the device according to the principles of the invention, wherein the device comprises two electrode compartments and two tubes, and the system further comprises two storage tanks, each tank being in fluid flow connection with one tube. The one or more storage tanks can include redox species, which undergo electrochemical reactions in the one or more electrode compartments of the system.

The energy system according to the principles of the present invention can be configured in any form, which can accommodate a non-solid electrode. The non-limiting examples of such energy storage systems include a flow battery, a supercapacitor and a capacitive mixing system. The flow battery can be selected from zinc-bromine flow battery, all-iron flow battery, vanadium redox flow battery, lithium-ion flow battery, sodium-sulfur flow battery, lead-acid flow battery, and nickel metal hydride flow battery.

In some embodiments, the fluidizing medium comprises an electrolyte. The electrolyte can be an aqueous-based electrolyte or an organic solvent-based electrolyte. Each possibility represents a separate embodiment of the invention. The non-limiting examples of suitable organic solvents include ethylene carbonate (EC), propylene carbonate (PC), diethyl carbonate (DEC), dimethyl carbonate (DMC), ethyl formate (EF), methyl formate (MF), 1-ethyl-3-methylimidazolium bis (trifluoromethylsulfonyl)imide, 1-ethyl-3-methylimidazolium trifluoromethanesulfonate, 1-hexyl-3-methylimidazolium hexafluorophosphate, 1-ethyl-3-methylimidazolium dicyanamide, 11-methyl-3-octylimidazolium tetrafluoroborate and combinations thereof.

In further embodiments, the electrolyte comprises a combination of a liquid phase and an organic phase. In certain embodiments, the organic phase includes a bromine sequestering agent (BSA). The aqueous phase can be separated from the organic phase. In further embodiments, the fluidizing medium includes only the aqueous phase of the electrolyte.

In some embodiments, the fluidizing medium is different than the electrolyte of the energy storage system.

In some exemplary embodiments, the energy storage system is configured in a form of a zinc-bromine flow battery comprising a first electrode compartment comprising a first group of carbon particles and zinc ions solution, wherein the loading of carbon is at least about 30% wt. In further embodiments, the zinc-bromine flow battery comprises a second electrode compartment comprising a first group of carbon particles and bromine solution. The carbon particles can include activated carbon beads. In some embodiments, the first group of carbon particles has a mean particle size of at least about 50 μm. The first group of carbon particles can have a mean particle size in the range of 70 μm to about 150 μm. In certain embodiments, the carbon particles further comprise deposited zinc. Zinc can be present on the surface and/or in the bulk of the carbon particles. In some embodiments, the first electrode compartment further includes a second group of carbon particles, which have a mean particle size, which is at least about 50% lower than the mean particle size of the first group of carbon particles. In some embodiments, the second electrode compartment further includes a second group of carbon particles, which have a mean particle size, which is at least about 50% lower than the mean particle size of the first group of carbon particles. In some embodiments, the carbon particles the second group of carbon particles have a mean particle size in the range of below about 30 μm. In certain embodiments, the carbon particles the second group of carbon particles have a mean particle size in the range of 5 μm to about 15 μm.

In some embodiments, the zinc-bromine flow battery further comprises a first storage tank comprising carbon particles and zinc ions solution and a second storage tank comprising carbon particles and bromine solution. The bromine solution can further include bromine sequestering agent (BSA).

In some embodiments, the zinc-bromine flow battery comprises an ion-permeable membrane comprising a Nafion® proton exchange membrane or Neosepta® CMX In some embodiments, the electrochemical system comprises a water desalination system. In some embodiments, the water desalination system comprises the device according to the principles of the invention, wherein the device comprises two electrode compartments and two tubes, and the system further comprises a tank, being in fluid flow connection with each tube. In some embodiments, the tank includes feed solution. The tank can include a mixing vessel. In some embodiments, the mixing vessel includes the conductive particles and feed solution. In some embodiments, the conductive particles are delivered from the mixing vessel to the electrode compartments before the electrochemical operation of the system, thereby forming the fluidized bed electrodes (when the mixing vessel includes conductive particles which sediment under gravitational force) or hybrid bed electrodes (when the mixing vessel includes conductive particles which sediment under gravitational force and conductive particles, which do not sediment under gravitational force). In the electrode compartments, the conductive particles are charged during the electrochemical operation of the system and electrosorb salt ions. The conductive particles can be delivered to the mixing vessel following the electrochemical operation of the system for regeneration process. Regeneration process can be a spontaneous process, wherein the charged conductive particles spontaneously release salts via discharging collision. The water desalination system can further comprise two ion-permeable membranes and a brine tank and a product tank.

The water desalination system can be configured in a form of a Capacitive Deionization (CDI) system.

Figure 5:
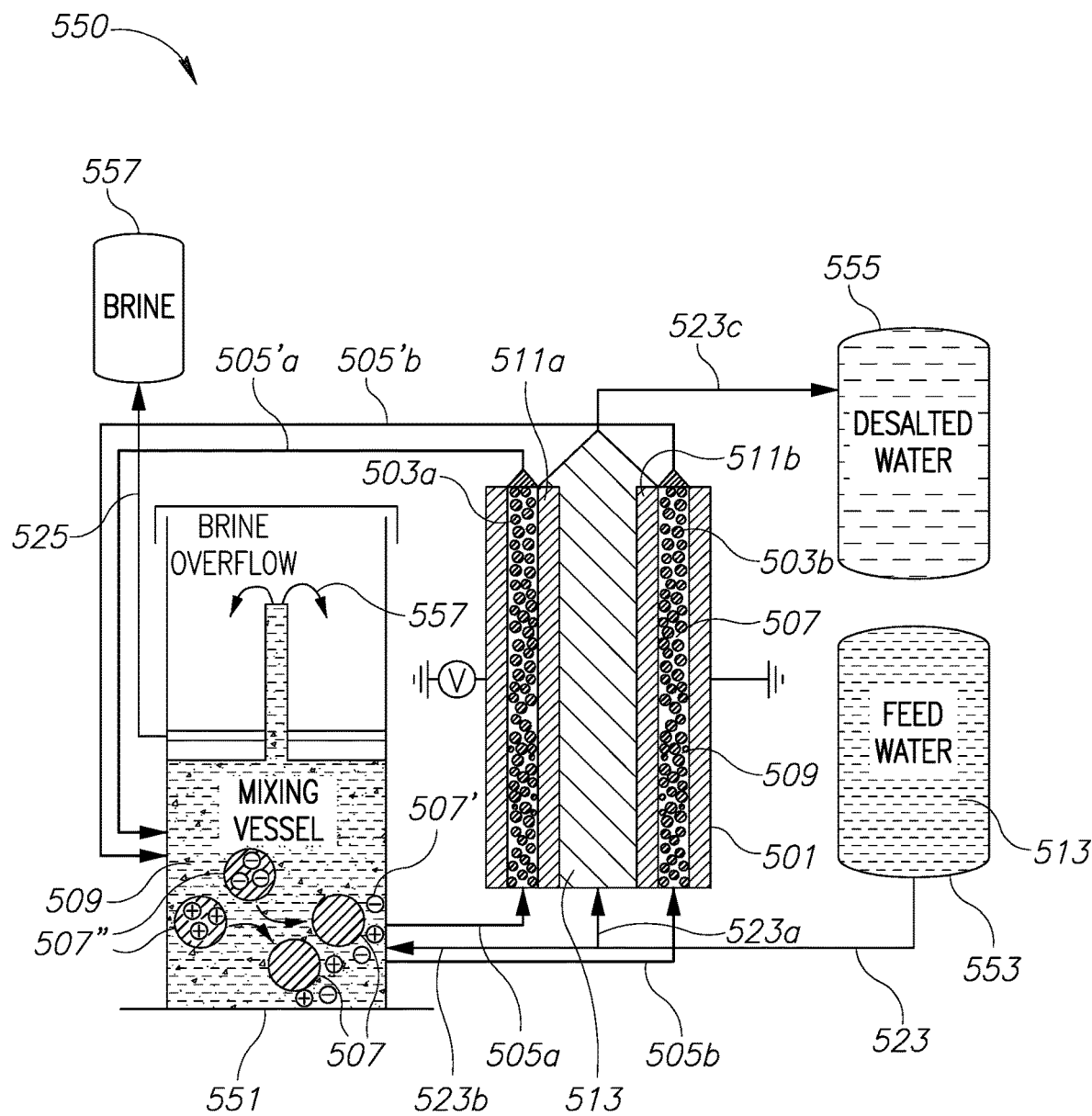
FIG. 5: Schematic representation of the CDI system for continuous desalination and closed-loop electrode regeneration and re-use, comprising fluidized bed electrodes.
Figure 6A:
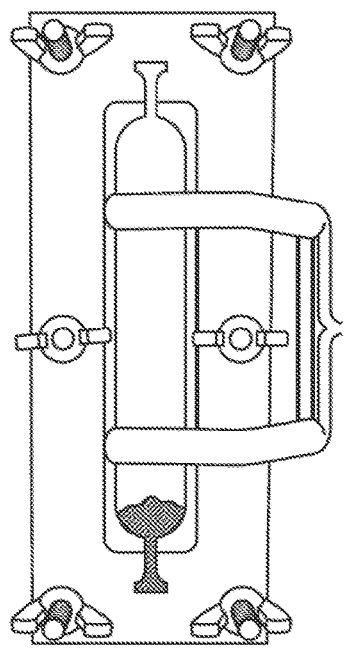
FIGS. 6A-6C: Pictures of the rise of the fluidized bed in the optically accessible compartment, which are sequential in time, with FIG. 6A occurring earliest followed by FIG. 6B and then FIG. 6C.
Figure 6B:
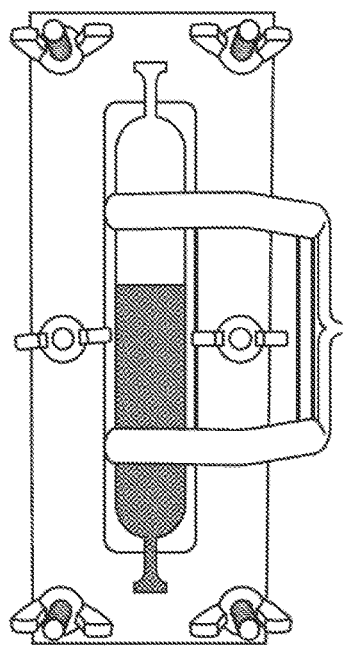
Figure 6C:
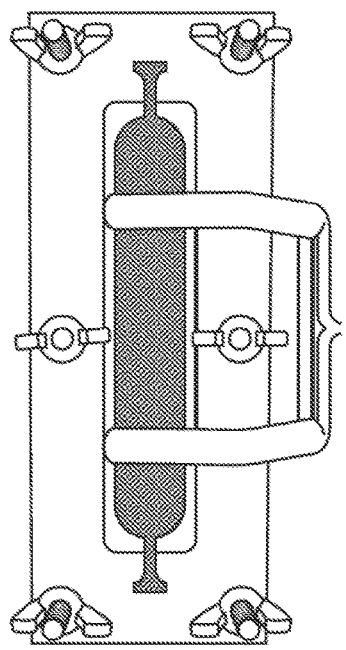

Reference is made to FIG. 5 which schematically illustrates CDI system, in accordance to some embodiments. CDI system 550 includes electrochemical device 501. Electrochemical device 501 includes electrode compartment 503a and electrode compartment 503b. Electrochemical device 501 further includes tube 505a and tube 505b, which are in fluid-flow connection with electrode compartment 503a and electrode compartment 503b, respectively. Electrode compartment 503a and electrode compartment 503b include conductive particles 507, which sediment under gravitational force. Electrode compartments 503a and 503b further include liquid fluidizing medium 509 in which conductive particles 507 are suspended. Fluidizing medium 509 comprises a feed solution of CDI system 550. A major portion of conductive particles 507 is retained in electrode compartments 503a and 503b under the flow of fluidizing medium 509. The angle between the direction of the flow of fluidizing medium 509 and the direction of the sedimentation flow of conductive particles 507 is 180° and the loading of conductive particles 507 in electrode compartments 503a and 503b is significantly higher than in tubes 505a and 505b. Electrochemical device 501 further includes ion-permeable membrane 511a, which is an anion exchange membrane and ion-permeable membrane 511b, which is a cation exchange membrane. Ion-permeable membranes 511a and 511b separate electrode compartments 503a and 503b. Ion-permeable membranes 511a and 511b are separated from each other by the flow of a feed stream 513.

CDI system 550 further includes mixing vessel 551, feed tank 553, product tank 555 and brine tank 557. Feed tank includes feed solution 513. Feed tank 553 is in fluid flow connection with electrochemical device 501 through tube 523 and tube 523a. Feed tank 553 is further in fluid flow connection with mixing vessel 551 through tube 523 and tube 523b. Mixing vessel 551 includes fluidizing medium 509, which includes feed solution 513. Mixing vessel further includes conductive particles 507. Conductive particles 507 are pumped by at least one pump (not shown) from mixing vessel 551 into electrode compartments 503a and 503b prior to the electrochemical operation of system 550, thereby forming fluidized bed electrodes. During the electrochemical operation of system 550 conductive particles 507 are charged and electrosorb salt ions 507', forming charged particles 507". Following electrochemical operation of system 550 charged particles 507" are returned to mixing vessel 551 through tubes 505'a and 505'b. In mixing vessel 551 charged particles 509" spontaneously release salt ions 507', thereby regenerating conductive particles 507. Flow of feed solution 513 into mixing vessel 551 through tube pushes brine 559 into brine tank 557 through tube 525. Deionized feed solution 513 is transferred to product tank 555 through tube 523c during electrochemical operation of system 550.

In some exemplary embodiments, there is provided a CDI system comprising electrochemical device according to the principles of the present invention comprising two electrode compartments comprising a first group of carbon particles and feed solution, wherein the loading of the carbon particles is at least about 30% wt. In some embodiments, the carbon particles the second group of carbon particles have a mean particle size in the range of below about 30 μm. The first group of carbon particles can have a mean particle size of from about 100 μm to about 300 μm. The carbon particles can include activated carbon beads. In certain embodiments, the carbon particles further comprise electrosorbed salt ions. The ions can be present on the surface and/or in the bulk of the carbon particles. Conductive particles of one electrode compartment comprise positive salt ions and conductive particles of the other electrode compartment comprise negative salt ions, based on the polarity of the electrochemical device. In some embodiments, the electrode compartments further include a second group of carbon particles, which have a mean particle size, which is at least about 50% lower than the mean particle size of the first group of carbon particles. In some embodiments, the carbon particles the second group of carbon particles have a mean particle size in the range of below about 30 μm. In certain embodiments, the carbon particles the second group of carbon particles have a mean particle size in the range of 5 μm to about 15 μm.

In some embodiments, the CDI system further comprises a feed storage tank comprising feed solution and a mixing vessel, in which carbon particles are mixed with feed solution. Prior to and following the electrochemical operation of the system.

As used herein and in the appended claims the singular forms "a", "an," and "the" include plural references unless the content clearly dictates otherwise. Thus, for example, reference to "a redox metal ion" includes a plurality of such redox metal ions and equivalents thereof known to those skilled in the art, and so forth. It should be noted that the term "and" or the term "or" is generally employed in its sense including "and/or" unless the content clearly dictates otherwise.

As used herein, the term "about", when referring to a measurable value such as an amount, a temporal duration, and the like, is meant to encompass variations of +/−20%, more preferably +/−5%, even more preferably +/−1%, and still more preferably +/−0.1% from the specified value, as such variations are appropriate to perform the disclosed methods.

The term "plurality," as used herein, means two or more.

When not expressly specified, the term "conductive particles" can refer to the conductive particles, which sediment under the gravitation force (alternatively termed herein "the first group of particles"), to the conductive particles, which do not sediment under the gravitation force (alternatively termed herein "the second group of particles"), or to a combination thereof.

Clauses

1. An electrochemical device, comprising a first current collector; a second current collector; at least one separator; at least one electrode compartment positioned between said first or second current collectors and the separator; and at least one tube in fluid-flow connection with the electrode compartment, the electrode compartment comprising conductive particles comprising carbon, which sediment under gravitational force and a liquid fluidizing medium in which said conductive particles are suspended, wherein the fluidizing medium flows through the electrode compartment in a non-horizontal direction, and the loading of the conductive particles in the electrode compartment is above about 15% wt. and at least about 50% higher than in the tube.

2. The device according to clause 1, wherein the angle between the direction of the flow of the fluidizing medium and the direction of the sedimentation flow of the conductive particles is above 90°.

3. The device according to any one of clauses 1 or 2, wherein the loading of the conductive particles in the electrode compartment is above about 20% wt. and at least about 70% higher than in the tube.

4. The device according to any one of clauses 1 to 3, wherein the conductive particles which sediment under gravitational force are characterized by Archimedes number of order 1 or higher.

5. The device according to any one of clauses 1 to 4, wherein carbon is selected from the group consisting of activated carbon, carbon black, graphitic carbon, carbon beads, carbon fibers, carbon microfibers, fullerenic carbons, carbon nanotubes (CNTs), graphene sheets or aggregates of graphene sheets, and materials comprising fullerenic fragments and any combination thereof.
6. The device according to clause 5, wherein the conductive particles comprise carbon beads.
7. The device according to clause 5, wherein the conductive particles comprise CNTs.
8. The device according to clause 6, wherein the CNTs comprise multi-walled carbon nanotubes (MWCNTs).
9. The device according to any one of clauses 1 to 8, wherein the conductive particles further comprise a material selected from the group consisting of a metal, metal carbide, metal nitride, metal oxide, polymer, and any combination thereof.
10. The device according to any one of clauses 1 to 9, wherein the conductive particles further comprise a redox species on the surface or in the bulk thereof.
11. The device according to clause 10, wherein the redox species comprises a metal ion selected from the group consisting of zinc, iron, vanadium, chromium, lithium, sodium, magnesium, aluminum, nickel, calcium, lead, copper, cesium, cadmium ions and any combination thereof.
12. The device according to clause 11, wherein the metal ion is deposited, adsorbed, absorbed or intercalated into the conductive particles.
13. The device according to any one of clauses 11 or 12, wherein the metal ion is in a reduced form, in a form of a salt or a ceramic material.
14. The device according to any one of clauses 1 to 13, wherein the loading of carbon in the electrode compartment is above about 30% wt.
15. The device according to any one of clauses 1 to 14, wherein the mean particle size of the conductive particles ranges from about 10 μm to about 500 μm.
16. The device according to any one of clauses 1 to 15, wherein the bulk density of the conductive particles ranges from about 2000 kg/m$^3$ to about 10,000 kg/m$^3$.
17. The device according to any one of clauses 1 to 16, wherein the conductive particles comprise carbon beads having a mean particle size ranging from about 100 μm to about 300 μm.
18. The device according to any one of clauses 1 to 16, comprising MWCNTs having a length of about 1 μm to about 500 μm.
19. The device according to any one of clauses 1 to 18, wherein the loading of the conductive particles in the electrode compartment is at least about 90% higher than in the at least one tube.
20. The device according to any one of clauses 1 to 19, wherein the separator is selected from the group consisting of a membrane, gasket, spacer and any combination thereof.
21. The device according to any one of clauses 1 to 20, further comprising a solid electrode
22. The device according to any one of clauses 1 to 20, comprising two electrode compartments and two tubes.
23. An energy storage system comprising the device according to any one of clauses 1 to 22 and at least one external storage tank, which is in fluid flow connection with the at least one tube, wherein the storage tank is configured to store the conductive particles and/or the fluidizing medium and to deliver the conductive particles and/or the fluidizing medium to the at least one tube prior to the electrochemical operation of the system.
24. The energy storage system according to clause 23, wherein the fluidizing medium comprises an electrolyte.
25. The energy storage system according to any one of clauses 20 or 24, wherein the energy storage system is configured in a form selected from a flow battery, a supercapacitor or a capacitive mixing system.
26. The energy storage system according to clause 25, wherein the flow battery is selected from the group consisting of a zinc-bromine flow battery, hydrogen-bromine, quinone-bromine, vanadium-bromine, all quinone, all-iron flow battery, vanadium redox flow battery, lithium-ion flow battery, lithium-sulfur, sodium ion, sodium-sulfur flow battery, lead-acid flow battery, and nickel metal hydride flow battery.
27. A water desalination system comprising the device according to any one of clauses 1 to 22, wherein the device comprises two separators, wherein the separators are ion-permeable membrane and the system comprises a feed tank comprising a mixing vessel, which is in fluid flow connection with the at least one tube and is configured to mix the fluidizing medium with the conductive particles.
28. The water desalination system according to clause 27, wherein the fluidizing medium comprises a feed solution.
29. The water desalination system according to any one of clauses 27 and 28, configured in a form of a capacitive deionization (CDI) system, comprising two electrode compartments comprising carbon particles having a mean particle size of at least about 50 μm, and the feed solution.
30. The water desalination system according to clause 29, wherein the total loading of the carbon particles is at least about 30% wt.

The following examples are presented in order to more fully illustrate some embodiments of the invention. They should, in no way be construed, however, as limiting the broad scope of the invention. One skilled in the art can readily devise many variations and modifications of the principles disclosed herein without departing from the scope of the invention.

EXAMPLES

Example 1—CDI System Comprising a Fluidized Bed Electrode—Construction, Operation and Characterization Methods The (fluidized bed) Fbed CDI cell consisted of graphite current collectors, acrylic endplates, and Neosepta ion exchange membranes (Neosepta IEM and CMX, Tokuyama, Japan). Recesses of 20 by 112 mm were milled into the acrylic endplates and the graphite current collector was press fit into the recesses, leaving a gap of 1 mm in the acrylic above the current collector. 1.5 mm thick silicon gaskets were placed on top of the acrylic layers with a hole cut into them of 20 by 112 mm. The latter layers formed the electrode compartments, and the entire electrode compartments, after cell compression for sealing, were ~2.4 mm thick. Ion exchange membranes served as the inner wall of the electrode compartments and the outer wall of the feed channel. The feed flow compartment had the same area as the electrode compartments, and was cut into a 0.22 mm thick silicon gasket. The cell was sealed with ten M6, 50 mm long stainless steel bolts, and connection to an external power supply was made with titanium M6, 40 mm long bolt threaded into the outside surface of the acrylic endplates to contact the outside of the current collector.

A separate setup, which was termed the "optically accessible compartment", was constructed to measure carbon weight percent (CWP, expressed in wt %) in the fluidized bed electrode, and this cell consisted simply of a single acrylic endplate with a milled channel for the electrode, at least one silicon gasket with a cut hole forming part of the electrode compartment or an O-ring, and a second acrylic endplate to seal the electrode compartment and allow for optical access into the cell. The electrode compartment area was the same as that used in the Fbed CDI cell, and its thickness was varied between 1.2 and 6.4 mm in order to test the effect of compartment thickness on fluidized bed electrode composition.

The fluidized bed electrode utilized activated carbon beads (TE-3 activated carbon beads, Mast Carbon International Ltd., United Kingdom), where the bead size ranged between 125 and 250 µm in diameter. The beads contain significant microporosity of about 65% [Campos, J. W. et al. Investigation of carbon materials for use as a flowable electrode in electrochemical flow capacitors. *Electrochim. Acta* 98, 123-130 (2013)], and so are appropriate as high performance CDI electrodes. Before use, the beads were wetted and placed on a 75 µm sieve (Cole Parmer, USA) to filter out any small carbon particles. Then, water was poured onto the sieve, filling the sieve and catch pan, causing most beads to sink to the sieve surface. Other beads did not sink, remaining instead above the sieve surface as their pore structure remained filled with air. This process was repeated two more times, and after the third time, any remaining beads which did not sink were skimmed off the top and discarded. The remaining beads were then dried for 24 h at 105° C. before use.

A feed solution of 20 mM NaCl was pumped through the cell's feed channel by a peristaltic pump (Cole Parmer, USA) at either 0.5 or 1.5 mL/min flowrate. Desalted water emerged from the cell, and a conductivity sensor (Metrohm 856, K=0.7 cm$^{-1}$) was placed at the exit to measure the desalted water conductivity. The two current collectors were connected via a Keithley 2400 power supply (Keithley Instruments Inc., USA) which sets a constant voltage difference between them. The voltage used varied from 1.0 to 1.9 V, and the resulting current was between 3 A/m$^2$ and 8 A/m$^2$ (area used is that of a single electrode compartment in the cell). A mixing vessel was made from 57 mm inner diameter PVC pipe, and this held the carbon suspension. The initial suspension (before operation of the cell) consisted of 200 mL of 20 mM NaCl and 18.2 g carbon (8.3 wt %). The contents of the mixing vessel were continuously stirred using a mixer at 300 rpm (Eurostar 60 Digital, IKA, USA) in order to prevent bead sedimentation and ensure a fairly uniform bead concentration in the tank. A peristaltic pump was used to pump the electrodes from the mixing vessel into the two electrode compartments with a flowrate for each electrode of 2.5 mL/min, using 1.6 mm inner diameter norprene tubing (Saint Gobain, France).

After passing through the cell, the suspensions consisted of charged beads with electrosorbed salts, and the beads needed to be discharged before re-use. The charged suspension was therefore returned to the mixing vessel, where the beads spontaneously discharged and released salts via mutual collisions in the stirred tank. The latter resulted in a rise of the conductivity of the tank electrolyte, which was intermittently measured by a second conductivity sensor placed in the tank (Metrohm 856, Switzerland, K=0.7 cm$^{-1}$), see FIG. 5, red triangles. To take these conductivity measurements, the mixer would be stopped for 60 s to allow the beads to temporarily sediment away from the conductivity sensor in the mixing vessel. Thus, the mixing vessel served several purposes, including housing the uncharged carbon beads, regenerating used electrode beads, and holding the brine. In order to prevent the unchecked rise of the brine salt concentration (and hence the concentration of the electrolyte in the fluidized bed electrode), a small part of the feedwater stream was continuously pumped into the mixing vessel at 0.15 mL/min. To remove brine from the tank for discard, an overflow section was created in the mixing vessel. The overflow section was fed by a thin 8 mm inner diameter and 155 mm length vertical tube, which allowed for the separation of brine from beads due to the stagnant (unstirred) condition in the vertical tube. As feedwater was pumped into the mixing vessel, brine was forced up the vertical tube and into the overflow compartment, while beads remained in the mixing vessel.

Example 2—CDI System Comprising a Fluidized Bed Electrode—Results

Optically Accessible Compartment

FIGS. 3A-3C show the rise of the fluidized bed as it initially enters the optically accessible compartment. The pictures are sequential in time, with FIG. 3A showing the initial entrance of beads from the bottom of the compartment, FIG. 3B showing the rise of the dense fluidized bed characterized by a clearly observable bed rise height, and FIG. 3C showing the completed upflow fluidized bed, with beads leaving from the compartment through the top of the compartment. Once the bed fills the compartment, as in FIG. 3C, it will remain formed as long as the slurry is pumped into the compartment, and can be used for water desalination by Fbed CDI.

As is seen in FIG. 3A, experiments in the optically accessible compartment always start with an empty compartment. Prior to the experiment, in the mixing vessel, a bead volume fraction was set to be 10%, corresponding to 11.9 g of carbon beads and 200 g of 20 mM NaCl solution. When this suspension was pumped into the compartment from the bottom, first the compartment filled with electrolyte, then the beads entered and the fluidized bed began to form (FIG. 3B) and eventually filled the entire electrode compartment (FIG. 3C).

As can be seen from FIG. 3B, the growth of the fluidized bed is characterized by a kinematic shock FIG. 3A sharp discontinuity in bead density) where above the shock there is a complete absence of beads. For such a shock, the upwards velocity of the shock is equal to the local velocity of the beads [Probstein, R. F. *Physicochemical hydrodynamics: an introduction,* 2005], and thus the observed bed rise (shock) velocity can be used to calculate the bead volume fraction in the fluidized bed, $\varphi_{bed}$. This is accomplished by a conservation of bead volumetric flux between the cell and upstream tubing, $$\varphi_{bed} = \varphi_{in} Q / U_p A \qquad \text{[Formula 3]}$$

where Q is the total suspension flow rate set by the pump, A is the electrode flow cross sectional area, and $U_p$ is the measured bed rise velocity, and $\varphi_{in}$ is the measured volume fraction of beads in the inflow tubing. In each case, $\varphi_{in}$ was ~5 vol %, translating to a CWP of about 2.5 wt %.

The velocity of the fluidized bed was calculated by $$\frac{dx_{bed}}{dt} = u_{bed} \qquad \text{[Formula 4]}$$

where $x_{bed}$ is the height of the growing bed, t is time, and $u_{bed}$ is the bed velocity. In order to measure $u_{bed}$, 2 cm increments were marked along the height and the time when the shock interface crossed each marking was recorded. Particle velocity ($U_p$), was calculated from the averaged $u_{bed}$ over a 6 cm distance. At the end of the experiment, when the fluidized bed has completely filled the compartment, the flow direction was reversed until all the particles and water were flushed back into the mixing vessel. The experiment then was repeated for a different pump flowrate (as shown by the x-axis of FIG. 7 for the range of superficial velocities used).

The bead volume fraction in Formula 3, $\phi_{bed}$, requires knowledge of the bead volume fraction of the inflow into the electrode compartment, $\phi_{in}$, and thus $\phi_{in}$ was measured directly. After the measurement of the bed rise velocity, the inlet tube leading to the cell was disconnected from the cell and maintained in the same orientation. The suspension was then flown for 2 min at a specified flowrate, and the outflow from the tube was collected in a beaker and weighed. Then the beaker was placed for 24 h into an oven at 105° C. and weighed again. From this, the mass of dry beads, $m_1$, and the total mass of water in the suspension, $m_w$, was obtained. This experiment was repeated for several flow rates within the range tested in the bed rise velocity experiment, but the measured $\phi_{in}$ did not vary significantly with flow rate. The parameter $\phi_{in}$ was obtained using $$\frac{m_1}{\rho_c(1-p)} = \phi_{in} \cdot \left(\frac{m_w}{\rho} + \frac{m_1}{\rho_c}\right) \qquad \text{[Formula 5]}$$

resulting in a number for inflow bead volume fraction of $\phi_{in}$~5 vol %.

Subsequently, $\phi_{bed}$ was converted to CWP using $$CWP = \frac{\phi_{bed}(1-p)\rho_c}{\phi_{bed}\rho_p + (1-\phi_{bed})\rho} \qquad \text{[Formula 6]}$$

where $\rho_c$ is the mass density of the carbon phase ("skeleton density", $\rho_c$=1.7 g/mL), $\rho_p$ is the density of the electrolyte filled carbon particle ($\rho_p$=1.23 g/mL), $\rho$ is the density of water ($\rho$=1 g/mL), and p is bead porosity (p=0.67).

The carbon "skeleton density", $\rho_c$, was measured by placing a known mass of dry carbon beads, $m_1$, into a graduated cylinder, and then adding a known volume of deionized water, $V_w$. The cylinder was closed using parafilm, then the mixture was shaken, and after ~10 min (when outgas bubbles are no longer observed) the total volume, V, of the mixture is read off. From these measurements the carbon density was calculated using $$\rho_c = \frac{m_1}{V - V_w} \qquad \text{[Formula 7]}$$

from which a value is obtained of $\rho_c$=1.7 g/mL which is near the typical value for activated carbons of $\rho_c$~1.9 g/mL (Kim et al., 2015).

In order to determine the porosity of the beads, p, we began with a known mass, $m_1$, of dry beads in a beaker. Then, deionized water was added to the beaker, and the beaker was shaken until outgassing was no longer observed (the beads are water filled). The beaker was then emptied onto a 75 micron sieve in order to collect the saturated beads, and to remove the water from between the beads. To remove surface water on the beads, the sieve were shaken in order to distribute all beads over the sieve (single layer), and then a wiper (Kimwipes, Kimberly-Clark) was used to absorb water from the bottom of the sieve mesh. This process was repeated after re-shaking the sieve, until the wiper remained dry. Subsequently, the mass of the water-filled beads, $m_2$ was measured. The bead porosity, p, defined as the open bead volume divided by total bead volume, was calculated by $$\frac{1}{p} = 1 + \frac{\rho}{\rho_c}\frac{m_1}{m_2 - m_1} \qquad \text{[Formula 8]}$$

resulting in a number for bead porosity of p=0.67.

Figure 7:
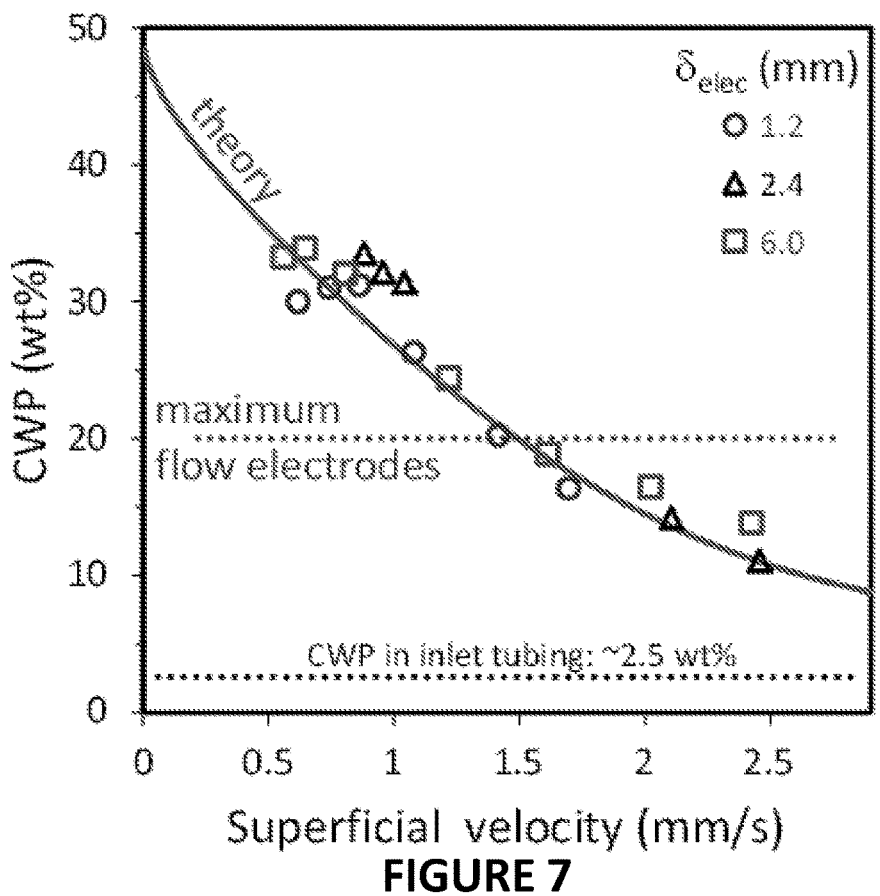
FIG. 7: Plot of the measured carbon weight percent (CWP) of the fluidized bed versus bed superficial velocity, $U_{sup}$ for various compartment thicknesses, $\delta_{elec}$ (○—1.2 mm, Δ—2.4 mm and □—6.0 mm). The experimental data was fitted to the Richardson-Zaki equation ("theory" curve).

FIG. 7 represents a plot of the experimentally measured electrode CWP (Formula 6) versus the electrode superficial velocity, $U_{sup}$ ($U_{sup}$=Q/A), for varying electrode compartment thicknesses, $\delta_{elec}$, including 1.2, 2.4 and 6.0 mm. The data in FIG. 7 were fit to the Richardson-Zaki equation. One of the unique features of fluidized beds is that the carbon bead volume fraction (and also CWP) is not a static value as in flow electrodes, but a function of the relative velocity between the particle and liquid. For sedimentation, this relationship is often described by the empirical Richardson-Zaki relation:

$$U_p - U_w = U_T(1-\phi)^{n-1} \qquad \text{[Formula 9]}$$

where $U_p$ is the local particle velocity, $U_w$ is the local electrolyte velocity, $U_T$ is the terminal velocity of a single sedimenting particle, $\varphi$ is the particle volume fraction in the bed, and n is an empirically determined parameter (n~4.65 for sedimentation in the creeping flow regime with smooth spherical particles) [Richardson, J. F. & Zaki, W. N. Sedimentation and fluidisation: Part I. *Chem. Eng. Res. Des.* 75, S82-S100 (1997)].

It was found that the data were largely consistent with this equation for a best-fit exponent n~1.1, and coefficient $U_T$~2.5 mm/s ("theory" curve in FIG. 7). From FIG. 7, it was observed that the fluidized bed exhibits a higher CWP at lower $U_{sup}$, while CWP does not vary significantly with $\delta_{elec}$. The maximum CWP obtained was about 35 wt % at the lowest flow rates tested, indicating that fluidized bed electrodes can attain CWPs of nearly twice the limit of CDI flow electrodes while remaining flowable.

Fbed CDI System

Figure 8:
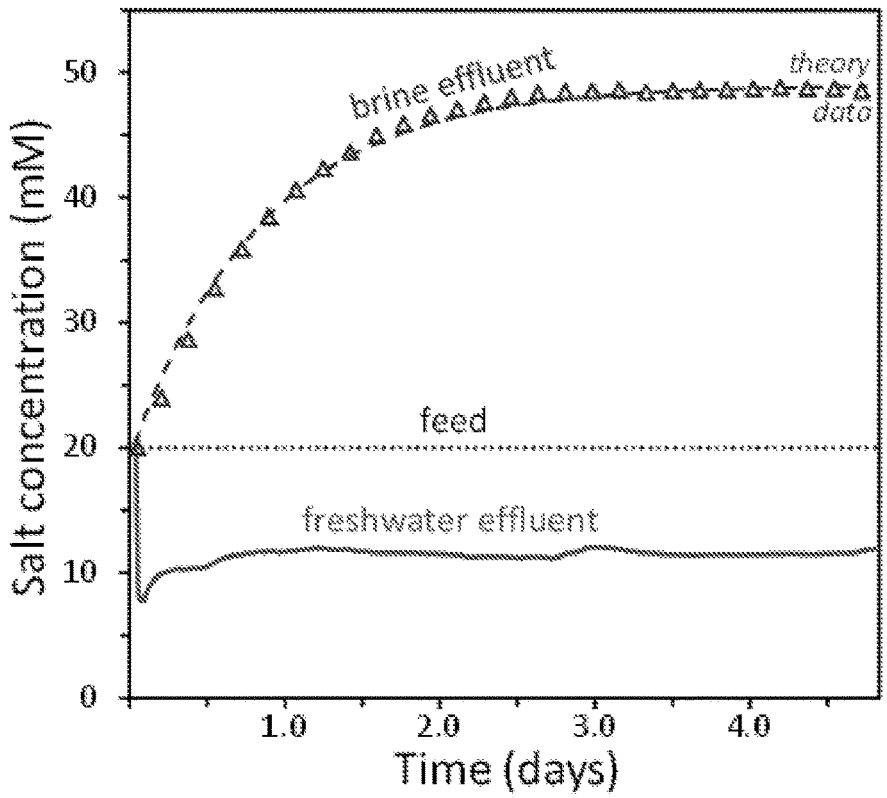
FIG. 8: Representative results for the desalination performance of the CDI system comprising fluidized bed electrodes, wherein the dotted line represents the concentration of the feed solution (20 mM), the solid line shows the measurement of the cell freshwater effluent concentration, the triangular markers show the measured salt concentration in the mixing vessel, and the dashed line the results of a mass balance calculation.
Figure 9:
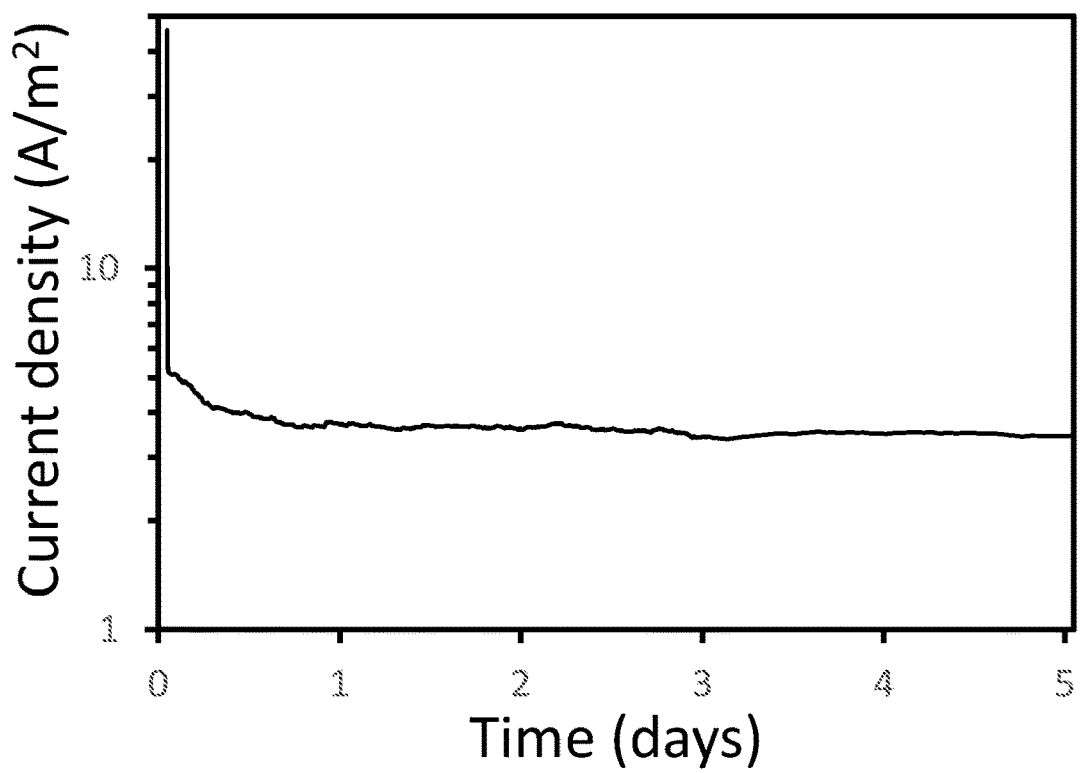
FIG. 9: Current response of the CDI cell during the experiment reported in FIG. 8.

FIG. 8 shows a representative result for the desalination performance of the Fbed CDI system, in the form of NaCl concentration versus time. The system described in Example 1 was used and a voltage of 1.6 V was applied between the two electrodes from time zero onward (resulting cell current is shown in FIG. 9). The electrode flow rate was Q=2.5 mL/min (so 5 mL/min for both electrodes), and the feed flow rate was 0.5 mL/min. The dotted line represents the constant feed concentration of 20 mM which flows into the cell's feed channel (and also into the mixing vessel). The solid line represents the measured concentration of the desalted water emerging from the cell. As can be seen, very soon after applying the voltage of 1.6 V, the effluent salt concentration reached a steady value of roughly 11 mM. The triangular markers represent the measured electrolyte concentration in the mixing vessel, and this concentration due to the bead discharge in the mixing vessel. This brine concentration reached a steady value after roughly three days, at nearly 50 mM. The dashed line was the result of a mass balance, predicting the concentration in the mixing vessel based on the measured salt removed from the feed stream. As can be seen, the mass balance prediction closely matches the measured mixing vessel conductivity, and thus it was concluded that all salt electrosorbed by the beads was released in the mixing vessel and any water transfer through the membrane must have been minor. After three days, both the cell effluent salinity and the mixing vessel salinity have reached steady values, and thus at this time the entire Fbed CDI system is at a steady state while the flow electrodes are recirculating from the mixing vessel to the cell and back. To the inventors' best knowledge, this is a sole example of a CDI system leveraging suspension electrodes which can perform continuous desalination and closed-loop regeneration and re-use of the electrodes without need for a second cell [Gendel, Y., Rommerskirchen, A. K. E., David, O. & Wessling, M. Batch mode and continuous desalination of water using flowing carbon deionization (FCDI) technology. *Electrochem. commun.* 46, 152-156 (2014)] or a third membrane [Rommerskirchen, A., Gendel, Y. & Wessling, M. Single module flow-electrode capacitive deionization for continuous water desalination. *Electrochem. commun.* 60, 34-37 (2015)]. It should be noted however that in the cell described hereinabove, there is no energy recovery from the discharging beads, which may limit the energy efficiency of the process.

Figure 10:
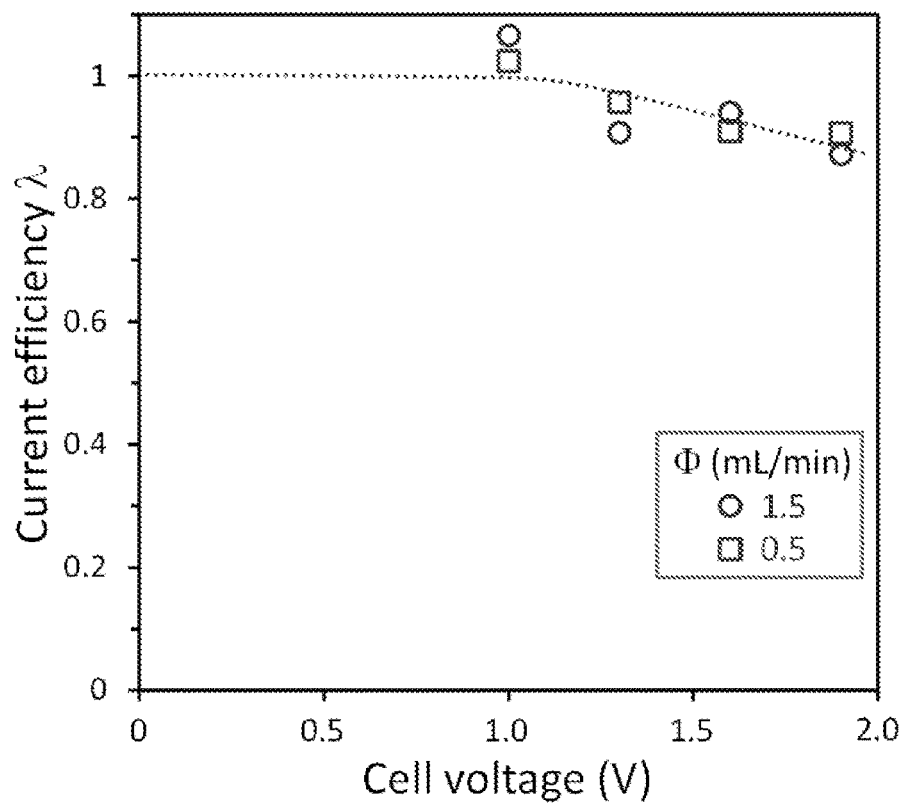
FIG. 10: Measured current efficiency of the CDI system comprising fluidized bed electrodes versus cell voltage, for different feed flow rates (○—1.5 mL/min and □—0.5 mL/min).

While FIG. 8 showed the performance of the Fbed CDI system of the invention at one experimental condition, the performance at a wider variety of conditions is shown in FIG. 10, in the form of cell current efficiency. Current efficiency is defined as the molar flux of salt removed from the feedwater divided by the molar flux of electrons transferred between electrodes by the external power supply, and is a widely used metric to quantify the performance of FCDI and electrodialysis cells, as it is directly related to energy efficiency. It was shown that the Fbed CDI cell of the present invention can achieve near unity charge efficiency for 20 mM feed water at several experimental conditions.

Accordingly, a novel CDI system was shown, which included fluidized bed electrodes to desalinate water. Said electrodes allowed for several benefits over previously used flow electrodes, namely a large improvement in flowable electrode CWP from ~20 wt % to 35 wt %, which promises more effective electric charge percolation through the electrode. While the electrode demonstrated high CWP, simultaneously low CWP of ~2.5 wt % was maintained in the surrounding flow system, minimizing pump requirements and preventing clogging. It was further demonstrated that continuous desalination of a feed stream can be performed with said electrodes, while regenerating and re-using the electrodes in a simple closed-loop system.

Example 3—Fluidized Bed Electrodes for Energy Storage

Fluidized Bed Electrode Comprising Carbon Beads

Figure 11A:
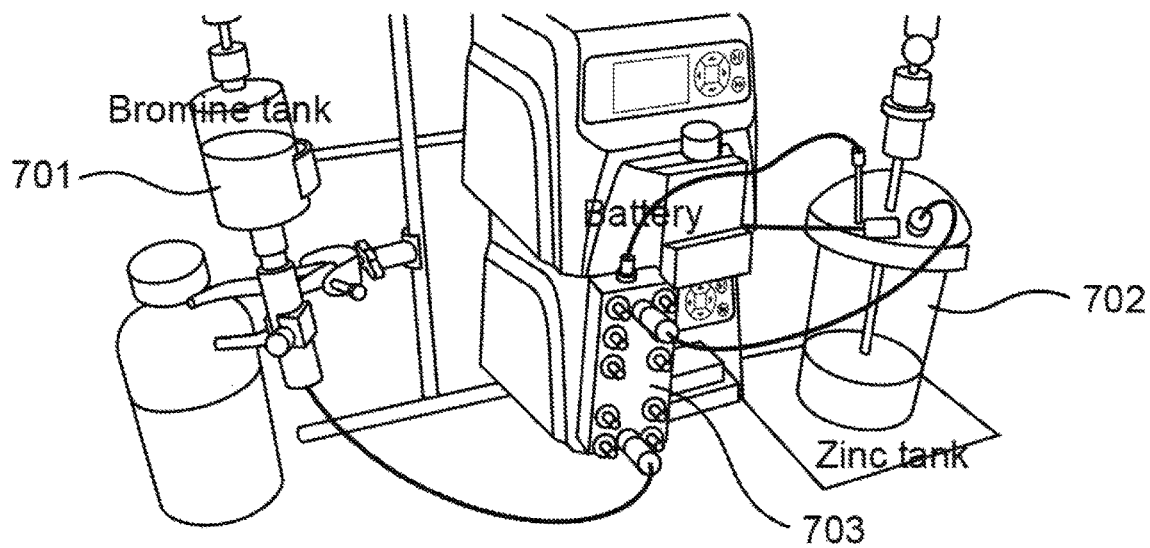
FIG. 11A: Picture of the zinc-bromine flow battery using fluidized bed electrodes comprising carbon beads for zinc deposition.

The formation of fluidized bed electrodes was accomplished by using larger carbon particles with diameter>100 μm (as gravity force is proportional to particle radius cubed) and flowing vertically against gravity. FIG. 11A shows a picture of the experimental flow battery, which is a zinc-bromine flow battery 703; comprising bromine tank 701; and zinc tank 702, wherein the zinc is deposited onto and into porous carbon beads which form the fluidized bed electrode.

Fluidized Bed Electrode Comprising MWCNTs

Figure 11B:
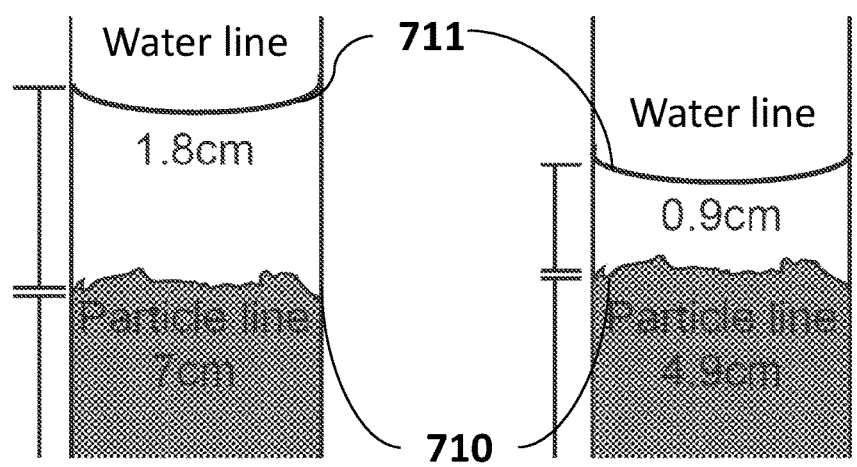
FIG. 11B: Picture of the zinc-bromine flow battery using a fluidized bed electrode as an anolyte, the electrode being filled with MWCNTs; the right portion of the picture depicts the lower part of the channel, while the left portion of the picture depicts the upper part of the channel.

Another type of fluidized electrode for energy storage included carbon nanotubes. The zinc-bromine redox flow battery (RFB) prototype cell was based on two physical flow channels, one for each electrochemical half-reaction. The half-cells were separated by a cation exchange membrane (CMX, Neosepta, Japan), which prevents the crossover of bromine/tribromide into the zinc half-cell. The electrolyte used in the anode and cathode channel (known as the anolyte and catholyte), contained 1 M $ZnBr_2$ (Alpha Acer, 98% purity) at pH of ~5 and resistivity of ~9 Ω·cm. For the endplate of the anolyte-side, poly(methyl-methacrylate) (PMMA) (Yavin plast, Israel) was chosen as a material as it is easy to machine and is compatible with 1 M $ZnBr_2$ electrolyte solution. The flow tubing for the anode channel was neoprene (Saint-Gobain, France) with an inner diameter of 1.6 mm A peristaltic pump (Masterflex L/S digital, 600 RPM, Cole-Parmer, USA) was used to flow the electrolyte between the storage vessel and the battery. The storage vessel was fabricated manually in the lab out of PVC (Yavin plast, Israel) pipes and could hold up to 200 ml of electrolyte while only 30 ml of electrolyte was used during the experiments. The catholyte initial concentrations contained either 1 M $ZnBr_2$ or 0.5 M $Br_2$ in 1 M $ZnBr_2$. For the catholyte half-cell the endplate material was PVDF (Eyar ltd., Israel). PVDF is a fluoropolymer which is more rigid and easy to machine compared to Teflon, and is corrosion resistant and inert to bromine. Teflon tubing (Bola, Germany) with internal diameter of 2 mm, fittings and a 10 ml Teflon tank (Savillex, USA) for the catholyte channel were chosen for bromine compatibility. Multi-walled carbon nanotubes (MWCNT) with 95% and 99% purity with outer diameter of 50-80 nm, inner diameter of 5-15 nm and length of ~50 μm (Nanostructured & Amorphous materials, Inc., USA) were washed with isopropanol (IPA) and used as fluidized bed electrode. While the nanotubes themselves are not expected to fluidize due to their nanoscale characteristic dimensions, the MWCNTs tended to strongly agglomerate into large effective particles, and these agglomerates would fluidize. Evidence of this behavior can be seen in FIG. 11B, as the strong effect of gravity on the agglomerates results in a lower particle velocity, as depicted by the lower particle line 710, relative to that of the of liquid, depicted by the upper water line 711. This behavior represents a key characteristic distinguishing fluidized beds from slurries.

Battery Performance with Fluidized Bed Electrode in a Galvanostatic 10 Cycle Experiment The MWCNTs-based fluidized bed battery was tested in a flow battery. 1 M ZnBr of electrolyte was used but excess of $Br_2$ was included in the catholyte to avoid bromine starvation. The total volume of electrolyte in each tank was 30 ml, and 5 wt % MWCNTs was added to the anolyte tank, meaning that for 30 ml of total anolyte, 1.5 gr of MWNCT powder was added. The anolyte flow rate was 3 ml/min and for the catholyte 1.68 ml/min. The MWCNT were pre-washed with isopropanol and vigorously stirred in the anolyte tank during the experiments. The current density was 8.88 $mA/cm^2$. All the experiments were conducted for 0-25% state-of-charge (SOC), where 0% refers to the complete utilization of all available zinc, while bromine concentration shifts roughly between 0.5 M initially, to 0.625 M at 25% SOC (2.25 hr charge step).

Figure 11C:
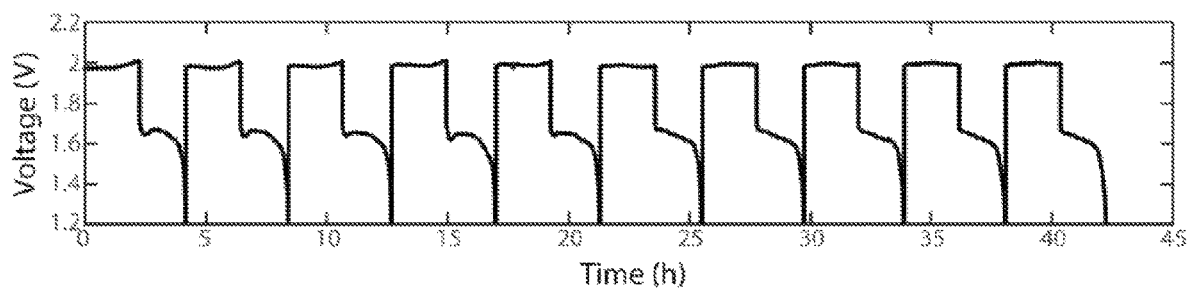
FIG. 11C: Ten-cycle galvanostatic charge/discharge profile of the zinc-bromine flow battery comprising a fluidized bed electrode as an anolyte.

FIG. 11C shows results of a ten-cycle galvanostatic experiment with the fluidized bed in the anolyte. It can be seen that the discharge curve has a parabolic profile during the first cycles with the voltage being relatively stable in the final cycles of the experiment. The calculated average coulombic efficiency in this experiment was 86% CE (for all cycles, the CE was between 85-91%). The voltage efficiency (VE) was about 82-83%. The energy efficiency (EE) for all ten cycles was stable and the average EE was about 70%.

Example 4—Hybrid Electrodes, Fluidized Bed Electrodes and Slurry Electrodes Comprising Activated Carbon—Construction, Operation and Characterization Methods Hybrid electrodes were formed by closely packing fluidized bed comprising carbon beads into the electrode compartment and using a fluidizing medium which is seeded with small (about 10 µm) carbon particles (in other words, using a slurry electrolyte). The small carbon particles are unaffected by gravity due to their small sizes, and so are entrained with the fluidizing medium, while the beads are strongly affected by gravity such that their flow is retarded relatively to the flow of the fluidizing medium.

Activated carbon particles of roughly 10 µm characteristic size and 5 cwt % loading in the electrode compartment (YP-50, Kuraray Chemical Co., Japan) were used as a second group of particles, which do not sediment under gravitational force and activated carbon beads having a mean particle size of 125-250 µm (TE3, Mast Carbon International, England) were used as a first group of particles, which sediment under gravitational force. For the sake of comparison, two additional electrodes were constructed—the first one utilizing only 5% wt. YP-50 activated carbon powder (slurry electrode) and the second one utilizing only the activated carbon beads in the same weight as in the hybrid electrode (fluidized bed electrode).

Figure 12:
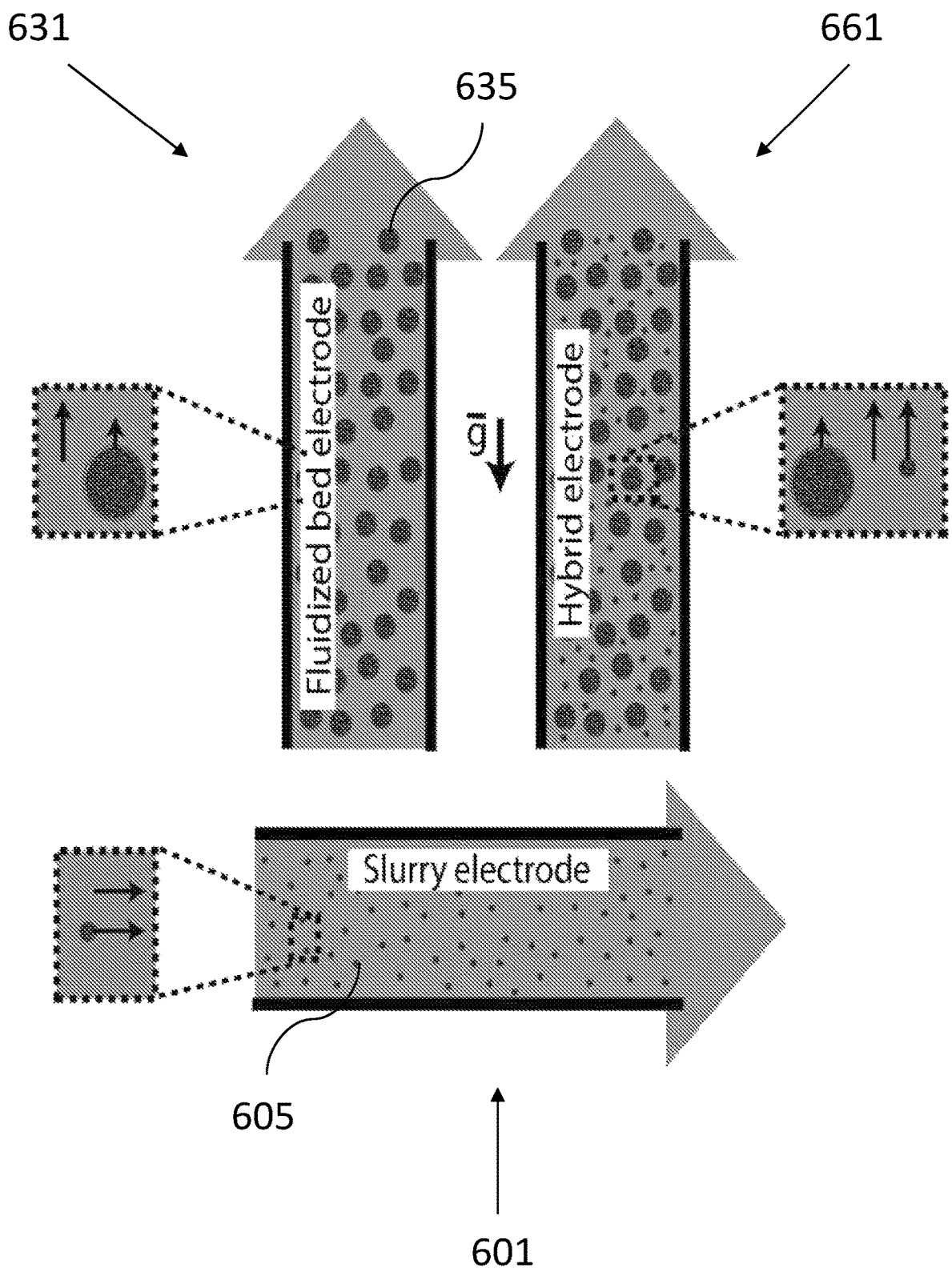
FIG. 12: Schematic representation of a slurry electrode, a fluidized bed electrode and a hybrid electrode used in the conductivity measurement experiments.

FIG. 12 is a schematic representation of the three types of liquid-solid suspension electrodes used in the conductivity measurement experiments, a slurry electrode 601, a fluidized bed electrode 631 and a hybrid electrode 661. Slurry electrode 601 contains solid particles 605. Solid particles 605 are unaffected by gravity and are entrained by the electrolyte.

In fluidized bed electrode 631, the gravitational force causes particles 635 to travel slower than the surrounding electrolyte, thus enabling higher electrode carbon loading in the electrode compartment.

Hybrid electrode 661 combines the features of both fluidized bed electrode 631 and slurry electrode 601 for maximal carbon loading, where the slurry flows through the formed fluidized bed.

The liquid phase used in all suspension electrodes depicted in FIG. 12 was deionized (DI) water to allow for measurements of solely electric conductivity through the solid phase. The slurry electrode was prepared by adding the carbon powder to 190 mL of DI water in a PVC tank to reach the desired cwt %. For the fluidized bed experiments, 11.2 g (5.6 cwt %) carbon beads were added to 190 mL of DI water in the PVC tank. The hybrid electrode combined the slurry and the fluidized bed electrodes by first adding 190 mL DI water to the tank, and then adding the same mass of carbon beads as in the aforementioned fluidized bed case, followed by the same mass of the activated carbon powder as was used in the aforementioned slurries. YP-50 activated carbon was used as received while the carbon beads were rinsed with DI water and then sieved with a 75 micron mesh size to remove any unwanted carbon dust.

The tank contents were mixed continuously at 270 rpm (IKA, Germany), and a peristaltic pump (Masterflex, Cole Parmer, USA) was used to pump the suspension to a polycarbonate tube with an inner diameter of 12.6 mm and length of 130 mm. Electrode electronic conductivity of the hybrid electrode was measured versus electrode superficial velocity. Measurements were done with electrochemical impedance spectroscopy in a four electrode configuration. Electronic conductivity of the hybrid electrode was compared with the electronic conductivity of a slurry electrode and of a fluidized bed electrode.

Figure 13:
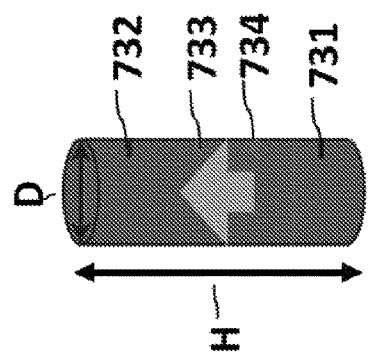
FIG. 13: Schematic representation of a custom-built four-electrode setup for electric conductivity measurements.

To measure the electric conductivity of the electrodes, they were pumped through a custom-built four-electrode cell based on the cell of Petek et al. [T. J. Petek, N. C. Hoyt, R. F. Savinell, J. S. Wainright, J. Electrochem. Soc. 2016, 163, A5001-A5009]. The four-electrode cell was built into a polycarbonate tube with an inner diameter D of 12.6 mm and height H of 130 mm (FIG. 13). In the tube, holes were drilled to insert four 1 mm diameter titanium wires to be used for four-electrode electrochemical impedance spectroscopy (EIS) measurements. The working wire electrode 731 and the counter wire electrode 732 were 80 mm apart, while in the middle of the working and counter electrodes were placed two sense wire electrodes 733 and 734, being 10 mm apart (FIG. 13). All wires were inserted roughly 1-2 mm into the tube and then sealed with epoxy to prevent leaks. The wires were connected to the leads of a Gamry 3000 potentiostat (Gamry, USA), and EIS experiments were run when the electrode compartment was completely filled with the suspension, and run continuously until a steady impedance was reached (typically <5 minutes after filling the compartment). The impedance was measured while holding a voltage difference of 0 V between working and reference electrodes, an amplitude of the sinusoidal voltage input of 5 mV, and a frequency range between 100 kHz to 1 Hz.

Example 5—Hybrid Electrodes, Fluidized Bed Electrodes, and Slurry Electrodes Comprising MWCNTs—Construction, Operation and Characterization Methods Three types of electrodes were prepared, as described in Example 4—a slurry electrode, a fluidized bed electrode and hybrid electrode, including a liquid and solid phase. The fluidizing medium used was deionized (DI) water the solid phase included different types of carbon materials: multi-walled carbon nanotubes (MWCNT) with about 50-80 nm diameter and 10-20 µm length (Nanostructured & Amorphous Products Inc., USA) as a second group of particles which do not sediment under gravitational force and activated carbon beads of 125-250 µm diameter (TE3, Mast Carbon International, England) as a first group of particles, which sediment under gravitational force. The slurry was made by adding the MWCNTs to 190 mL of DI water in a PVC tank at 2.5 wt % carbon (carbon weight divided by the weight of carbon and water).

The hybrid electrode combined the slurry electrode and the fluidized bed electrode by adding 190 mL DI water to the tank, and then adding to the tank the MWCNTs at the same mass used in the slurry electrode case, and the carbon beads at the same mass used in the fluidized bed electrode case. MWCNTs were used as received while the carbon beads were rinsed with DI water and then sieved with a 75 micron mesh size to remove any unwanted carbon dust.

The electric conductivity experiments were performed as outlined in Example 4 hereinabove.

Example 6—Hybrid Electrodes—Results

Figure 14:
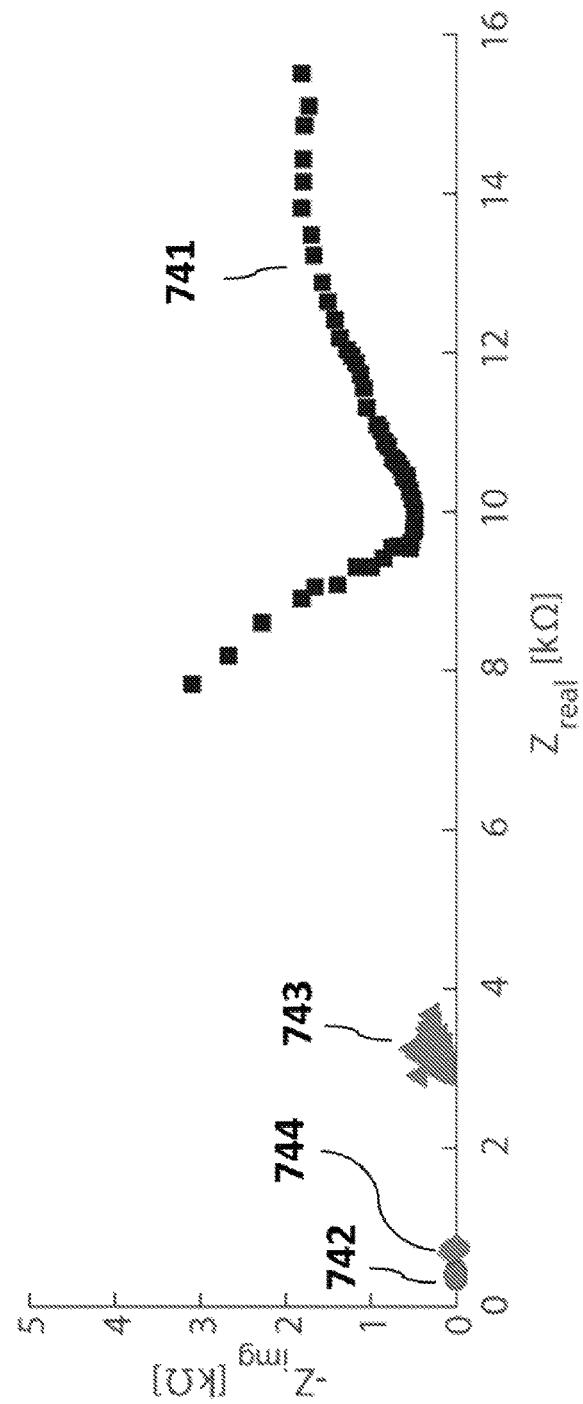
FIG. 14: Measured impedance data of a fluidized bed electrode (■), a slurry electrode comprising MWCNTs, 2.5% wt. (●), a hybrid suspension electrode combining the slurry electrode comprising MWCNTs, 2.5% wt. with the fluidized bed electrode comprising carbon beads (▲), and a hybrid suspension electrode combining a slurry electrode comprising activated carbon, 5% wt. with the fluidized bed electrode comprising carbon beads (♦).

FIG. 14 shows measured impedance data of several types of suspension electrodes, including fluidized bed electrode 741 (Mast carbon TE3—squares), slurry electrode 742 (MWCNTs 2.5% wt—circles), hybrid electrode 743 (Mast carbon TE3/MWCNTs, 2.5% wt—triangles) and hybrid electrode 744 (Mast carbon TE3/YP-50, 5% wt—diamonds), in a deionized water electrolyte. The frequency range is from 100 kHz to 1 Hz. Most electrodes demonstrate approximately the expected impedance, which is a single point along the real axis (i.e. a simple resistor). The fluidized bed electrode 741 demonstrates a different impedance response, indicating that this electrode does not act as a simple resistor. The measured impedance of the YP-50 slurry is not shown, as it was similar to the impedance measured of DI water alone, demonstrating that the 5 cwt % YP-50 slurry effectively did not allow for electric charge percolation in the four-electrode cell.

Measurements of electrode resistance were taken by averaging the real component of the measured impedance in the frequency range of 1-10 kHz. Resistance was converted to electrode conductivity using a measured cell constant which was about 0.79. The cell constant was measured by flowing NaCl electrolyte with conductivity of 1-10 mS/cm through the four electrode system and comparing its measured conductivity to its known conductivity.

Figure 15A:
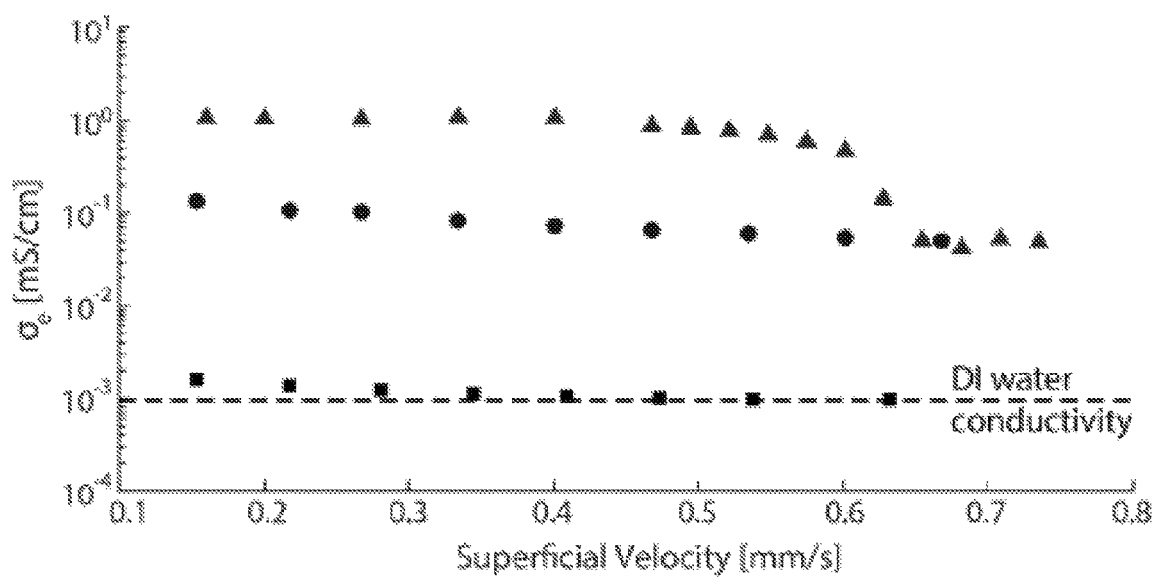
FIG. 15A: Measured electric conductivity versus electrode superficial velocity of the slurry electrode comprising activated carbon, 5% wt. (■), the fluidized bed electrode comprising carbon beads (●), and the hybrid suspension electrode combining the slurry with the fluidized bed (▲).

FIG. 15A shows the results of the measurement of the electrodes' electric conductivity using the four-electrode setup, wherein the electrodes included carbon beads and/or activated carbon. The slurry electrode alone (squares) is too sparse to allow for electric charge percolation, and thus its impedance matches that of the deionized water electrolyte alone (dashed line). The fluidized bed electrode (circles) demonstrates an impedance of order 0.1 mS/cm, which increases with decreasing electrode velocity. Combining both slurry and fluidized bed electrodes into a hybrid electrode (triangles) showed an order of magnitude improvement in the electric conductivity, to the order of 1 mS/cm. At high electrode velocity (above ~0.7 mm/s), the hybrid electrode showed a conductivity roughly equal to that of the fluidized bed alone, suggesting a percolation threshold for the slurry particles between the bed particles is reached as velocity is lowered.

Figure 15B:
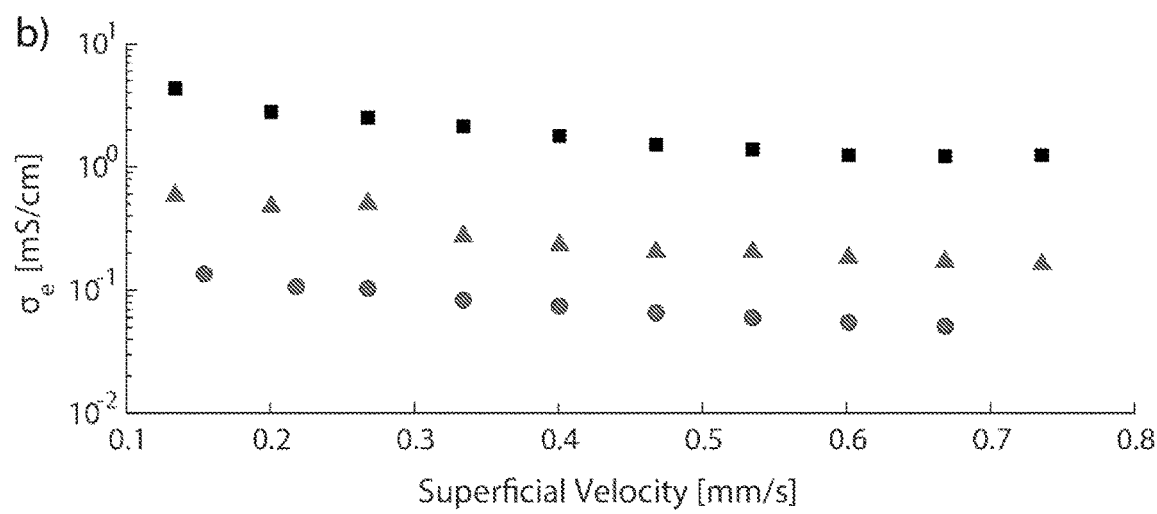
FIG. 15B: Measured electric conductivity versus electrode superficial velocity of the fluidized bed electrode comprising carbon beads (●), the slurry electrode comprising MWCNTs, 2.5% wt. (■)) and the hybrid electrode combining the slurry electrode with the fluidized bed electrode (▲).

FIG. 15B depicts measurements of the MWCNTs-based electrodes' electric conductivity, a, using the same four electrode setup. The MWCNT slurry electrode (squares) alone demonstrates high conductivity well above 1 mS/cm. This conductivity is significantly above that of the fluidized bed alone (circles), despite a low weight percent of the slurry of 2.5 wt %. Adding the MWCNTs to the fluidized bed results in a hybrid electrode (triangles) with conductivity roughly an order of magnitude lower than that of the MWCNT slurry. Without wishing to being bound by theory or mechanism of action, the latter result suggest a disruption of electric conductivity through the network of MWCNTs by the poorer conducting beads. This demonstrates that a higher conductivity bed is required to attain the synergistic effect expected of hybrid electrodes when using highly conductive MWCNTs as slurry particles.

Figure 16:
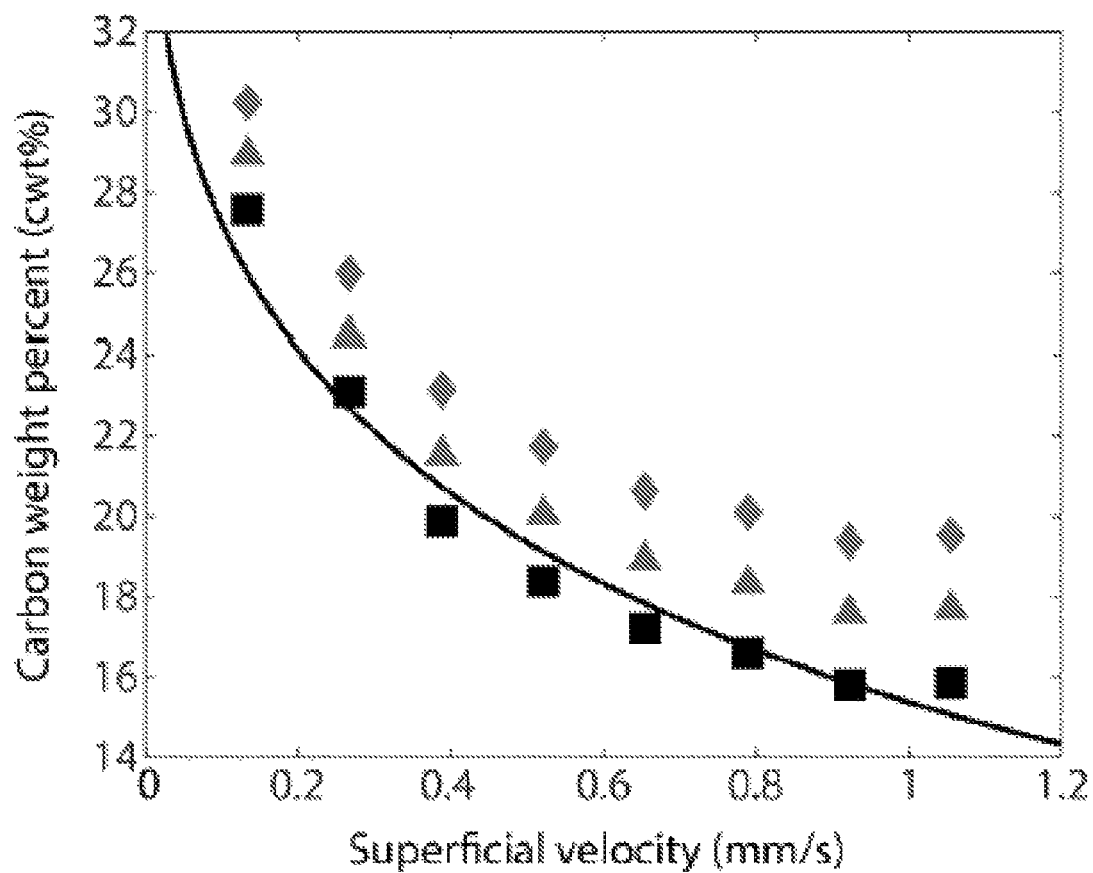
FIG. 16: Carbon weight percent (cwt %) versus electrode superficial velocity measured for the fluidized bed electrode alone (■); calculated values for the hybrid electrode comprising carbon beads and MWCNTs (▲) and the hybrid electrode comprising carbon beads and activated carbon (♦); and the theoretical curve (solid line), which is the result of fitting the Richardson-Zaki equation to the fluidized bed data.

FIG. 16 shows carbon weight percent (cwt %) versus electrode superficial velocity measured for the fluidized bed electrode alone (squares) and calculated values for the two hybrid electrodes (triangles: Mast Carbon TE3/MWCNT, diamonds: Mast carbon TE3/YP-50). The theory curve (black line) is the result of fitting the Richardson-Zaki equation to the fluidized bed data (squares). The hybrid electrode's carbon wt % is estimated as the sum of the fluidized bed and slurry wt %. The carbon wt % of the fluidized bed electrode in the acrylic tube was measured using a technique previously described in detail [Doornbusch, G. J., et al. Journal of Materials Chemistry A 4.10 (2016): 3642-3647].

It is noted the wt % of the fluidized bed in the acrylic tube was greater than the wt % of the tank due to the effect of gravity on the beads. For slurries, the carbon wt % in the tube equals that of the tank as the carbon particles and MWCNT are too small to allow for significant effect of gravity on the solid phase.

The carbon loading measurements show that the cwt % of the fluidized bed that forms in the polycarbonate tube is between about 16% and 28% depending on the superficial velocity, and is thus 3-5 times higher than the set cwt % of the beads in the PVC tank. The measured data was fitted to the empirical Richardson-Zaki equation, obtaining best-fit parameter values of 3.45 $mms^{-1}$ for the bead terminal velocity, and 5.1 for the Richardson-Zaki exponent. Both the terminal velocity and the exponent value obtained are very near to the expected theoretical values of 3.17 $mms^{-1}$ and 4.65, respectively, illustrating that the achieved bed packing is approximately that expected theoretically. Using the measured cwt % of the fluidized bed, and the known cwt % of the slurries, it was possible to estimate the cwt % of the hybrid electrodes at various electrode velocities (triangles and diamonds in FIG. 16). As can be seen, the cwt % of the hybrid electrodes are generally only slightly higher than that of the fluidized bed alone, showing that the slurry particles are the minority solid component of the hybrid electrode. The hybrid electrodes can be thus characterized as a dilute slurry flowing through a dense up-flow fluidized bed.

It is appreciated by persons skilled in the art that the present invention is not limited by what has been particularly shown and described hereinabove. Rather the scope of the present invention includes both combinations and subcombinations of various features described hereinabove as well as variations and modifications. Therefore, the invention is not to be constructed as restricted to the particularly described embodiments, and the scope and concept of the invention will be more readily understood by references to the claims, which follow.

The invention claimed is:

1. An electrochemical device, comprising a first current collector; a second current collector; at least one separator; at least one electrode compartment positioned between said first or second current collectors and the separator; and at least one tube in fluid-flow connection with the electrode compartment, the electrode compartment comprising conductive particles comprising carbon, which sediment under gravitational force and a liquid fluidizing medium in which said conductive particles are suspended, wherein the fluidizing medium flows through the electrode compartment in a non-horizontal direction, and the loading of the conductive particles in the electrode compartment is above about 15% wt. and at least about 50% higher than in the tube.

2. The device according to claim 1, wherein carbon is selected from the group consisting of activated carbon, carbon black, graphitic carbon, carbon beads, carbon fibers, carbon microfibers, fullerenic carbons, carbon nanotubes (CNTs), graphene sheets or aggregates of graphene sheets, materials comprising fullerenic fragments and any combination thereof.

3. The device according to claim 2, wherein the conductive particles comprise carbon beads having a mean particle size ranging from about 100 μm to about 300 μm.

4. The device according to claim 2, wherein the conductive particles comprise CNTs.

5. The device according to claim 4, wherein the CNTs comprise multi-walled carbon nanotubes (MWCNTs) and wherein the MWCNTs are present in the electrode compartment in the form of agglomerates having a mean agglomerate size ranging from about 50 μm to about 500 μm.

6. The device according to claim 1, wherein the conductive particles further comprise a redox species on the surface or in the bulk thereof, the redox species comprising a metal ion selected from the group consisting of zinc, iron, vanadium, chromium, lithium, sodium, magnesium, aluminum, nickel, calcium, lead, copper, cesium, cadmium ions and any combination thereof.

7. An energy storage system comprising the device according to claim 1 and at least one external storage tank, which is in fluid flow connection with the at least one tube, wherein the storage tank is configured to store the conductive particles and/or the fluidizing medium and to deliver the conductive particles and/or the fluidizing medium to the at least one tube prior to the electrochemical operation of the system, and wherein the fluidizing medium comprises an electrolyte.

8. The energy storage system according to claim 7, wherein the energy storage system is configured in a form selected from a flow battery, a supercapacitor or a capacitive mixing system.

9. A water desalination system comprising the device according to claim 1, wherein the device comprises two separators, wherein the separators are ion-permeable membranes and the system comprises a feed tank comprising a mixing vessel, which is in fluid flow connection with the at least one tube and is configured to mix the fluidizing medium with the conductive particles.

10. An electrode for use in an electrochemical device, the electrode comprising an electrode compartment and at least one tube in fluid-flow connection with the electrode compartment, the electrode compartment comprising a first group of particles comprising conductive particles, which sediment under gravitational force, a second group of particles comprising conductive particles, which do not sediment under gravitational force and a liquid fluidizing medium in which said conductive particles are suspended, wherein the fluidizing medium flows through the electrode compartment in a non-horizontal direction and the loading of the first group of particles in the electrode compartment is at least about 50% higher than in the tube.

11. The electrode according to claim 10, wherein the ratio between the conductivity of the first group of particles and the conductivity of the second group of particles is above about 1:10, when each group of particles is used individually in the electrode compartment.

12. The electrode according to claim 10, wherein the ratio between the mass of the conductive particles which sediment under gravitational force and the mass of the conductive particles which do not sediment under gravitational force is above about 3:1.

13. The electrode according to claim 10, wherein the conductive particles comprise a material selected from the group consisting of carbon, graphite, metal, metal carbide, metal nitride, metal oxide, polymer, and any combination thereof.

14. The electrode according to claim 13, wherein carbon is selected from the group consisting of activated carbon, carbon black, graphitic carbon, carbon beads, carbon fibers, carbon microfibers, fullerenic carbons, carbon nanotubes (CNTs), graphene sheets or aggregates of graphene sheets, and materials comprising fullerenic fragments and any combination thereof.

15. The electrode according to claim 10, wherein the conductive particles further comprise a redox species on the surface or in the bulk thereof, the redox species comprising a metal ion selected from the group consisting of zinc, iron, vanadium, chromium, lithium, sodium, magnesium, aluminum, nickel, calcium, lead, copper, cesium, cadmium ions and any combination thereof.

16. The electrode according to claim 10, wherein the first group of particles comprises carbon beads having a mean particle size of at least about 50 μm and the second group of particles comprises activated carbon having a mean particle size below about 30 μm.

17. An electrochemical device, comprising at least one electrode according to claim 10; a first current collector; a second current collector; and at least one separator, wherein the electrode compartment of the at least one electrode is positioned between said first or second current collectors and the separator.

18. An energy storage system comprising the device according to claim 17 and at least one external storage tank, which is in fluid flow connection with the at least one tube, wherein the storage tank is configured to store the conductive particles and/or the fluidizing medium and to deliver the conductive particles and/or the fluidizing medium to the at least one tube prior to the electrochemical operation of the system, and wherein the fluidizing medium comprises an electrolyte.

19. The energy storage system according to claim 18, wherein the energy storage system is configured in a form selected from a flow battery, a supercapacitor or a capacitive mixing system, wherein the flow battery is selected from the group consisting of a zinc-bromine flow battery, hydrogen-bromine, quinone-bromine, vanadium-bromine, all quinone, all-iron flow battery, vanadium redox flow battery, lithium-ion flow battery, lithium-sulfur, sodium ion, sodium—sulfur flow battery, lead-acid flow battery, and nickel metal hydride flow battery.

20. A water desalination system comprising the device according to claim 17, wherein the device comprises two separators, wherein the separators are ion-permeable membranes and the system comprises a feed tank comprising a mixing vessel, which is in fluid flow connection with the at least one tube and is configured to mix the fluidizing medium with the conductive particles, and wherein the fluidizing medium comprises a feed solution.

* * * * *